United States Patent
Wehlin et al.

(10) Patent No.: US 11,154,989 B2
(45) Date of Patent: Oct. 26, 2021

(54) PIPE TRAVERSING APPARATUS, SENSING, AND CONTROLS

(71) Applicant: ARIX TECHNOLOGIES, INC., Jackson, LA (US)

(72) Inventors: Karl Petter Wehlin, Houston, TX (US); Bryan R. Duerfeldt, Houston, TX (US); Conner S. George, Houston, TX (US); Hassan Zargarzadeh, Beaumont, TX (US); Dianna D. Liu, Jackson, LA (US)

(73) Assignee: ARIX TECHNOLOGIES, INC., Jackson, LA (US)

( * ) Notice: Subject to any disclaimer, the term of this patent is extended or adjusted under 35 U.S.C. 154(b) by 0 days.

(21) Appl. No.: 17/032,771

(22) Filed: Sep. 25, 2020

(65) Prior Publication Data

US 2021/0094186 A1    Apr. 1, 2021

Related U.S. Application Data

(60) Provisional application No. 62/906,910, filed on Sep. 27, 2019, provisional application No. 63/042,886, (Continued)

(51) Int. Cl.
   *B25J 9/16*     (2006.01)
   *B25J 5/00*     (2006.01)
   *B25J 5/02*     (2006.01)

(52) U.S. Cl.
   CPC ............. *B25J 9/1694* (2013.01); *B25J 5/007* (2013.01); *B25J 5/02* (2013.01); *B25J 9/162* (2013.01); *B25J 9/1664* (2013.01)

(58) Field of Classification Search
   CPC ........ B25J 9/1694; B25J 5/007; B25J 9/1664; B25J 5/02; B25J 9/162; G01N 2291/2636; G01N 29/225; G01N 29/265; F16L 55/18
   See application file for complete search history.

(56) References Cited

U.S. PATENT DOCUMENTS

| 4,531,413 A | 7/1985 | Tsuchita et al. |
| 5,686,668 A | 11/1997 | Mclean |

(Continued)

FOREIGN PATENT DOCUMENTS

| CN | 102691856 A | 9/2012 |
| CN | 104976485 A | 10/2015 |

(Continued)

OTHER PUBLICATIONS

International Search Report and Written Opinion in corresponding International PCT Application No. PCT/US2020/052753; dated Feb. 8, 2021; 9 pages.

(Continued)

*Primary Examiner* — Basil T. Jos

(74) *Attorney, Agent, or Firm* — Greenberg Traurig, LLP; Todd C. Basile; David Dykeman

(57) ABSTRACT

A system for detecting radial movement of a robotic apparatus on a pipe, comprising distance sensors configured to measure a distance between their respective fixed positions and a surface of the pipe, and a processor configured to detect a change and determine whether the change is indicative of radial movement. A system for tracking a position of a robotic apparatus on a pipe, comprising mirrored, freely-rotating mecanum wheels, a sensor(s) configured to measure rotation of the mecanum wheels, and a processor configured to calculate a linear displacement of each mecanum wheel and resulting axial and circumferential positions of the robotic apparatus. A method for navigating a bend or curve of a pipe, comprising generating computer models of the robotic apparatus and the pipe, performing a computer simulation to identify a combination of wheel speeds that keeps the wheels in constant contact with the pipe, and operating the wheels accordingly.

14 Claims, 75 Drawing Sheets

Related U.S. Application Data filed on Jun. 23, 2020, provisional application No. 63/063,769, filed on Aug. 10, 2020.

(56) References Cited

U.S. PATENT DOCUMENTS

| | | |
|---|---|---|
| 5,698,854 A | 12/1997 | Gupta |
| 7,210,364 B2 | 5/2007 | Ghorbel et al. |
| 7,594,448 B2 | 9/2009 | Jacobson et al. |
| 7,656,997 B1 | 2/2010 | Anjelly |
| 8,141,442 B2 | 3/2012 | Roberts |
| 8,759,780 B2 | 6/2014 | Dobbs |
| 9,366,596 B2 | 6/2016 | Mekid et al. |
| 9,726,569 B2 | 8/2017 | Koyanagi |
| 10,465,835 B2 | 11/2019 | Wehlin et al. |
| 2008/0012310 A1 | 1/2008 | Weaver et al. |
| 2008/0167752 A1 | 7/2008 | Jacobson |
| 2009/0120215 A1 | 5/2009 | Jacobsen et al. |
| 2018/0011064 A1 | 1/2018 | Furr |
| 2018/0284074 A1 | 10/2018 | Furr |
| 2019/0086020 A1 | 3/2019 | Wehlin et al. |
| 2019/0120418 A1 | 4/2019 | Sivacoe |
| 2019/0360976 A1* | 11/2019 | Frueh .................. G01N 29/265 |

FOREIGN PATENT DOCUMENTS

| | | |
|---|---|---|
| CN | 204712040 | 10/2015 |
| CN | 206357205 | 7/2017 |
| EP | 2937622 A1 | 10/2015 |
| JP | H05139292 A | 8/1993 |
| JP | H07329841 A | 12/1995 |
| KR | 20120058872 A | 6/2012 |
| KR | 20130034257 A | 4/2013 |
| KR | 101706110 B1 | 2/2017 |

OTHER PUBLICATIONS

International Search Report in corresponding International Patent Application No. PCT/US2018/051723 dated Nov. 14, 2018, 2 pages.

* cited by examiner

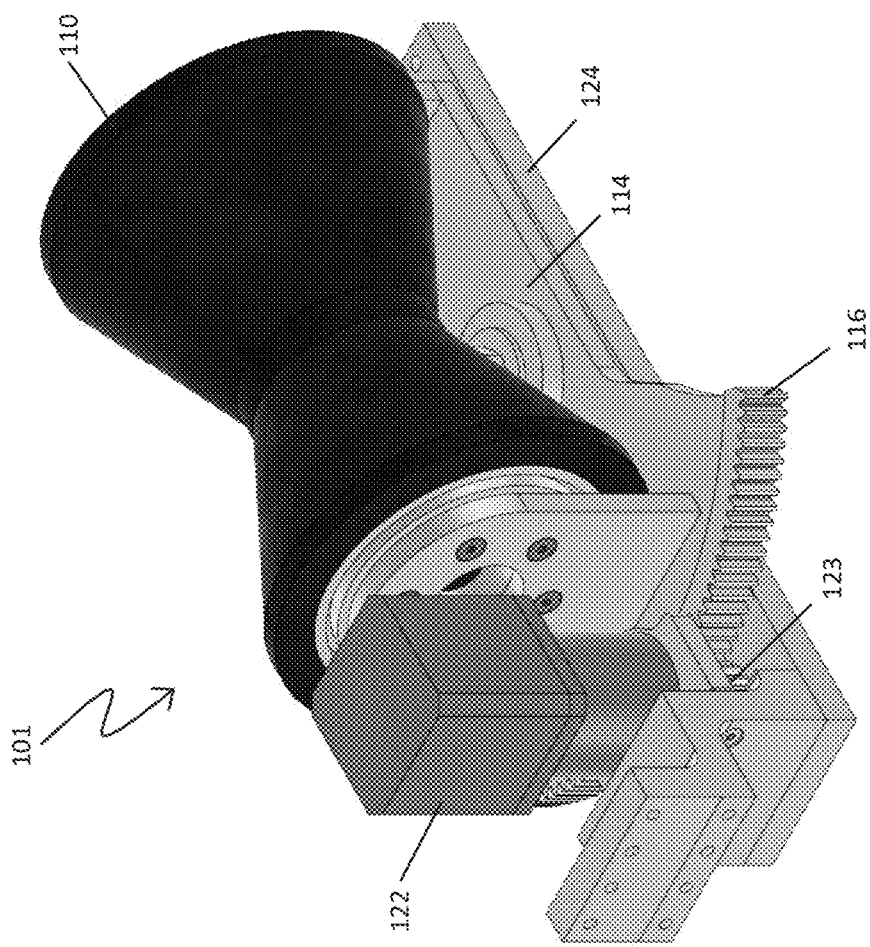

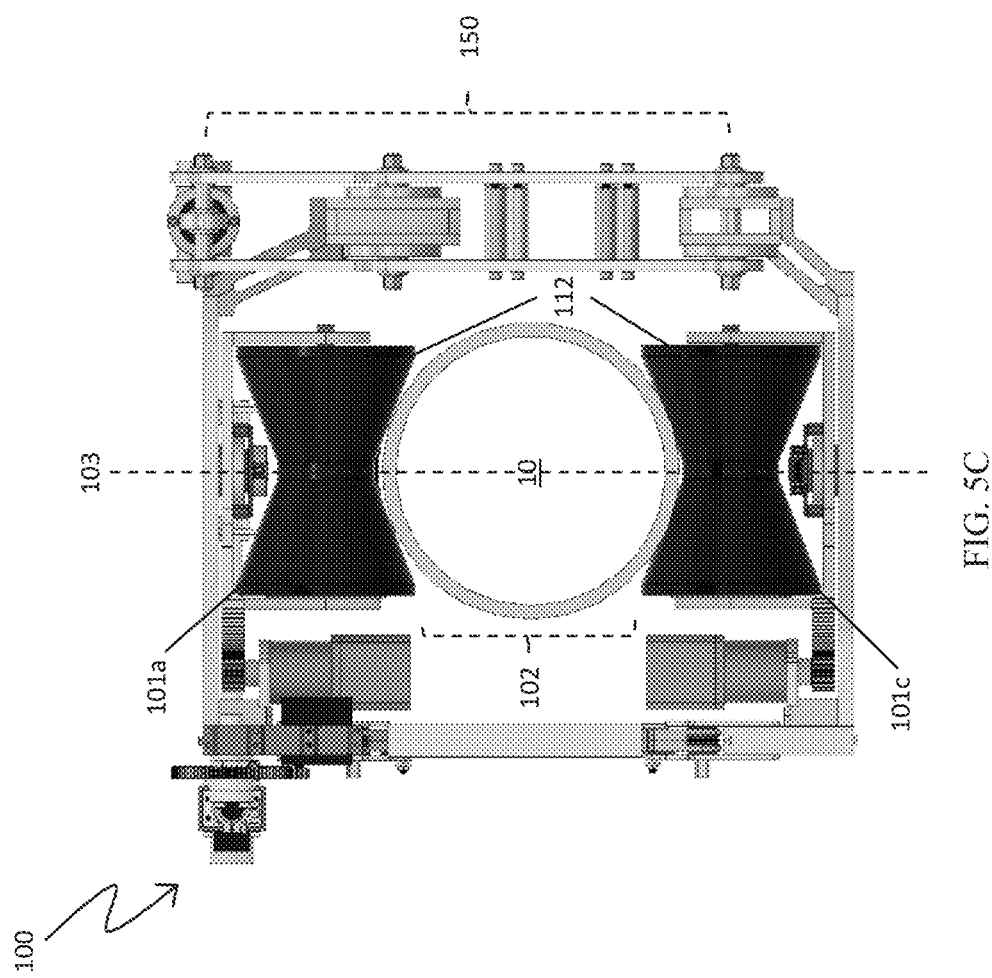

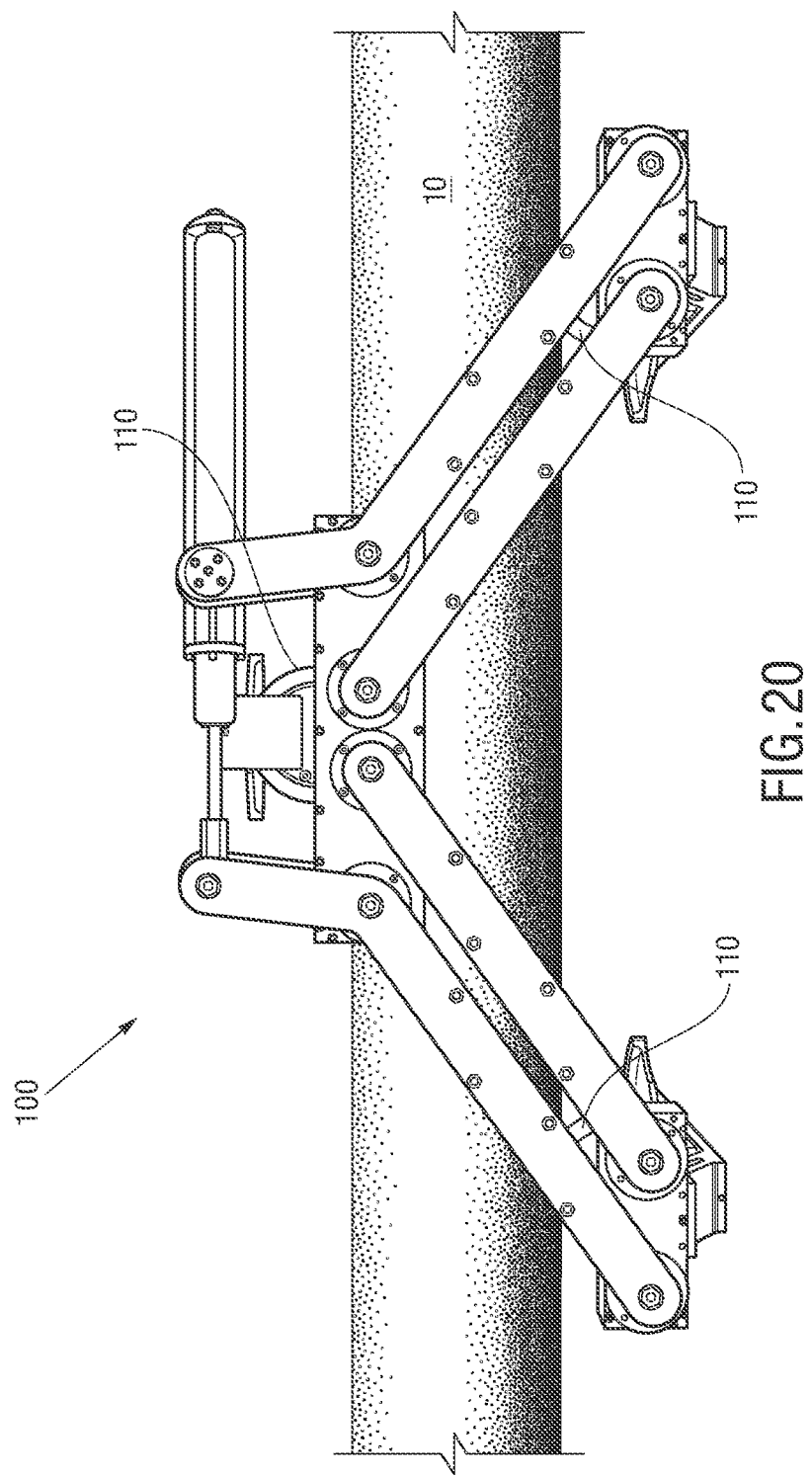

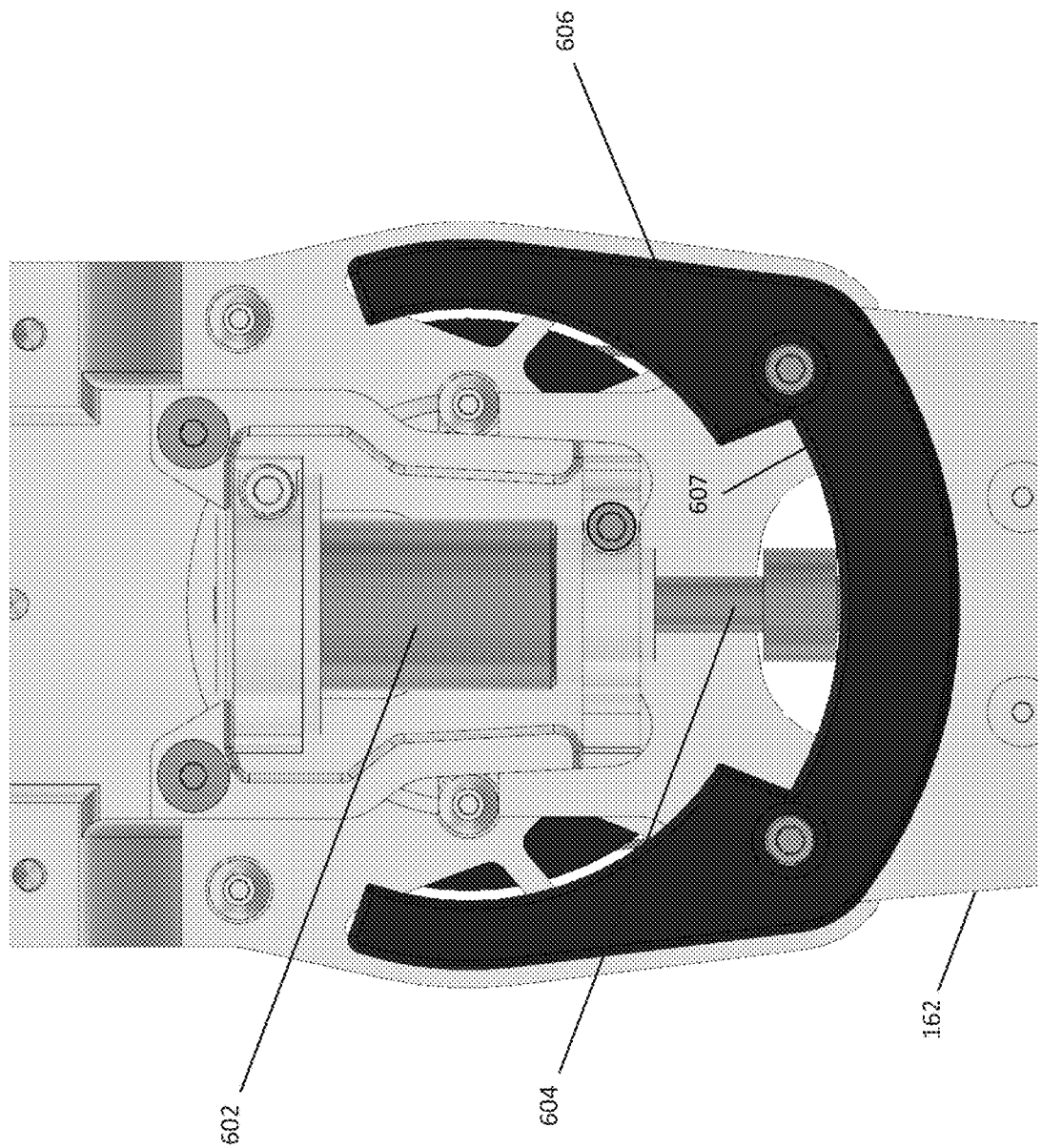

1. Circumferential rotation  $\theta$
2. Longitudinal movement  $d$
3. Front radial movement  $r_1$
4. Back radial movement  $r_2$

PIPE TRAVERSING APPARATUS, SENSING, AND CONTROLS

CROSS-REFERENCE TO RELATED APPLICATIONS

This application claims the benefit of and priority to U.S. Provisional Application No. 62/906,910, filed Sep. 27, 2019, U.S. Provisional Application No. 63/042,886, filed Jun. 23, 2020, and U.S. Provisional Application No. 63/063,769, filed Aug. 10, 2020, all of which are hereby incorporated herein by reference in its entirety for all purposes.

BACKGROUND

Many existing pipe crawling apparatuses are designed to either travel inside of pipes or are not equipped to travel around obstacles it may encounter on the outside of pipes. In view of limitations of current technologies, a need remains for pipe-crawling apparatus that are effective in driving on horizontal and vertical pipes and navigating around and/or over potential obstacles—e.g., obstacles that present a change in the effective diameter of the pipe, a change in the effective curvature of the pipe, and/or obstacles that protrude from the pipe in one or more radial directions. More particularly, pipe-crawling apparatus are needed that are effective in navigating around and/or over flanges, valves, tees, bends, supports and the like. In addition, a need remains for pipe-crawling apparatus that are effective in traveling relative to pipes without magnets, vacuum or aerodynamic forces. Additionally, a need remains for pipe-crawling apparatus and associated systems that are effective in performing desired functions relative to the pipe itself, e.g., corrosion detection, wall thickness measurements, or based on travel along the path but independent of the pipe itself, e.g., imaging and/or sensing of locations accessible through travel along a pipe. These and other needs are advantageously satisfied by the apparatus and systems disclosed herein.

SUMMARY

The present disclosure is directed to a system for detecting radial movement of a robotic apparatus on a pipe. The system, in various embodiments, may comprise a first distance sensor and a second distance sensor, each configured to be coupled with the robotic apparatus at a fixed position and to measure a distance between its respective fixed position and a surface of the pipe; and a processor configured to monitor the distance measurements provided by the first distance sensor and the second distance sensor as the robotic apparatus moves along the pipe; detect a change in the distance measurements provided by at least one of the first distance sensor and the second distance sensor; and determine whether a diameter of the pipe changed at the axial location at which the processor detected the change in the distance measurements, and if not, determine that the change in distance measurements are indicative of radial movement of the robotic apparatus on the pipe.

In some embodiments, at least one of the first distance sensor and the second distance sensor may be a laser or ultrasonic time-of-flight sensor. In some embodiments, at least one of the first distance sensor and the second distance sensor may be a contact sensor comprising a contact member biased to maintain contact with the surface of the pipe and a sensor configured to measure a position of the contact member as a proxy for the distance measurement. The contact member, in some embodiments, may be an angularly-deflecting member or a linearly deflecting member.

The first distance sensor and the second distance sensor, in various embodiments, may be offset from a centerline of the robotic apparatus and may configured to measure the distance between their respective fixed positions and surfaces on either side of a centerline of the pipe. The processor, in an embodiment, may be configured to determine a direction and magnitude of the radial movement based on the distance measurements provided by the first distance sensor and the second distance sensor. In an embodiment, the processor may be configured to determine a diameter of the pipe based on the distance measurements provided by the first distance sensor and the second distance sensor.

The system, in various embodiments, may further comprise a third distance and a fourth distance sensor, each configured to be coupled with the robotic apparatus at a fixed position and to measure a distance between its respective fixed position and a surface of the pipe. The first distance sensor and the second distance sensor may be positioned proximate a first end of the robotic apparatus and the third distance sensor and the fourth distance sensor are positioned proximate a second, opposing end of the robotic apparatus. The processor may be configured to monitor the distance measurements provided by the first distance sensor, the second distance sensor, the third distance sensor, and the fourth distance sensor as the robotic apparatus moves along the pipe; detect a change in the distance measurements provided by at least one of the first distance sensor, the second distance sensor, the third distance sensor, and the fourth distance sensor; and determine whether a diameter of the pipe changed at the axial location at which the processor detected the change in the respective distance measurements, and if not, determine that the change in the respective distance measurements are indicative of radial movement of a corresponding end of the robotic apparatus on the pipe. The processor, in an embodiment, may be configured to determine a direction and magnitude of radial movement at the first end of the pipe based on the distance measurements provided by the first distance sensor and the second distance sensor and to determine a direction and magnitude of radial movement at the second end of the pipe based on the distance measurements provided by the third distance sensor and the fourth distance sensor. The processor, in an embodiment, may be configured to determine a diameter of the pipe at the axial location associated with the first end of the pipe based on the distance measurements provided by the first distance sensor and the second distance sensor, and to determine a diameter of the pipe at the axial location associated with the second end of the pipe based on the distance measurements provided by the third distance sensor and the fourth distance sensor.

The first distance sensor and the second distance sensor, in various embodiments, may be positioned proximate opposing ends of the robotic apparatus. The processor may be configured to monitor the distance measurements provided by the first distance sensor and the second distance sensor as the robotic apparatus moves along the pipe, detect a change in the distance measurements provided by at least one of the first distance sensor and the second distance sensor, and determine whether a diameter of the pipe changed at the axial location at which the processor detected the change in the respective distance measurements, and if not, determine that the change in the respective distance measurements are indicative of radial movement of a corresponding end of the robotic apparatus on the pipe.

The processor, in various embodiments, may be configured to determine whether a diameter of the pipe changed at the axial location at which the processor detected the change in the distance measurements by comparing an axial location of the robotic apparatus on the pipe with a known axial location(s) of any diameter changes in the pipe. The processor, in various embodiments, may be configured to determine whether a diameter of the pipe changed at the axial location at which the processor detected the change in the distance measurements by measuring a diameter of the pipe at the axial location and comparing the diameter measurement to a known or measured diameter of the pipe upstream from the axial location.

The processor, in various embodiments, may be further configured to automatically correct the radial movement by (i) estimating a magnitude and direction of the radial movement based on the measured distances provided by each respective distance sensor, (ii) determining, based on the estimated magnitude and direction of the radial movement, a respective direction, speed, and duration for which to operate one or more wheels of the robot to overcome the radial movement, and (iii) operating the one or more wheels according to the estimated direction, speed, and duration.

In another aspect, the present disclosure is directed to a system for tracking a position of a robotic apparatus on a pipe, comprising a first mecanum wheel and a second mecanum wheel, each mecanum wheel configured to be freely-rotating and including a plurality of rollers disposed about a circumference of the respective mecanum wheel, the rollers of the first mecanum wheel having an orientation mirroring that of the rollers of the second mecanum wheel; at least one sensor configured to measure rotation of the first mecanum wheel and the second mecanum wheel; and a processor configured to calculate a linear displacement of each respective mecanum wheel based on the measured rotation of each respective wheel and a diameter of each respective wheel, and calculate a resulting axial position and circumferential position of the robotic apparatus on the pipe based on the calculated linear displacements of the first mecanum wheel and the second mecanum wheel.

The first mecanum wheel and the second mecanum wheel, in various embodiments, may have axes of rotation parallel to one another and perpendicular to a longitudinal axis of the pipe. The at least one sensor, in various embodiments, may include at least one rotary encoder. The system may further comprise one or more members configured to bias the first and second mecanum wheels against a surface of the pipe.

In yet another aspect, the present disclosure is directed to a method for navigating a bend or curve of a pipe with a robotic apparatus, comprising generating a computer model of the robotic apparatus and a computer model of the bend or curve of the pipe; performing a computer simulation to identify a combination of wheel speeds at which to rotate respective wheels of the computer model of the robotic device that results in each wheel of the model of the robotic apparatus remaining in constant contact with a surface of the model of the pipe throughout the length of the bend or curve of the model of the pipe; and operating the wheels of the robotic apparatus according to the identified combination of respective wheel speeds to navigate the bend or curve in the pipe without losing contact between each of the wheels and the surface of the pipe.

The robotic apparatus, in various embodiments, may include a first wheel configured for positioning on a first side of the pipe corresponding with an outer radius of the bend or curve in the pipe, and a second wheel and a third wheel, each configured for positioning on a second, opposing side of the pipe corresponding with an inner radius of the bend or curve in the pipe. The identified combination of respective wheel speeds, in various embodiments, may include slowing sharply the second wheel as it enters the bend or curve and gradually accelerating the second wheel to the same speed of the first wheel, and slowing gradually the third wheel as it enters the bend or curve and accelerating sharply the third wheel the same speed of the first wheel.

BRIEF DESCRIPTION OF THE DRAWINGS

Illustrative, non-limiting example embodiments will be more clearly understood from the following detailed description taken in conjunction with the accompanying drawings.

FIG. 4B is a perspective view of a wheel assembly in accordance with an embodiment of the present disclosure;

FIG. 5A, FIG. 5B, and FIG. 5C depict various views of a robotic apparatus attached to a pipe in accordance with an embodiment of the present disclosure;

FIG. 20 and FIG. 21 depict side views of the prototype of a robotic apparatus, with wheels aligned for straight travel along a pipe, in accordance with an embodiment of the present disclosure;

FIG. 32A, FIG. 32B, and FIG. 32C depict an embodiment of another fail-safe mechanism 160, in accordance with an embodiment of the present disclosure;

DETAILED DESCRIPTION

Figure 1B:
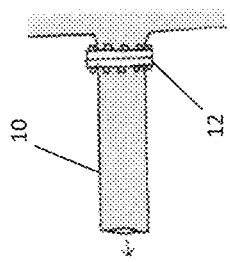
FIG. 1A, FIG. 1B, FIG. 1C, FIG. 1D, and FIG. 1E illustrate various obstacles that may be found along a piping system.
Figure 1D:
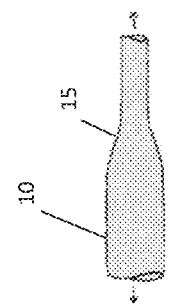
Figure 1E:
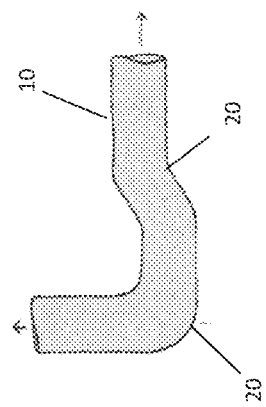
Figure 1A:
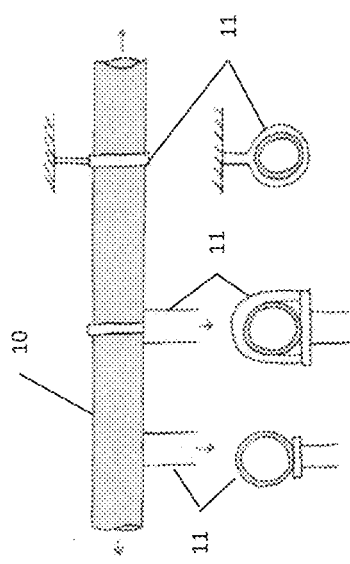
Figure 1C:
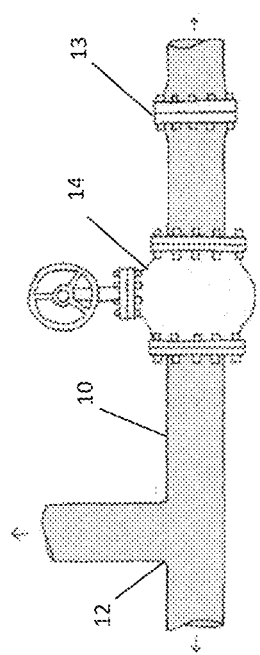

Embodiments of the present disclosure are directed to a robotic apparatus for traversing the exterior of piping systems, such as ones commonly found in chemical plants, power plants, manufacturing plants, and infrastructure. Piping systems can be complex and present various obstacles that can make it difficult to traverse individual pipes in an efficient and effective manner. For example, as shown in FIG. 1A, FIG. 1B, FIG. 1C, FIG. 1D, and FIG. 1E, representative obstacles may include supports 11 (FIG. 1A), junctions 12 (FIG. 1B and FIG. 1C), flanges 13 (FIG. 1C), valves 14 (FIG. 1C), vents or bleeders (similar to smaller valves), changes in diameter 15 (FIG. 1D), and bends 16 (FIG. 1E), amongst others. Various embodiments of the robotic apparatus may be configured to traverse pipes 10 and navigate such obstacles as encountered through a unique architecture and approach, as later described in more detail.

Embodiments of the present disclosure are directed to a robotic apparatus that may also traverse the exterior of other structures that are similarly shaped, such as structural cables (e.g. on suspension bridges), structural beams, powerlines, underwater cables and underwater piping systems.

Embodiments of the present disclosure may be useful in many applications including, without limitation:

Pipeline inspection using cameras, non-destructive testing (NDT or NDI), or other sensors;
Inspecting equipment in the vicinity of the piping system
Performing maintenance on the piping system (e.g., cleaning the external surface, removing insulation, applying a patch/clamp to stop a leak)
Transporting tools or equipment along the piping system (e.g., facilitating installation of sensors on the pipe).

Various embodiments of the robotic apparatus may be capable of traversing pipes arranged in any orientation (including horizontal and vertical), and pipes made of any material (e.g., steel, aluminum), even those with insulation about the exterior of the pipe. Insulation is typically a semi-rigid material, such as a mineral wool or calcium silicate, protected by a thin metal jacket, such as aluminum or stainless steel.

Generally speaking, embodiments of the robotic apparatus of the present disclosure may attach to a pipe by applying a clamping force on opposing sides of the pipe. Various embodiments may be capable of holding a static position on the pipe and may support its own weight on a range of pipe sizes in any orientation (e.g., horizontal or vertical). The robotic apparatus, in various embodiments, may be configured to drive along a path in the longitudinal direction of the pipe, as well as along a helical path (i.e., circumferential and longitudinal), on pipes of varying sizes and orientation. Such maneuvering, in combination with the ability to expand or contract the clamping mechanism around the pipe, and an open-sided architecture, may allow the robotic apparatus to navigate a variety of bends and obstacles encountered along the length of the pipe. A low profile of the robotic apparatus may enable it to drive along pipes in close proximity to other pipes or obstacles situated close by, and an optional fail-safe mechanism may be included to prevent the robotic apparatus from falling to the ground in the event its wheels decoupled from the pipe. The robotic apparatus may additionally be capable of actively sensing and controlling the amount of clamping force it exerts on the pipe, thereby minimizing the risk that its wheels slip along the pipe while ensuring that the robotic apparatus does not damage the pipe or insulation. Further, the robotic apparatus may be capable of actively sensing whether the wheels slip on the pipe surface and actively control individual wheels to steer the robotic apparatus back to the centerline of the pipe.

In various embodiments, the robotic apparatus may be configured to carry and deploy a payload along the pipe, such as cameras (e.g. visual spectrum and IR cameras), various sensors like NDT sensors (e.g., ultrasonic testing probes, pulsed eddy current probes, digital radiography equipment, acoustic sensors) and gas monitors for the purpose of inspecting the piping system or equipment in its vicinity, and/or other payloads like tools and equipment. The robotic apparatus, in various embodiments, may include an onboard power supply (e.g., batteries) and operate via wireless communication with an operator, thereby obviating the need for a power cord or tether.

High-Level Architecture

Figure 2:
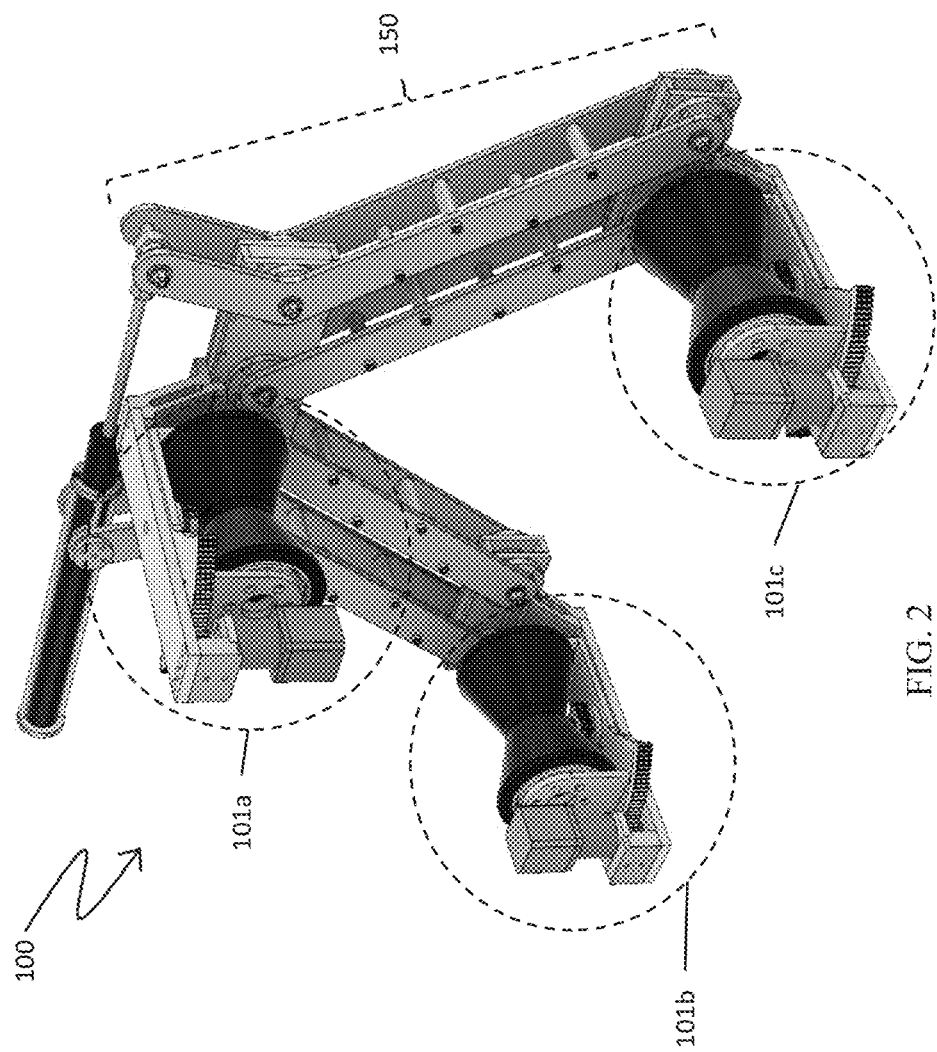
FIG. 2 is a perspective view of a robotic apparatus in accordance with an embodiment of the present disclosure.

Referring now to FIG. 2, robotic apparatus 100 of the present disclosure may generally include two or more wheel assemblies 101 configured for positioning on opposing sides of pipe 10, and a clamping mechanism 150 for adjusting the distance between the two or more wheel assemblies to secure robotic apparatus 100 to pipe 10. One or more wheels of the two or more wheel assemblies 101 may be powered such that robotic apparatus may traverse along pipe 10 in a longitudinal direction. The wheels, in various embodiments, may be reoriented to allow robotic apparatus 100 to move along a helical path on pipe 10, and thereby position robotic apparatus 100 to pass over a particular portion(s) of pipe 10 and/or avoid an obstacle(s) extending from a surface of pipe 10, as later described in more detail.

FIG. 3A, FIG. 3B, FIG. 3C, and FIG. 3D depict several views of a representative embodiment of robotic apparatus 100. The representative embodiment shown includes three wheel assemblies 101a, 101b, 101c arranged in a triangular configuration in a common plane ("wheel engagement plane" 104), such that wheel assembly 101a is positioned for engaging a first side of pipe 10, and wheel assemblies 101b, 101c are positioned for engaging a second, opposing side of pipe 10. Clamping mechanism 150 is offset from the wheel engagement plane 104 and couples wheel assemblies 101a, 101b, 101c. As configured, wheel assemblies 101a, 101b, 101c may traverse along an outer portion of pipe 10, while the offset positioning of clamping mechanism 150 allows clamping mechanism 150 to travel through the air or water alongside pipe 10. The present configuration provides robotic apparatus 100 with an open side 102 (as best seen in FIG. 5C), situated opposite clamping mechanism 150, through which an obstacle extending from the outer surface of pipe 10 may pass unobstructed, thereby allowing robotic apparatus to traverse such obstacles on pipe 10 as later described in more detail.

Wheel Assembly 101

Still referring to FIG. 3A, FIG. 3B, FIG. 3C, and FIG. 3D, each wheel assembly 101 may generally include a wheel 110 and an alignment mechanism 120. Generally speaking, wheel 110 may be configured to engage and rotate along an outer surface of pipe 10, and alignment mechanism 120 may be configured to adjust an orientation of wheel 110 and thereby define a path to be followed by robotic apparatus as it traverses pipe 10.

Wheel 110, in various embodiments, may include any rotatable body suitable for engaging and rotating along an outer surface of pipe 10. To that end, wheel 110 may generally include a rotating body with a contact surface 112, and may be rotatably coupled with a wheel frame 114.

Wheel 110 may be of any shape and construction suitable for the aforementioned purpose such as, without limitation, disc- or cylindrical-shaped. While standard wheels may be utilized, in various embodiments, it may be advantageous for wheel 110 to have a shape specifically designed to accommodate, and thereby more effectively engage, the rounded shape of the outer surface of pipe 10. To that end, in various embodiments, contact surface 112 may be substantially inverted (e.g., v-shaped, hourglass shaped), with contact surface 112 having a concave curvature dimensioned to conform to the rounded shape of pipe 10. As best shown in FIG. 5C, the hourglass shape of contact surface 112 may serve to maximize the contact area between wheel 110 and pipe 10 compared with a standard cylindrical wheel with a flat or convex contact surface, as the hourglass shaped contact surface 112 of the present disclosure essentially wraps around the curvature of pipe 10, providing contact with not just the center of the pipe, but also with the top quarters as well. By enhancing overall contact area between wheel 110 and pipe 10, more friction is available to securely couple robotic apparatus 100 to pipe 10. By distributing the contact area between wheel 110 and pipe 10 around the circumference of the pipe, wheel 110 has a favorable lever arm to support off-axis forces, such as the typical force from the clamping mechanism. Thus, the wheel's shape allows robotic apparatus 100 to maintain a given circumferential orientation on pipe 10 (e.g., upright, canted diagonally) without slipping upside-down on pipe 10.

Further, the hourglass shape of contact surface 112, in various embodiments, may act to automatically center wheel 110 along a longitudinal centerline of pipe 10, as shown in FIG. 5C. As configured, wheel 110 may be less likely to disengage from pipe 10 entirely, as contact between the inwardly sloping contact surface 112 and the rounded surface of pipe 10 may bias wheel 110 to center itself over the longitudinal centerline of pipe 10. This may be particularly beneficial in embodiments in which wheel assemblies 101 are arranged within a common engagement plane 104, as shown, since such a configuration generally clamps on pipe 10 from two radial directions instead of three or more radial directions were wheel assemblies 101 to be positioned in more than two circumferential positions about pipe 10. Still further, contact surface 112 may be shaped and dimensioned such that it functions effectively on a range of pipe sizes. The straight edges of the wheel profile, as seen from a direction normal to the concentric axis of the wheel, may be purposefully chosen so that the angular distance between the contact points with respect to the center of the pipe is constant for any pipe size. However, the linear distance between the contact points increases with the pipe size in a manner such that the range of pipe sizes on which wheel 110 is effective is limited by the total width of wheel 110.

The shape of contact surface 112 may be especially suitable for helical motion around a pipe, including the helical motion that robotic apparatus 100 may exhibit. Consider the plane that includes the central axis of the wheel and a vector that is normal to the surface of the pipe. When the wheel is oriented to drive straight along the longitudinal axis of the pipe the cross-section of the pipe in the aforementioned plane is a circle. When the wheel is oriented to drive at an angle with respect to the longitudinal axis of the pipe the cross-section of the pipe in the aforementioned plane is an ellipse. This effectively changes the curvature of the section of the pipe that the wheel is driving on, similar to how a change in pipe size changes the pipe's curvature. Similar to how the wheel can adapt to a range of pipe sizes, it can also adapt to a range of turning angles that effectively change the curvature of the pipe under the wheel. In general, the contact area between the wheel and the pipe increases as the curvature decreases. Hence, the contact area increases as the pipe size increases and as the angle between the wheel's direction of travel and the longitudinal axis of the pipe increases.

Alignment mechanism 120, in various embodiments, may include any mechanism suitable for adjusting an orientation of wheel 110, and thereby define a path to be followed by robotic apparatus as it traverses pipe 10. In particular, alignment mechanism 120, in various embodiments, may be configured to adjust the orientation of an associated wheel 110 rotationally, with respect to an axis that is normal to pipe 10, to steer robotic apparatus along pipe 10. That is, alignment mechanism 120, in various embodiments, may adjust the orientation of an associated wheel 110 about a yaw axis 103 of robotic apparatus 100 (shown in FIG. 3C, FIG. 5C, FIG. 8A, FIG. 8B, FIG. 8C, FIG. 8D, FIG. 8E, and FIG. 8F) such that wheel 110 is reoriented clockwise or counterclockwise about an axis extending normal to the underlying surface of pipe 10. As configured, alignment mechanism 120 may adjust wheel 110 orientation to traverse pipe 10 along a straight pathway (i.e., wheel 110 orientation aligned with yaw axis 103 of robotic apparatus 100 and longitudinal axis of pipe 10) or along a helical pathway (i.e., yawed wheel 110 orientation, adjusted clockwise or counterclockwise relative to an axis extending normal to the underlying surface of pipe 10).

Referring to FIG. 4B, in an embodiment, alignment mechanism 120 may include a motor 122 and a base plate 124 to which wheel frame 114 may be rotatably coupled. Motor 122 may engage wheel frame 114 to rotate wheel frame relative to base plate 124, and thereby adjust an orientation of wheel 110 relative to base plate 124. In the embodiment shown, base plate 124 may be fixedly coupled to clamping mechanism 150, and wheel 110 may be reoriented relative to robotic apparatus as a whole. To facilitate engagement between motor 122 and wheel frame 114, each may be provided with gear teeth 123, 116, respectively, which may be interfaced with one another such that rotation of motor 122 causes rotation of wheel frame 114 about an axis normal to base plate 124. Of course, this is merely an illustrative embodiment of a suitable mechanism for adjusting an orientation of wheels 110 of robotic apparatus 100, and one of ordinary skill in the art will recognize other suitable alignment mechanisms within the scope of the present disclosure.

In certain scenarios, one or more alignment mechanisms 120 may be configured to individually adjust the respective orientations of wheels 110 by different amounts and/or in different directions. When all wheels 110 are turned by the same amount in the same clockwise or counter-clockwise direction, robotic apparatus 100 may travel along a helical pathway. In contrast, when wheels 110 are oriented in opposite directions, such that the wheels 110 on one side of pipe 10 turn in one direction (e.g. clockwise) and the wheels on the opposite side of pipe 10 turn in the opposite direction (e.g. counter-clockwise), robotic apparatus 100 may travel along a different pathway. In the latter case, wheels 110 may travel such that robotic apparatus 100 moves along the longitudinal axis of pipe 10 and translates sideways with respect to the same axis. This may be beneficial if wheels 110 slip, for example due to the weight of robotic apparatus 100, away from the centerline of pipe 10. This method for self-adjusting the position of robotic apparatus 100 on the pipe is later illustrated in FIG. 15A, FIG. 15B, FIG. 15C, and FIG. 15D.

According to exemplary embodiments of the present disclosure, the angular orientation of the wheels may "lock" once axial movement of robotic apparatus 100 on pipe 10 commences. In this way, the desired travel pattern, e.g., helical travel with a 5° off-axis alignment of wheels 110, may be maintained as robotic apparatus 100 moves along pipe 10. Various locking features may be employed to detachably secure wheel frame 114 (and thus wheel 110) in the desired angular orientation, as will be apparent to persons skilled in the art.

Wheel assembly 101, in various embodiments, may further include a motor 130 for driving rotation of wheel 110. Motor 130 may include any motor such as, without limitation, a brushed or brushless DC motor or the like, suitable for driving rotation of an associated wheel 110 of wheel assembly 101.

Figure 3A:
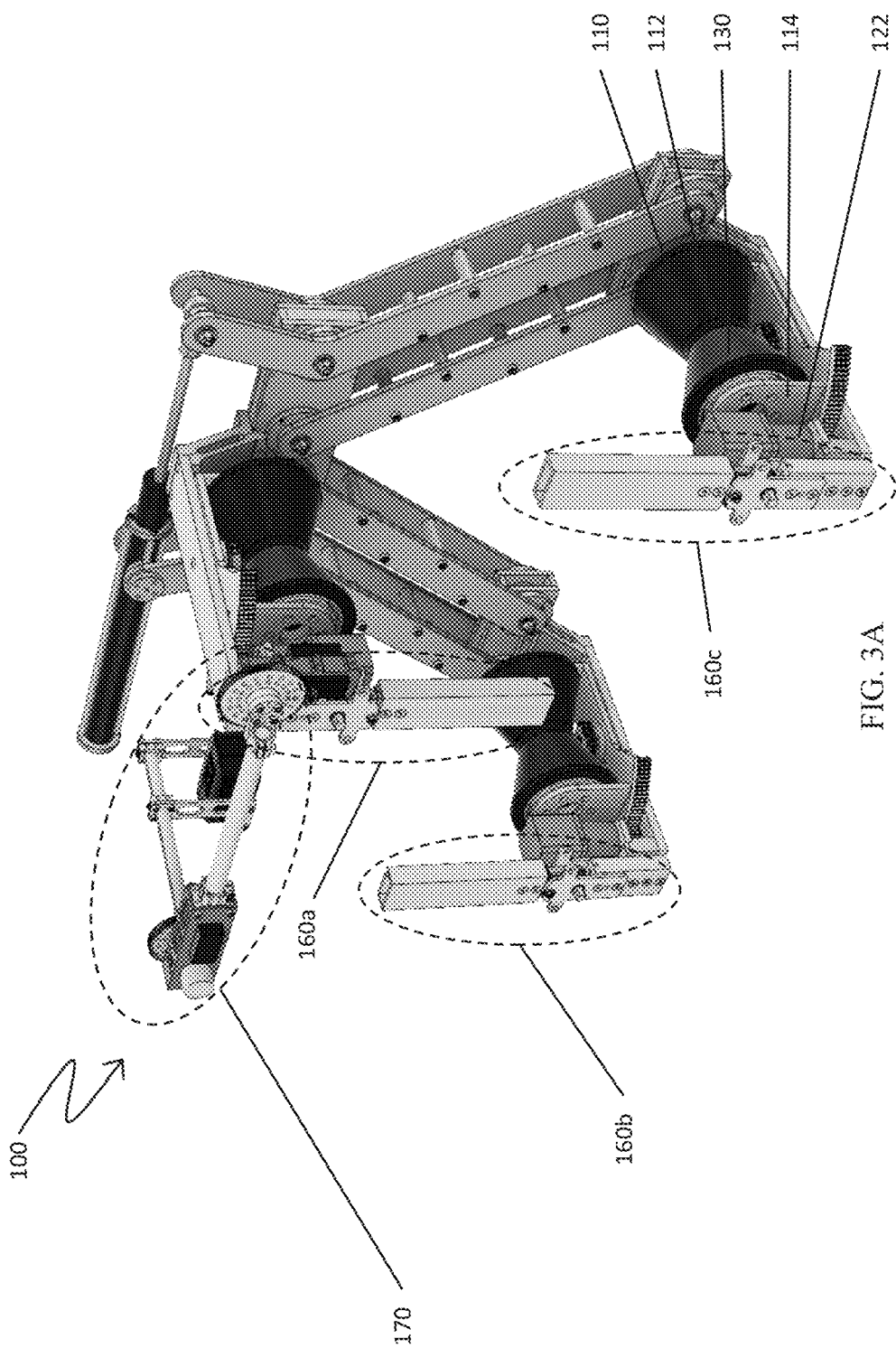
FIG. 3A, FIG. 3B, FIG. 3C, and FIG. 3D depict various views of a robotic apparatus in accordance with an embodiment of the present disclosure.
Figure 3B:
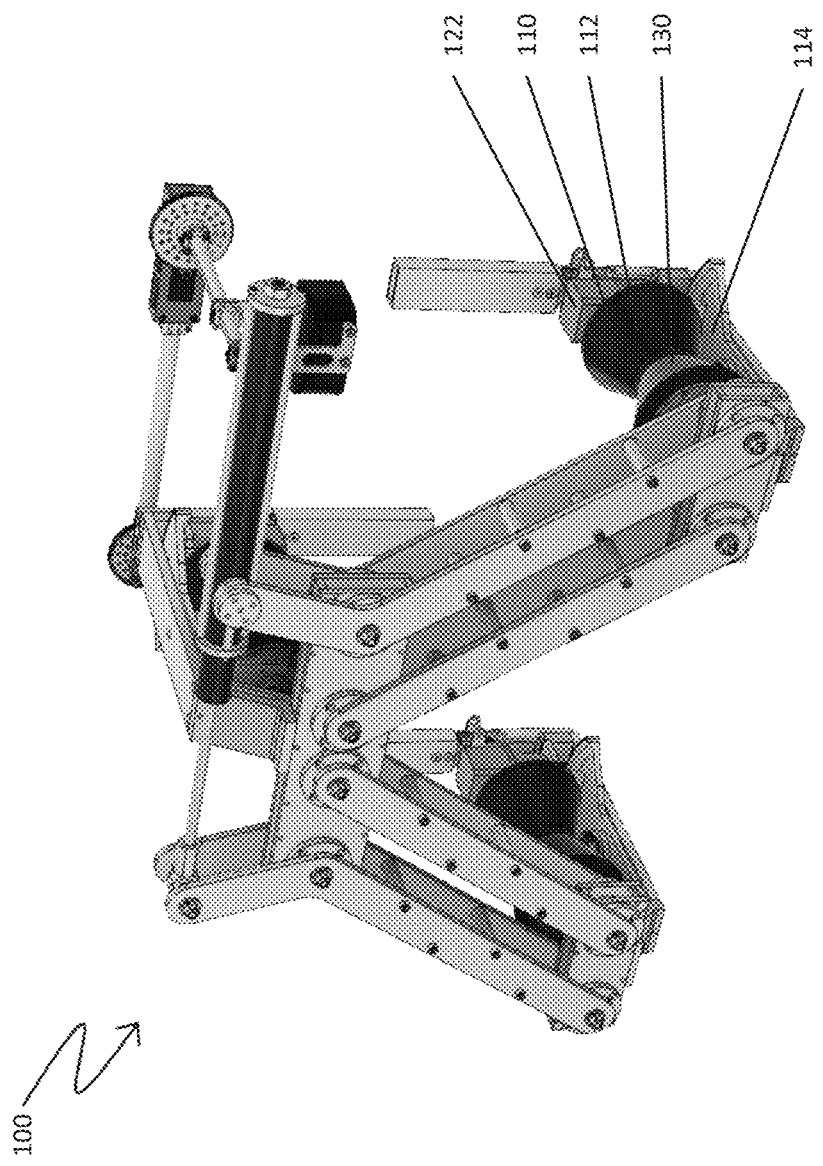
Figure 3C:
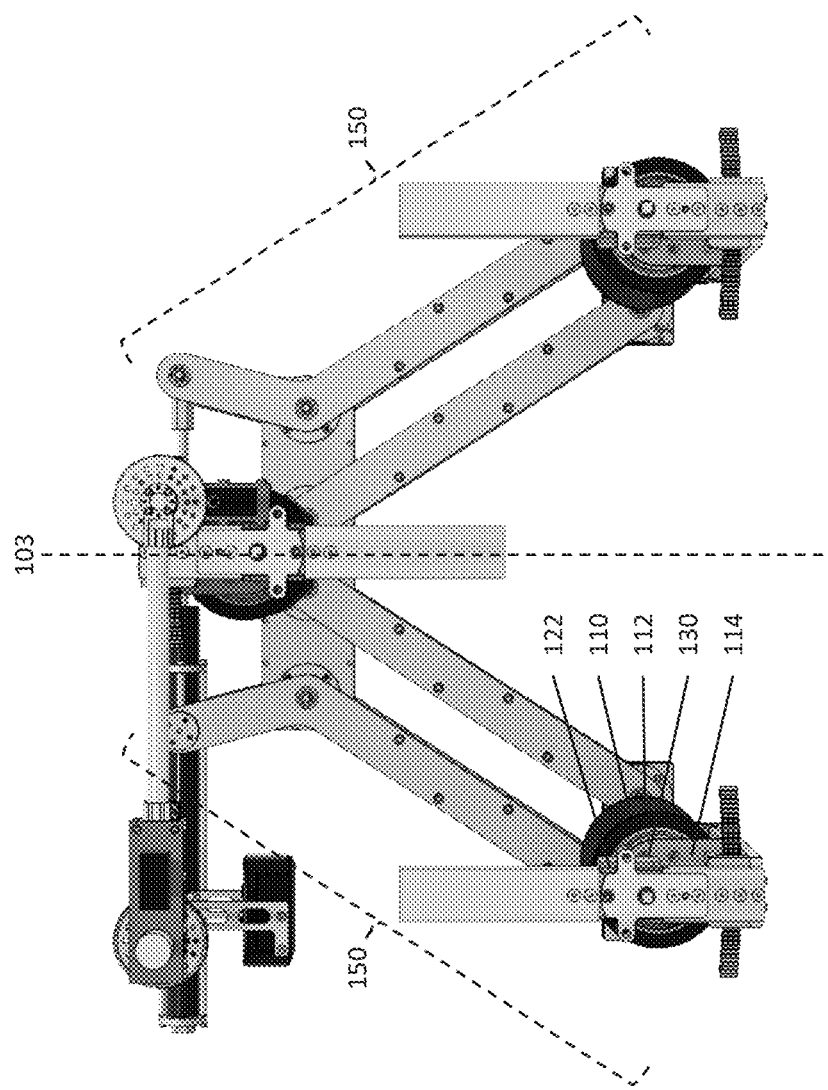
Figure 3D:
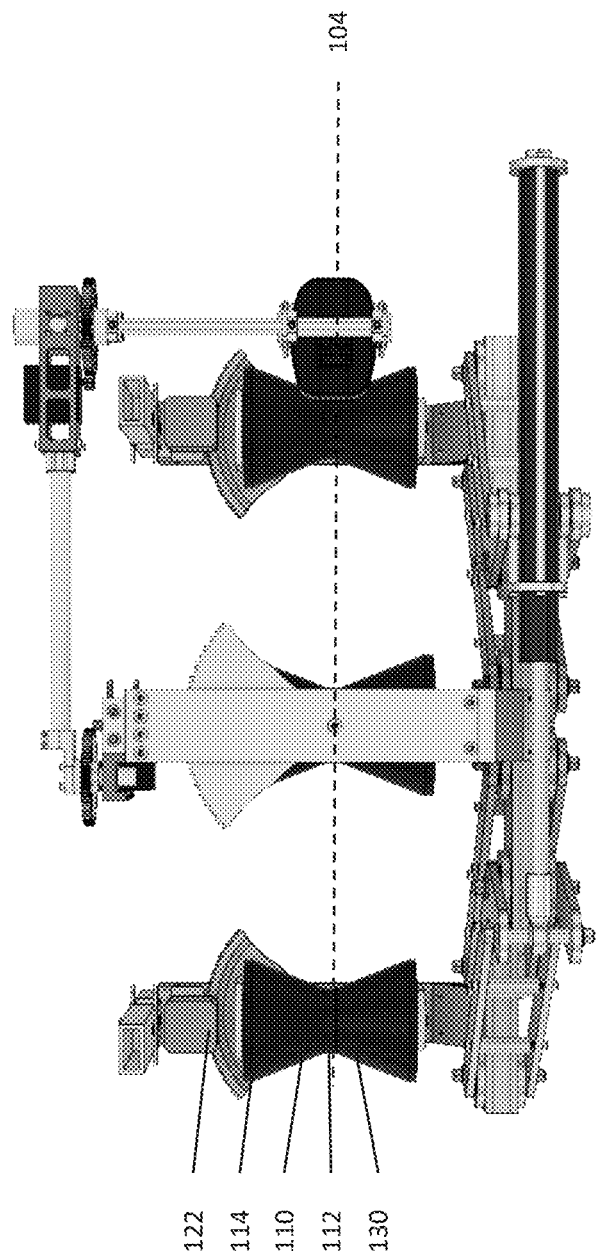
Figure 4A:
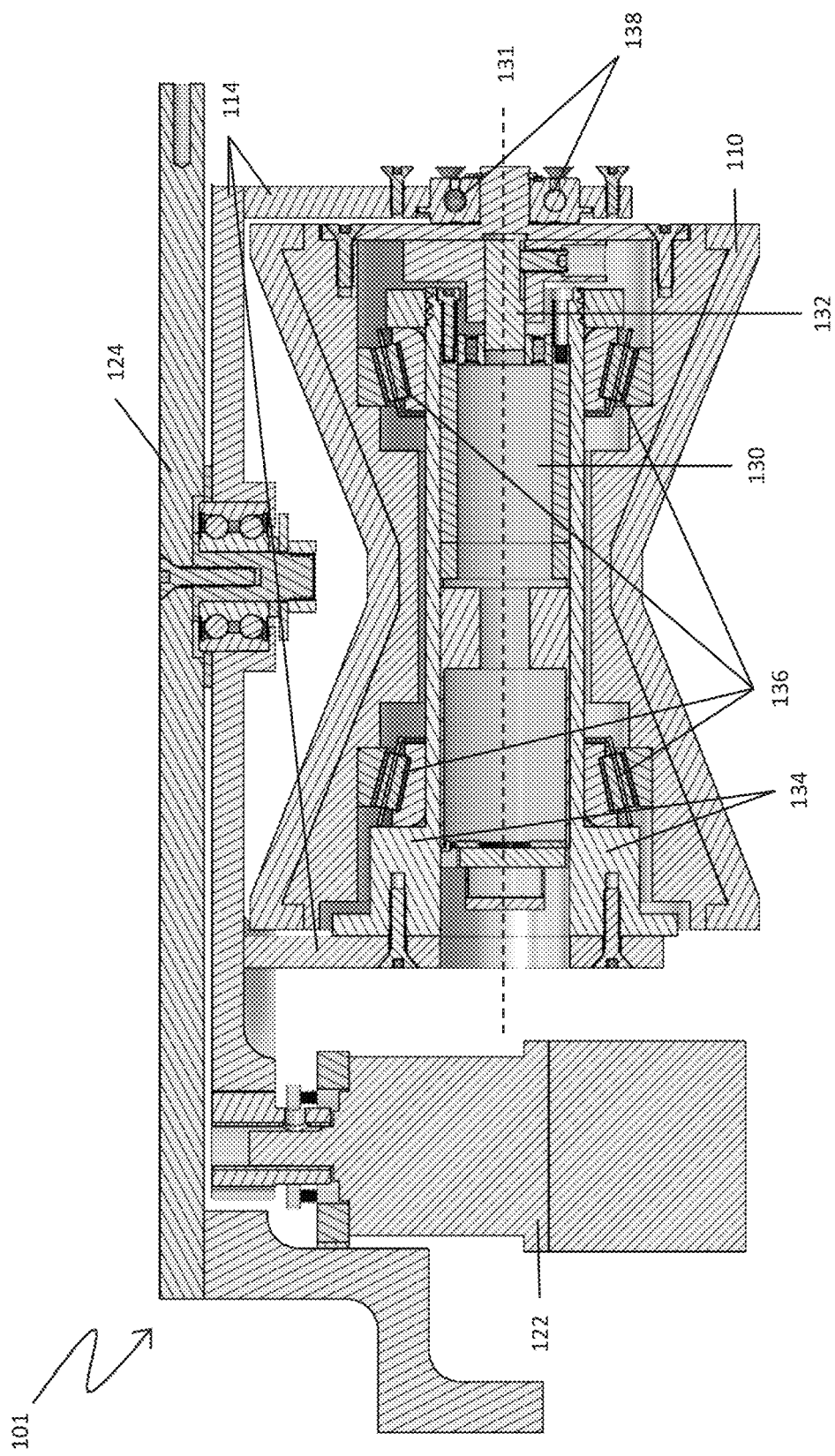
FIG. 4A is a cutaway view of an internal motor within a wheel in accordance with an embodiment of the present disclosure.

As shown in FIG. 3A, FIG. 3B, and FIG. 3C, in various embodiments, motor 130 may be positioned external to wheel 110 and connected thereto via a traditional drive train for rotating wheel 110. Motor 130, in other embodiments, may instead be packaged within wheel 110, as shown in FIG. 4A and FIG. 4B. In particular, motor 130 may be placed inside wheel 110 with its output shaft 132 concentric to the rotation axis 131 of wheel 110, as shown. Motor 130 may be rigidly mounted to a cylindrical housing 134, which is designed to attach to wheel frame 114. As configured, cylindrical housing 134 may act as a shaft that supports wheel 110 through a set of bearings (e.g. tapered roller bearings) 136 while allowing wheel 110 to rotate with respect to cylindrical housing 134. Output shaft 132 of motor 130 may be coupled to wheel 110, as shown, so that motor 130 can control the rotation of wheel 110. Output shaft 132 of motor 130, in various embodiments, may also be favorably supported by wheel frame 114 through an additional bearing (e.g. roller bearing) 138.

Wheel assembly 101 may further include one or more controllers (not shown) for controlling operation of motor(s) 130, such as rotational speed, torque, and the like. The controllers may receive commands from various locations. For example, one of the controllers mounted with respect to robotic apparatus 100 may function as a "master" controller, and the other controllers may function as "slave" controllers, such that the slave controllers respond to commands received from the master controller. Alternatively, each of the controllers may operate independently and may receive independent commands. The commands may be remotely transmitted, e.g., by wireless (or wired) communication, as is known in the art. The commands may also be pre-programmed, in whole or in part, in the controller(s), e.g., time-based commands to operate according to clock-based criteria.

Although exemplary robotic apparatus 100 is depicted with three motors 130, the disclosed apparatus may be implemented such that a motor is provided for less than all wheels associated with the apparatus. For example, a single drive motor 130 associated with a single wheel 110 may be provided, and the other wheels 110 may rotate in response to movement that is initiated by the single motor 130 (and associated wheel 110). Similarly, a pair of motors 130 may be provided for an apparatus that includes three wheels 110, such that two wheels 110 may receive drive force from associated motors 130, while the third wheel 110 rotates in response to movement of the apparatus relative to the pipe 10.

In exemplary embodiments of the present disclosure, the relative speed of the individual wheels 110 may be controlled so as to enhance the operation of the apparatus. For example, it may be desired to drive the center wheel (e.g., that of wheel assembly 101a) faster than either of the outer wheels (e.g., those of wheel assemblies 101b, 101c) when navigating a turn or bend in the pipe 10. In such circumstance, the controllers may be programmed to increase the drive force to the center wheel 110 and/or reduce the drive force to outer wheel(s) 110. Alternatively, it may be desirable to drive the outer wheels 110 faster than the center wheel 110 when navigating a turn or bend in the pipe 10. In such circumstance, the controllers may be programmed to increase the drive force to the outer wheel(s) 110 and/or reduce the drive force to the center wheel 110. The noted adjustments may be initiated manually, e.g., by an operator, or may be initiated automatically, e.g., based on sensing mechanism(s) associated with the assembly that identify a turn/bend in the pipe 10 (e.g., based on sensing of the angular orientation of one or more aspects of the apparatus).

Clamping Mechanism 150

Figure 5A:
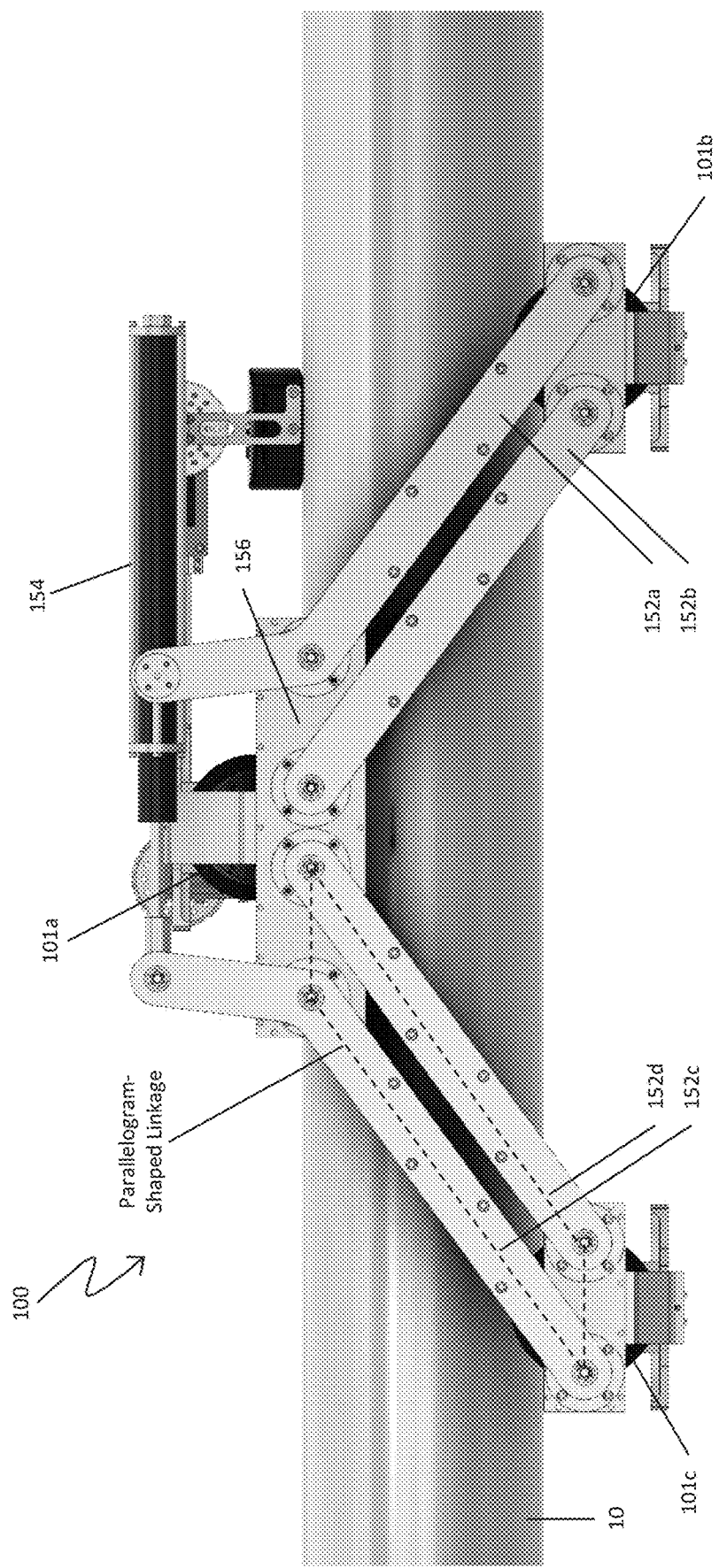
Figure 5B:
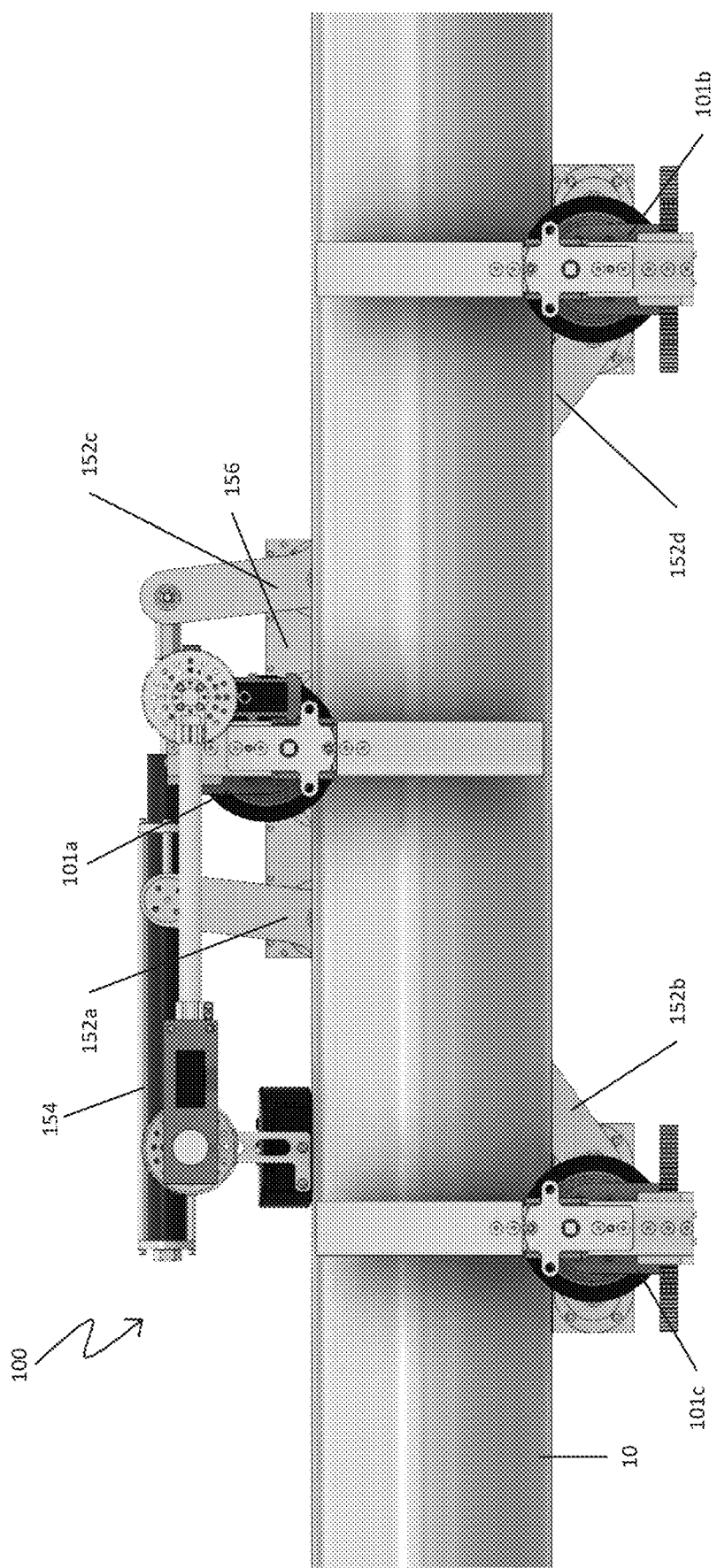

Referring ahead to FIG. 5A, FIG. 5B, and FIG. 5C, clamping mechanism 150 of robotic apparatus 100, in various embodiments, may generally include one or more arm members 152 and one or more biasing members 154. Arm member(s) 152, in various embodiments, may connect wheel assemblies 101 on opposing sides of pipe, and biasing member(s) 154 may apply a pulling or pushing force on arm members 152 that causes the wheel assemblies to engage the opposing sides of pipe 10, thereby securing robotic apparatus 100 to pipe 10 as later described in more detail.

Arm members 152, in various embodiments, may be arranged in pairs, with the members of a given pair arranged parallel to one another and separated by a gap, as shown in FIG. 5A. The ends of each member 152 in a given pair may be rotatably coupled with the associated wheel assemblies 101 such that the given pair forms a parallelogram-shaped four bar linkage between the corresponding wheel assemblies 101. The parallelogram-shaped linkage, in an embodiment, may act to keep the connected wheel assemblies 101 in parallel alignment with one another on either side of pipe 10 regardless of the relative positions of the connected wheel assemblies 101 (which may change with pipe diameter, as later described). By keeping the connected wheel assemblies 101 in parallel alignment with one another on opposing sides of pipe 10, the associated wheels 110 may more effectively engage the surface of pipe 10 and securely couple robotic apparatus 100 thereto. Additionally, keeping the connected wheel assemblies 101 in parallel alignment with one another is important for the alignment mechanism 120 to function properly. That is, yaw axis 103 about which alignment mechanism 120 turns wheel 110 should be normal to the surface of pipe 10.

For example, in FIG. 5A, arm members 152a, 152b form a pair with the aforementioned arrangement, and connect wheel assembly 101a with wheel assembly 101b. As configured, wheel assembly 101b may pivot clockwise (e.g., up and to the left) relative to wheel assembly 101a to engage a narrow diameter pipe 10, or may pivot counterclockwise (e.g., down and to the right) relative to wheel assembly 101a to engage a larger diameter pipe, and vice versa. As wheel assemblies 101a, 101b pivot relative to one another, the parallelogram-shaped linkage formed by arm members 152a, 152b causes the connected wheel assemblies 101a, 101b to remain in parallel alignment with one another on either side of pipe 10, thereby ensuring that wheel 110 of each remains flush and engaged with pipe 10. Similarly, arm members 152c, 152d form a pair with the aforementioned arrangement, and connect wheel assembly 101a with wheel assembly 101c. As configured, wheel assembly 101c may pivot counterclockwise (e.g., up and to the right) relative to wheel assembly 101a to engage a narrow diameter pipe 10, or may pivot clockwise (e.g., down and to the left) relative to wheel assembly 101a to engage a larger diameter pipe, and vice versa. As wheel assemblies 101a, 101c pivot relative to one another, the parallelogram-shaped linkage formed by arm members 152b, 152c causes the connected wheel assemblies 101a, 101c to remain in parallel alignment with one another on either side of pipe 10, thereby ensuring that wheel 110 of each remains flush and engaged with pipe 10.

Of course, in various embodiments, a single arm member 152 (as opposed to the aforementioned pairs) may be used connect two wheel assemblies 101. In such embodiments (not shown), alternative approaches may be employed to maintain the connected wheel assemblies 101 in parallel alignment, if desired. For example, a single arm member 152 may be used with a pair of wires in the same plane as the aforementioned pairs. The wires may attach directly to wheel assemblies 101 on each side of arm member 152.

While arm member 152 would provide the necessary structural integrity, the wires would engage when arm member 152 pivoted and (based on the same kinematics as the parallelogram-shaped linkage) keep the connected wheel assemblies 101 in parallel alignment with one another. It should be recognized that two wires may be needed since wires typically only carry loads in tension, not compression.

Biasing members 154, in various embodiments, may be configured to apply a force for pulling opposing wheel assemblies 101 toward opposing sides of pipe 10 to secure robotic apparatus 100 to pipe 10. Biasing members 154 may include any mechanism suitable for this purpose such as, without limitation, a gas tension spring (shown in FIG. 5A, FIG. 5B, and FIG. 5C), tension springs (shown in FIG. 17), compression springs, torsion springs, or any combination thereof. Additionally or alternatively, biasing mechanisms 154 may include one or more active biasing members (as opposed to the immediately aforementioned passive biasing members) such as a motorized pulley system, motorized lead screw, or a pneumatic/hydraulic actuator, or the like.

Figure 6B:
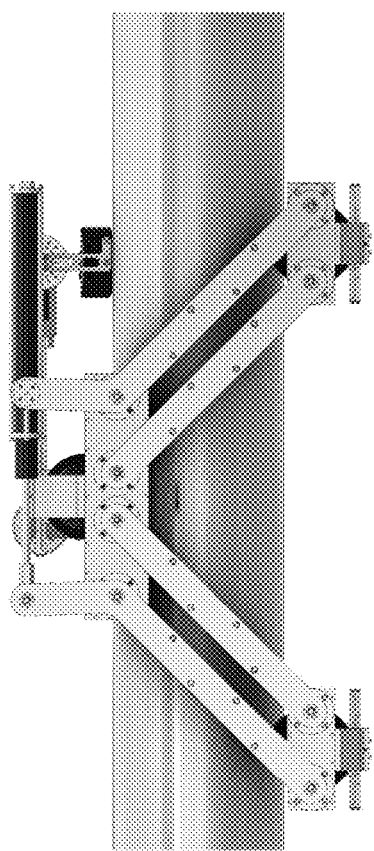
FIG. 6A and FIG. 6B depict a robotic apparatus on a smaller diameter pipe and a larger diameter pipe in accordance with an embodiment of the present disclosure.
Figure 6A:
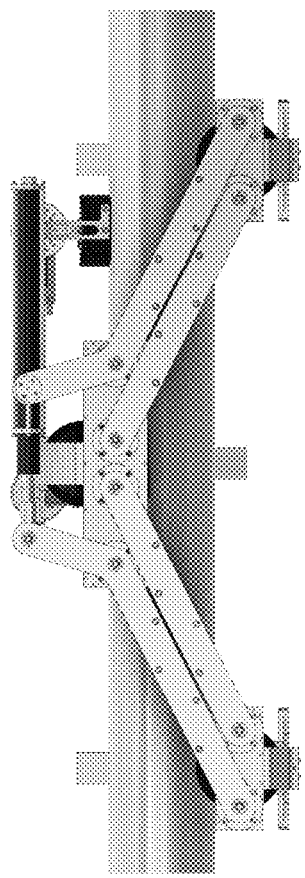
Figure 7:
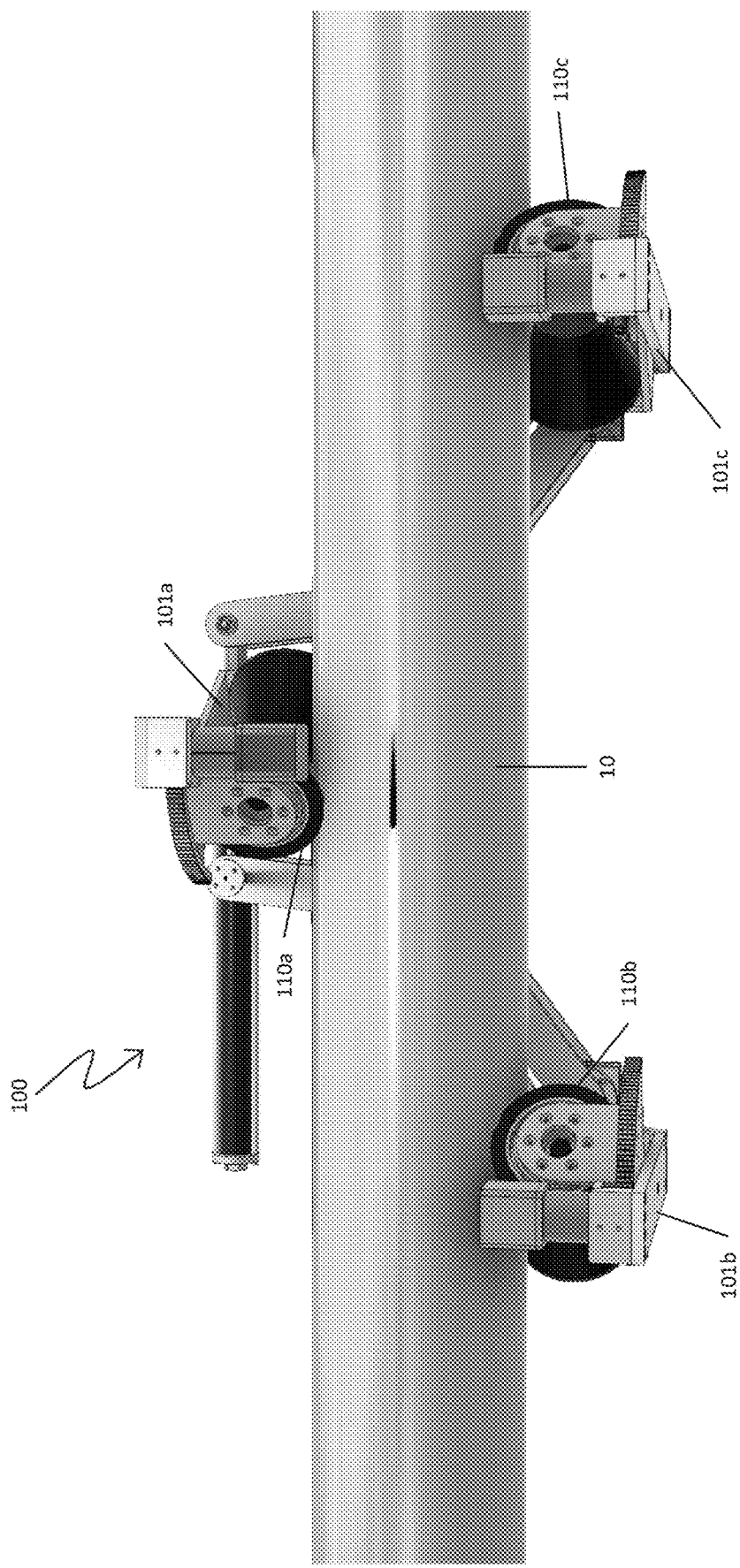
FIG. 7 illustrates a robotic apparatus with wheel alignment adjusted for helical travel along a pipe in accordance with an embodiment of the present disclosure.
Figure 8C:
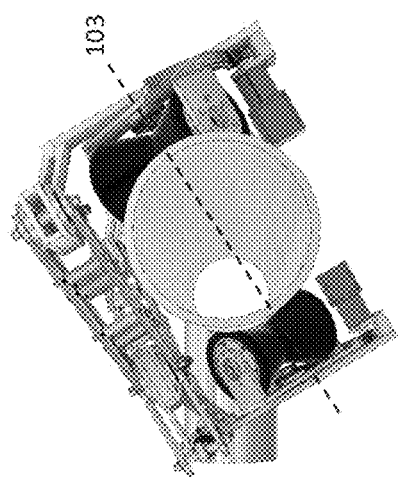
FIG. 8A, FIG. 8B, FIG. 8C, FIG. 8D, FIG. 8E, and FIG. 8F illustrate the robotic apparatus following a helical path to pass an obstacle in accordance with an embodiment of the present disclosure.
Figure 8F:
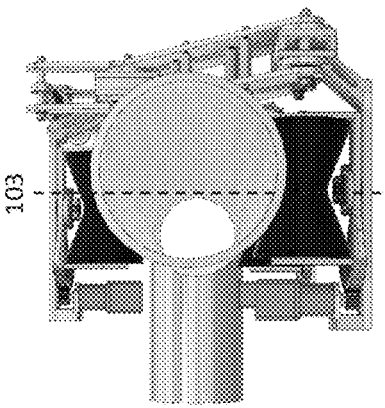
Figure 8B:
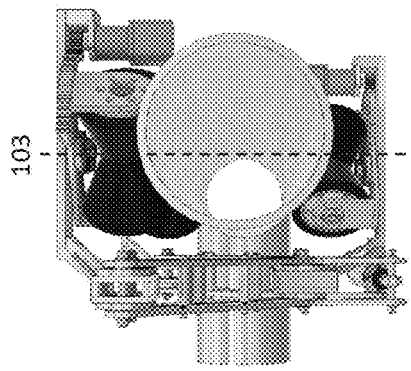
Figure 8E:
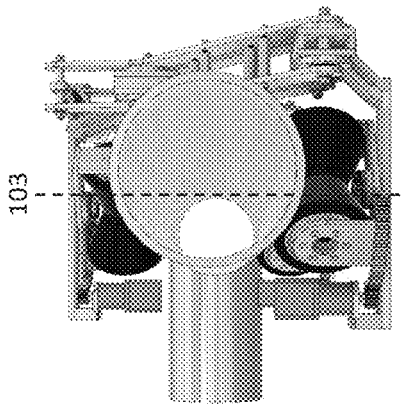
Figure 8A:
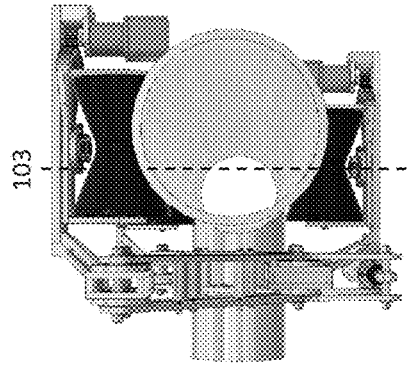
Figure 8D:
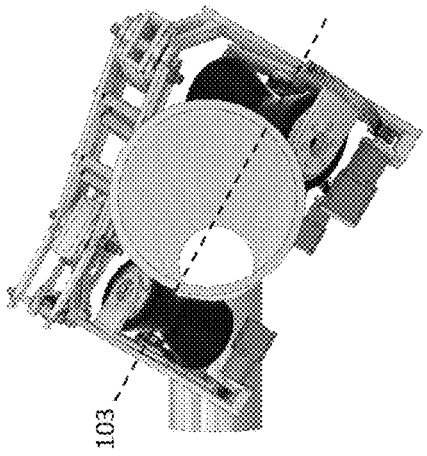

Clamping mechanism 150 as configured may automatically adjust the positions of wheel assemblies 101 relative to one another to accommodate pipes of varying diameters. For example, robotic apparatus 100 may compress significantly to accommodate small diameter pipes, resulting in a configuration in which wheel assemblies 101b, 101c are nearly coplanar with wheel assembly 101a along a longitudinal axis of pipe 10 (i.e., separated by the small diameter of pipe 10), but are situated far away from wheel assembly 101a along a longitudinal axis of pipe 10, as shown in FIG. 6A. Conversely, robotic apparatus 100 may expand significantly to accommodate large diameter pipes, resulting in a configuration in which wheel assemblies 101a, 101b, 101c are situated close to one another along a longitudinal axis of pipe 10, but wheel assembly 101a is situated far from wheel assemblies 101b, 101c (i.e., separated by the large diameter of pipe 10), as shown in FIG. 6B. Biasing members 154a, 154b, 154c, 154d, as configured, may continuously apply the pulling force between wheel assembly 101a and each of wheel assemblies 101b, 101c, thereby securely coupling (or "clamping") robotic apparatus 100 to pipe 10, regardless of its orientation about the circumference of pipe 10 and regardless of whether pipe 10 is oriented horizontally or vertically.

Referring back to FIG. 5A, FIG. 5B, and FIG. 5C, in a representative embodiment, biasing mechanism 154 may include a gas tension spring. As shown, the gas tension spring may couple the one or more arms 152 extending from wheel assemblies 101b, 101c to wheel assembly 101a. As the gas tension spring exerts a pulling force on the arm members 152 it creates a torque about the pivot points where the arm members 152 attach to the wheel assembly 101a. This torque will act to pull wheel assemblies 101b, 101c outwards and upwards relative to wheel assembly 101a, causing robotic apparatus 100 to compress onto pipe 10.

Figure 16:
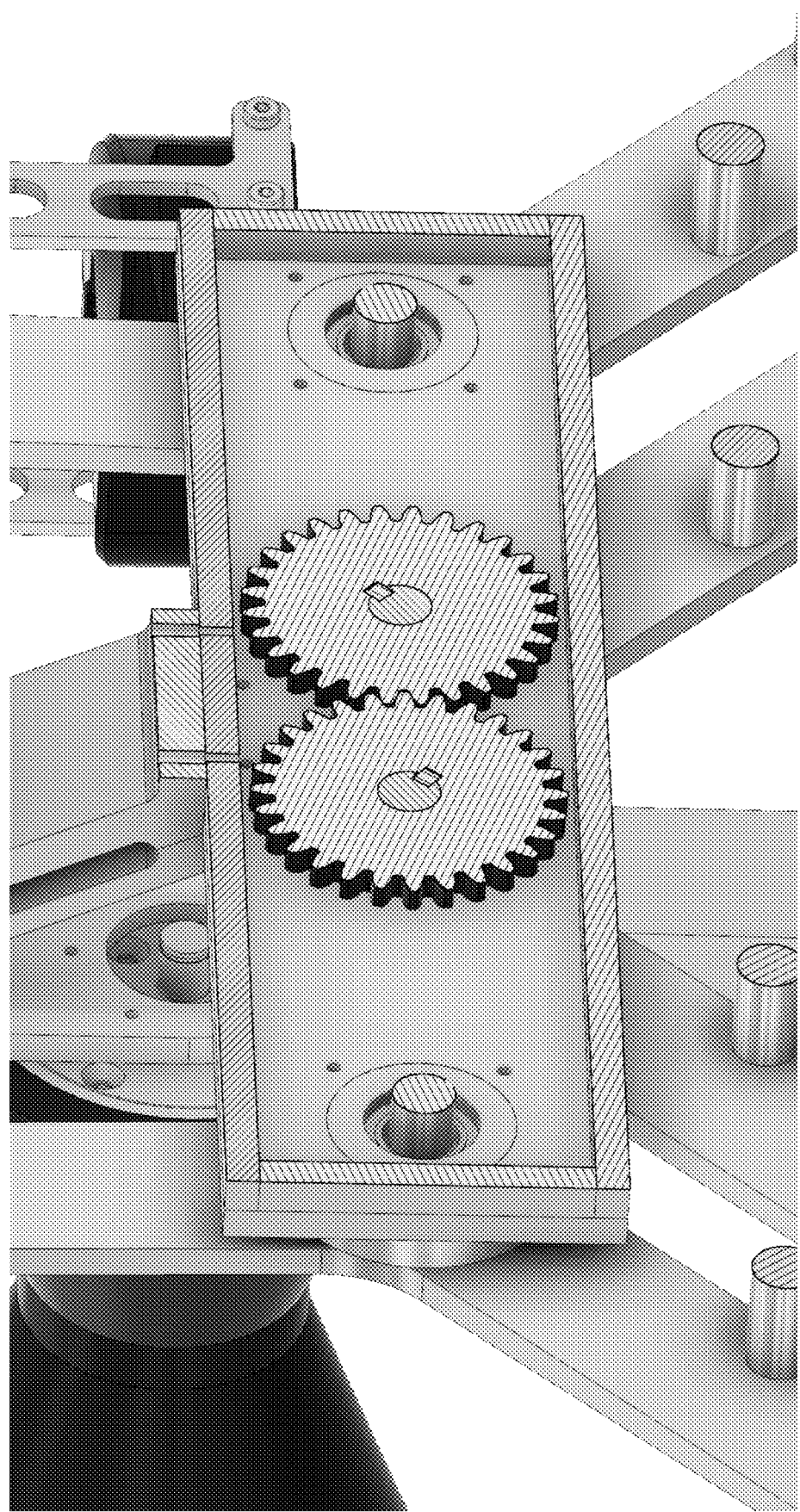
FIG. 16 is a cutaway view of gears of a clamping mechanism in accordance with an embodiment of the present disclosure.

Referring ahead to FIG. 16, in an embodiment, clamping mechanism 150 may include a set of gears that attach to the axles that connect the arm members 152b, 152d to the wheel assembly 101a. These gears are included to ensure that the arm members 152a, 152b, 152c, 152d pivot by the same angular displacement and the clamping mechanism 150 remains symmetrical with respect to wheel assembly 101a. The arm members 152 need to pivot by the same angular displacement so that the connected wheel assemblies 101 are not only in parallel alignment with respect to each other, but also with respect to pipe 10. In the alternative embodiment of FIG. 17 (later described), a specific mechanism is not needed to ensure that the member arms pivot equally. That is, if equal biasing members 154 connect the 101a wheel assembly to each of the sets of arm members 152 (in contrast to one biasing member that connects the arm members 152 directly to each other, as shown in FIG. 5A, FIG. 5B, and FIG. 5C) they will turn the arm members 152 by the same angular displacement since that is the energetically most favorable position.

In an alternative embodiment the biasing member(s) is an actively controlled actuator, such as a linear actuator (lead/ball/roller screw), rack-and-pinion, worm drive, or hydraulic/pneumatic actuator. The advantages of an actively controlled biasing member include the lower likelihood of exerting a force that is too small or too large. If the clamping force is too small the wheels will start to slip on the pipe. If the clamping force is too large it places unnecessary stress on the clamping mechanism and it increases the risk of deforming and/or damaging the pipe, the pipe insulation, or other equipment. With an actively controlled biasing member the force exerted can be adjusted in real time based on sensor values (e.g. wheel slip sensors), based on environmental conditions (e.g. higher clamping force is needed if rain makes the pipes slippery), and/or visual observations from the operator (e.g. lower clamping force is recommended if insulation deformation is observed). An actively controlled biasing member can also facilitate the process of attaching and detaching the robotic apparatus to the pipe, while a passive biasing member necessitates the use of a clamp or similar device to attach and detach the apparatus to the pipe. An actively controlled biasing member can also be designed to exert the appropriate force on a wide range of pipe sizes, while a passive biasing member usually has a more limited range of pipe sizes on which it exerts the appropriate amount of force. The two main disadvantages of an actively controlled biasing member are the following. Firstly, actively controlled actuators typically don't move as fast as passive biasing members. When the robotic apparatus drives around a bend it is especially important to be able to close the clamping mechanism quickly to maintain contact between the wheels and the pipe. Secondly, actively controlled apparatuses are mechanically and electronically more complex, and are therefore more prone to failure.

Figure 17:
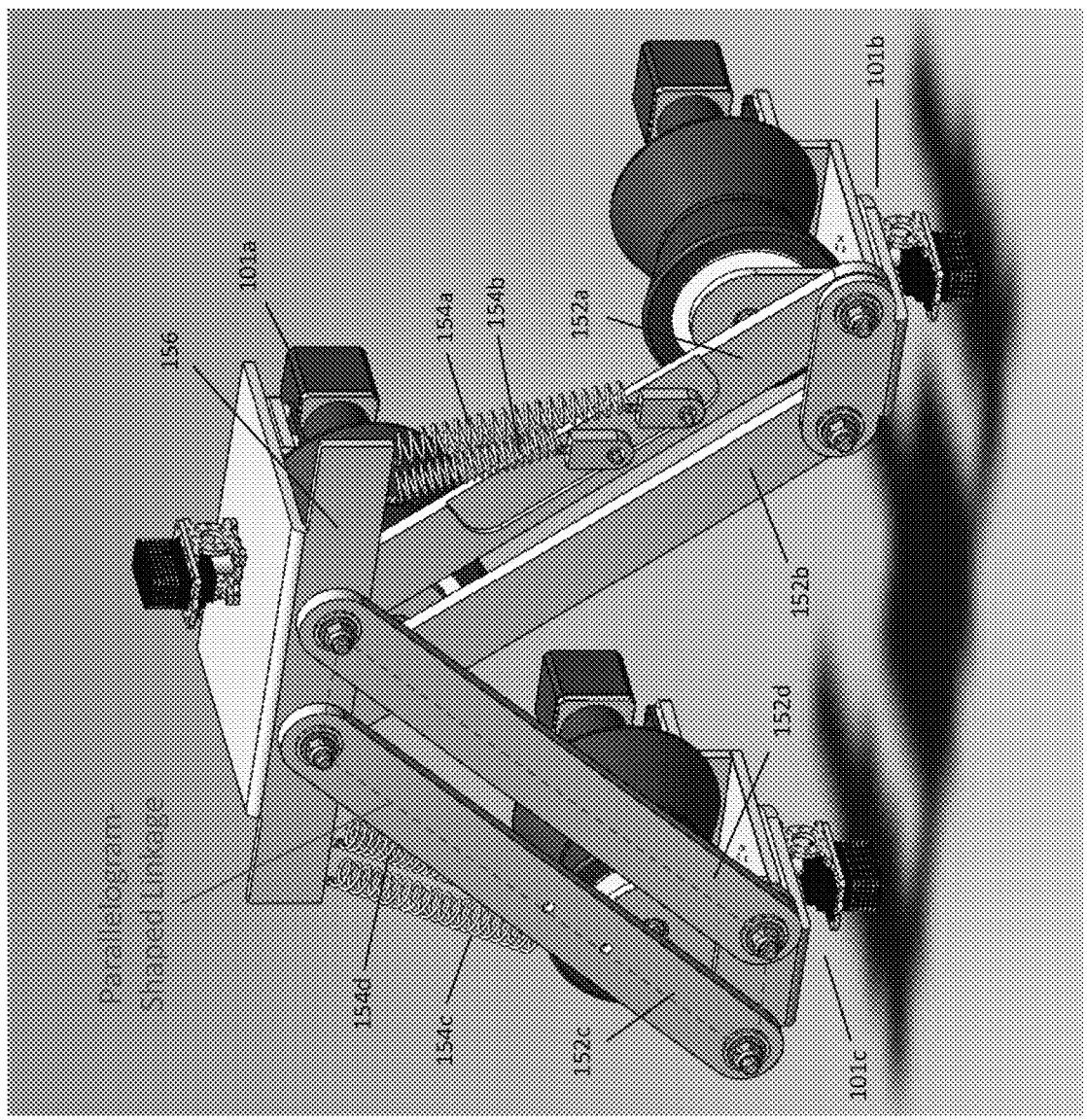
FIG. 17 is a perspective view of a clamping mechanism in accordance with an embodiment of the present disclosure.

Referring ahead to FIG. 17, in another alternative embodiment, one or more biasing members 154 may connect a wheel assembly 101 situated on a first side of pipe 10 with arm member(s) 152 extending to a wheel assembly 101 situated on a second, opposing side of pipe 10, as shown. Of course, in various embodiments, biasing members 154 may additionally or alternatively connect opposing wheel assemblies directly (or even associated structure) to similar effect. For example, in the embodiment of FIG. 17, biasing members 154a, 154b (shown here as tension springs) may connect wheel assembly 101a to arm members 152a, 152b extending to wheel assembly 101b, and biasing members 154c, 154d may connect wheel assembly 101a to arm members 152c, 152d extending to wheel assembly 101c. More specifically, first ends of biasing members 154a, 154b, 154c, 154d each connect to a strut 156 extending longitudinally from wheel assembly 101a, and second ends of biasing members 154a, 154b, 154c, 154d each connect to a mid or distal portion of arm members 152a, 152b, 152c, 152d, respectively. Such an arrangement ensures that the vectors of the associated pulling force generated by biasing members 154a, 154b and biasing members 154c, 154d will act to pull wheel assemblies 101b, 101c, respectively, outwards and upwards relative to wheel assembly 101a (while simultaneously pulling wheel assembly 101a downwards), causing robotic apparatus 100 to compress onto pipe 10 as shown in FIG. 17.

Figure 18:
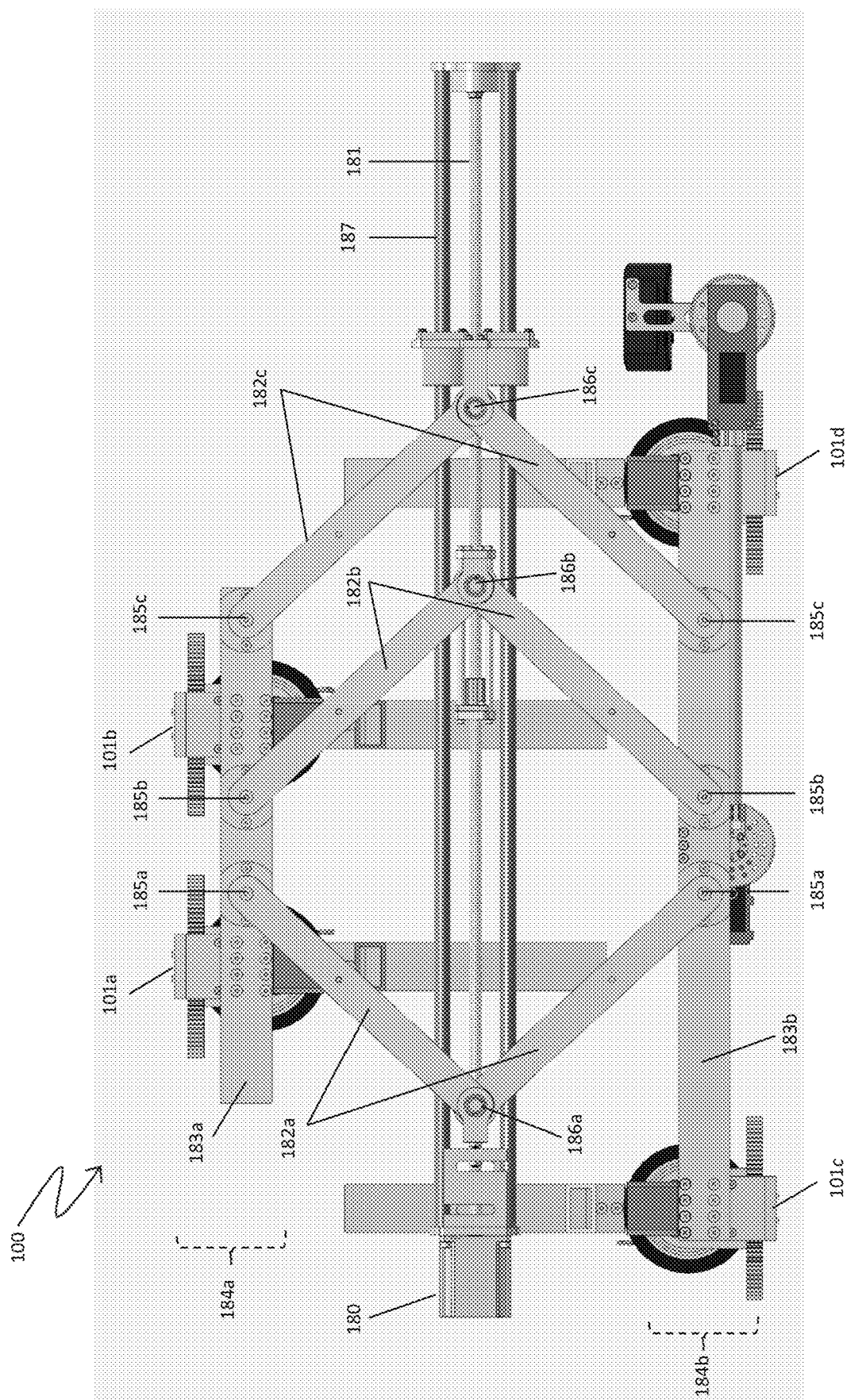
FIG. 18 is a side view of clamping mechanism in accordance with another embodiment of the present disclosure.

FIG. 18 illustrates yet another alternative embodiment of clamping mechanism 150. While this embodiment of clamping mechanism 150 is shown on a four-wheeled robotic apparatus 100, one of ordinary skill in the art will recognize that the present embodiment may be adapted to robotic apparatuses 100 having three wheels or greater than four wheels without diverging from the scope of the present disclosure.

In this embodiment, clamping mechanism 150 may generally include a motor 180 for driving a lead screw 181, which in turn moves a plurality of linear arm pairs 182a, 182b, 182c to expand or compress clamping mechanism 150. More specifically, wheel assemblies 101a and 101b may be coupled to a first frame 183a, thereby defining a first frame assembly 184a, and wheel assemblies 101c, 101d may be coupled to a second frame 183b, thereby defining a second frame assembly 184b. Each of the linear arms 182 may have a first end 185 rotatably coupled to either the first frame 183a or the second frame 183b, and a second end 186 rotatably and slidably coupled to a linear guide 187, as shown. Second ends 186 of at least some of the plurality of linear arms 182 may be operably coupled to lead screw 181 such that rotation of lead screw 181 causes the operably coupled second ends 186 to move from a first position on linear guide 187 to a second position on linear guide 187, thereby changing the angle of each of the linear arms 182 in each pair relative to one another. As the angle between of linear arm 182 of each pair changes, the distance between first frame assembly 184a and second frame assembly 184b is adjusted. For example, driving lead screw 181 in a first direction may cause the operably coupled second ends 186 to move inwards along linear guide 187, causing the angle between the linear arms 182 of each pair to increase as each arm 182 becomes more perpendicular to linear guide 187. This may cause first frame assembly 184a and second frame assembly 184b to move further away from linear guide 187, thereby expanding robotic apparatus 100. Conversely, driving lead screw 181 in a second, opposing direction may cause the operably coupled second ends 186 to move outwards along linear guide 187, causing the angle between the linear arms 182 of each pair to decrease as each arm 182 becomes more parallel to linear guide 187. This may cause first frame assembly 184a and second frame assembly 184b to move closer to linear guide 187, thereby compressing robotic apparatus 100. By adjusting the distance between the first frame assembly 184a and the second frame assembly 184b, clamping mechanism 150 can accommodate various diameter pipes 10 and navigate bends as shown in FIG. 19B and described throughout the present disclosure.

Figure 19A:
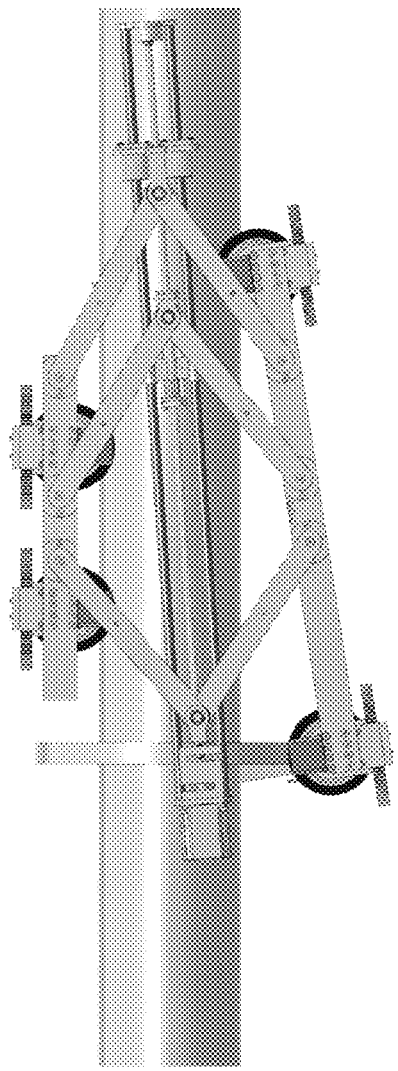
FIG. 19A depicts a robotic apparatus navigating a small protrusion from a pipe in accordance with an embodiment of the present disclosure.
Figure 19B:
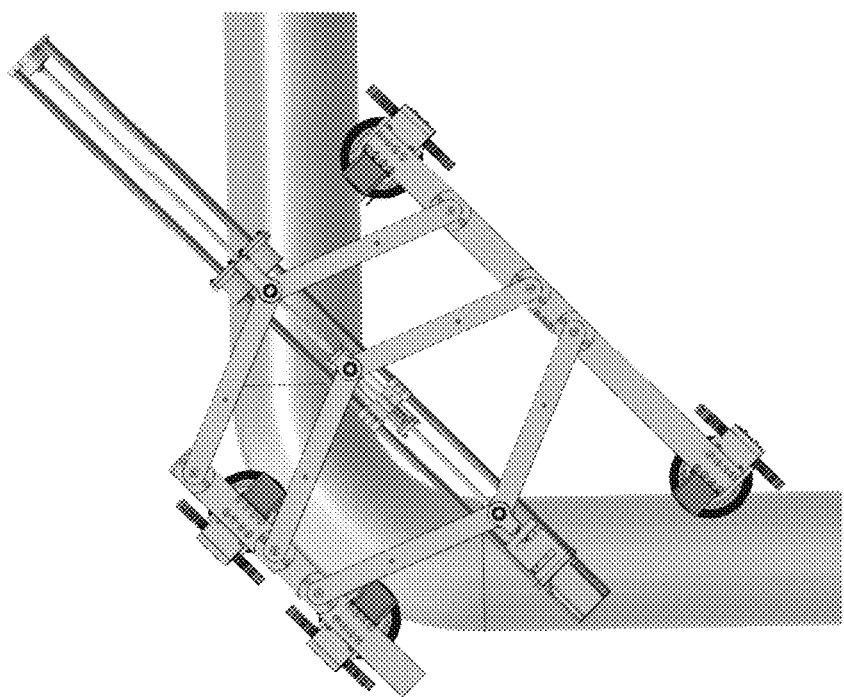
FIG. 19B depicts a robotic apparatus navigating a bend in a pipe in accordance with an embodiment of the present disclosure.

Referring now to FIG. 19A, additionally or alternatively, in an embodiment, less than all of second ends 186 may be operatively connected to lead screw 181. As configured, those second ends 182 not operatively connected to lead screw 181 may freely translate along linear guide 187 and thereby allow at least one of first assembly 184a and second assembly 184b to pivot relative to one another. This, in turn, may allow robotic apparatus to traverse small obstacles protruding from the pipe while maintaining all but one wheel 110 in contact with the surface of pipe 10 at all times. For example, still referring to FIG. 19A, wheel assembly 101c may climb the small protruding obstacle, causing second frame assembly 184b to pivot. This pivoting of second frame assembly 184b allows wheel assembly 101d to remain in contact with the underside of pipe 10. Further, the pivoting of second frame assembly 184b relative to first frame assembly 184a also allows wheel assemblies 101a, 101b to remain in contact with the upper side of pipe 10 while wheel assembly 101c traverses the obstacle. Similarly, frame assemblies 184a, 184b will pivot relative to one another as wheel assembly 101d subsequently traverses the obstacle and thus wheel assemblies 101a, 101b, and 101c will remain in contact with pipe 10.

Traversing Pipeline and Avoiding Obstacles

In operation, robotic apparatus 100 may be mounted on an exterior surface of pipe 10 and traverse pipe 10 to deliver, perform, and/or support various functionalities, such as inspecting pipe 10 for structural defects or corrosion, and sampling the surrounding environment for traces of fluids that may have leaked from pipe 10. In doing so, robotic apparatus 100 may at times may need to reposition itself circumferentially on pipe 10 to, for example, navigate one or more obstacles extending from pipe 10 or to inspect a particular side(s) of pipe 10. Similarly, at times it may be advantageous for robotic apparatus to corkscrew or otherwise follow a helical pattern about the exterior of pipe 10 when attempting to inspect the majority of the exterior of pipe 10 or the surrounding environment. Accordingly, robotic apparatus 100 of the present disclosure may be configured to traverse pipe 10 along straight and helical paths. Generally speaking, travel along these paths may be accomplished by driving one or more of wheels 110 using motor(s) 130 and steering wheels 110 using alignment mechanisms 120, as further described in more detail below.

To follow a straight path along pipe 10, alignment mechanisms 120 may orient wheels 110 to be aligned with the longitudinal axis of pipe, as shown in FIG. 5A, FIG. 5B and FIG. 5C. As configured, the hourglass shape (if equipped) may center wheels 110 on opposing sides of pipe 10 and steer robotic apparatus along a straight path such that wheels 110 continue following those particular opposing sides (e.g., the top and bottom of pipe 10 as shown).

Referring now to FIG. 7, FIG. 8A, FIG. 8B, FIG. 8C, FIG. 8D, FIG. 8E, and FIG. 8F, to follow a helical path, whether for the purposes of following a helical inspection pattern or simply to reposition robotic apparatus about the circumference of pipe 10, alignment mechanisms 120 may adjust the orientation of wheels 110 rotationally relative to yaw axis 103 of robotic apparatus 100, which in the present embodiment coincides with engagement plane 104. Alignment mechanisms 120, in various embodiments, may adjust the orientation of wheels 110 rotationally (i.e., clockwise or counter-clockwise). For example, in an embodiment, alignment mechanism 120 may adjust the orientation of wheels 110 to the left to guide robotic apparatus 100 along a helical path with coils moving in a counterclockwise direction about the circumference of pipe 10. Likewise, alignment mechanism 120 may adjust the orientation of wheels 110 to the right to guide robotic apparatus 100 along a helical path with coils moving in a clockwise direction about the circumference of pipe 10.

Alignment mechanisms 120, in various embodiments, may also adjust the orientation of wheels 110 to any suitable degree to control a pitch of the resulting helical path. For example, adjusting the orientation of wheels 110 to the left or right by a small amount (e.g., 5 degrees) may cause the resulting helical pathway to have a large pitch (i.e., large distance between adjacent coils), while adjusting the orientation of wheels 110 to the left or right by a large amount (e.g., 30 degrees) may cause the resulting helical pathway to have a small pitch (i.e., small distance between adjacent coils). Alignment mechanism 120, in various embodiments, may be configured to adjust the orientation of wheels 110 by up to 89 degrees relative to a longitudinal axis of pipe 10 and still follow a helical pattern; however, alignment mechanism 120 may more preferably be configured to adjust the orientation of wheels 110 from center by between about 1 degree and about 60 degrees. The greater the angle to which the wheels 110 are turned, the further apart the contact areas move on the wheel surface 112. In other words, if the wheel 110 is to stay in contact with the pipe 10 (and not only contact along the outer rims of the wheels 110) the total width of the wheel 110, the and the diameter of the pipe 10 put an upper limit on the angle to which the wheel 110 can be turned.

Referring now to FIG. 9A, FIG. 9B, FIG. 9C, FIG. 9D, FIG. 9E, FIG. 9F, FIG. 9G, FIG. 9H, FIG. 10A, FIG. 10B, FIG. 10C, FIG. 11A, FIG. 11B, FIG. 11C, FIG. 11D, FIG. 12A, FIG. 12B, FIG. 12C, and FIG. 12D, robotic apparatus 100, in various embodiments, may be repositioned about the circumference of pipe 10 to navigate past various obstacles, as described in more detail below.

Figure 9A:
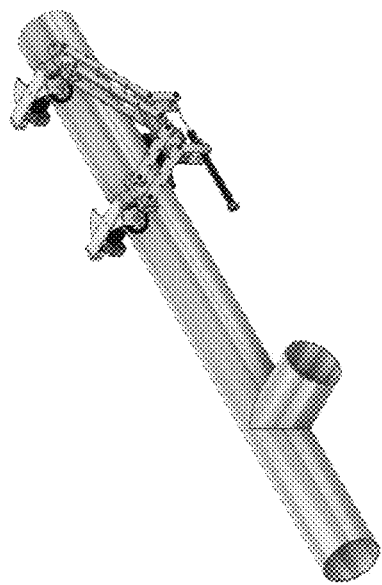
FIG. 9A, FIG. 9B, FIG. 9C, FIG. 9D, FIG. 9E, FIG. 9F, FIG. 9G, FIG. 9H illustrate the robotic apparatus passing an obstacle in accordance with an embodiment of the present disclosure.
Figure 9B:
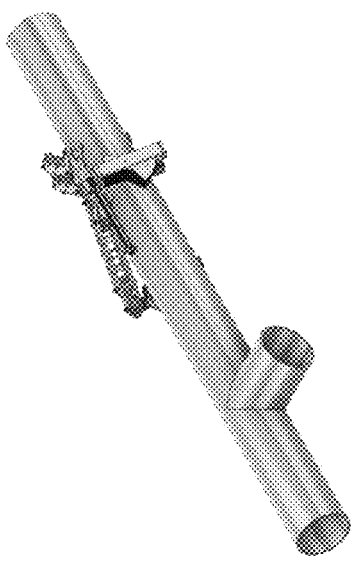
Figure 9C:
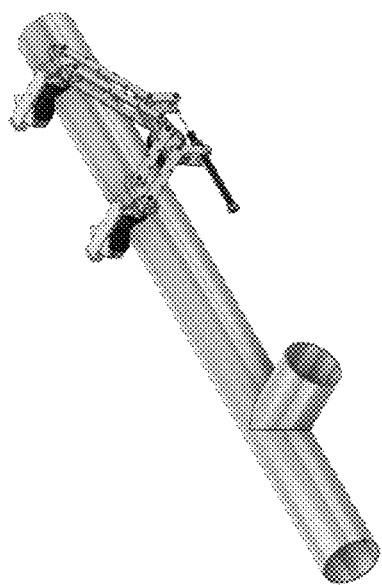
Figure 9D:
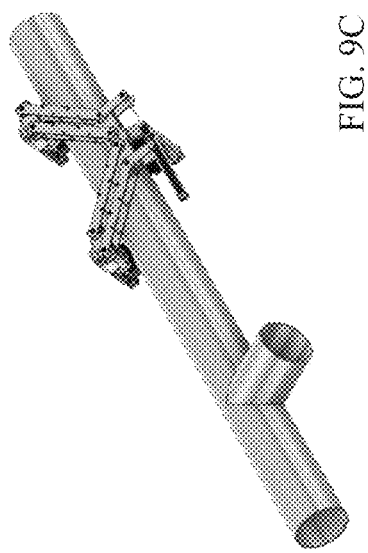
Figure 9E:
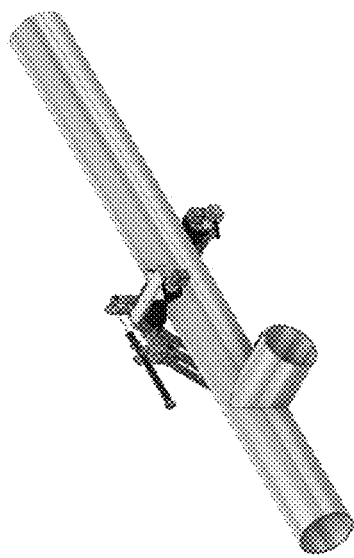
Figure 9F:
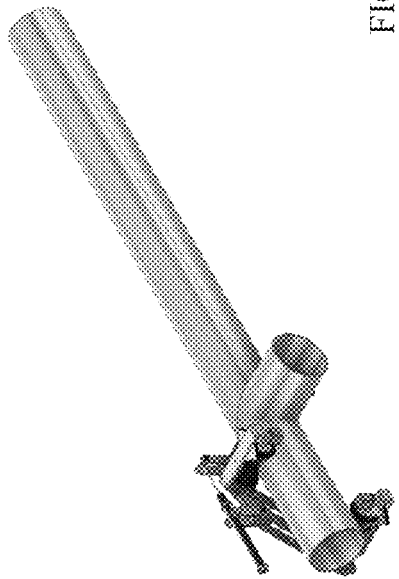
Figure 9G:
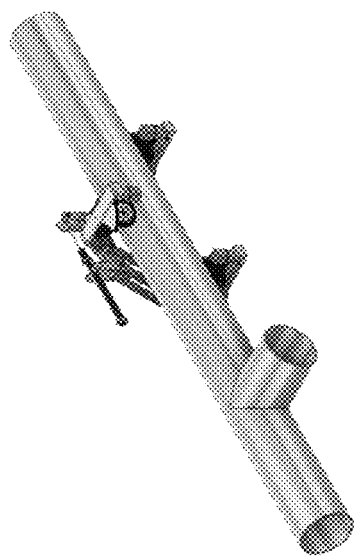
Figure 9H:
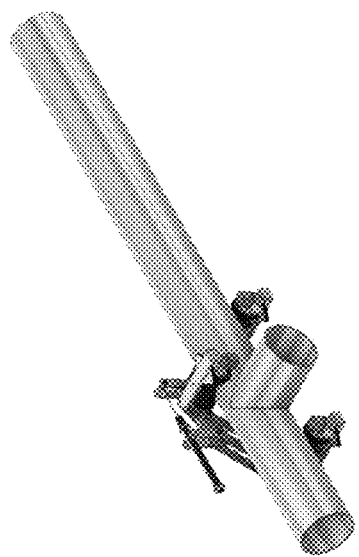

FIG. 9A, FIG. 9B, FIG. 9C, FIG. 9D, FIG. 9E, FIG. 9F, FIG. 9G, and FIG. 9H illustrate a representative approach for navigating a large unidirectional protrusion from pipe 10 such as pipe junctions and pipe supports using robotic apparatus 100. In FIG. 9A robotic apparatus 100 approached a large protruding obstacle. Its orientation is not suitable to pass the obstacle and it will go through the procedure to rotate to a suitable orientation for passing the obstacle. In FIG. 9B the robot has turned its wheels in place (to about 45 degrees) using the alignment mechanism that was described earlier in this disclosure. It turns the wheels so that it can commence the helical movement needed to change its orientation with respect to the pipe. In FIG. 9C it is starting to travel in a helical pathway along the pipe with the wheels kept at the same angle as in FIG. 9B. FIG. 9D shows the robot as it keeps driving in a helical pathway. It drives along the longitudinal axis and around the circumference of the pipe at the same time. In FIG. 9E the robot has reach the preferred orientation with respect to the obstacle. The open side of the robot is on the same side of the pipe as the obstacle. FIG. 9F shows how the robot employs the alignment mechanism to turn the wheels back to the default position, where the direction of travel is parallel with the longitudinal axis of the pipe. Once it is in the preferred orientation the robot keeps driving straight to pass the obstacle. FIG. 9G shows the robot as it starts to pass the obstacle and the obstacle protrudes through the open side of the robot. FIG. 9H shows how the robot has passed the obstacle and it returns to its normal operation.

Figure 10C:
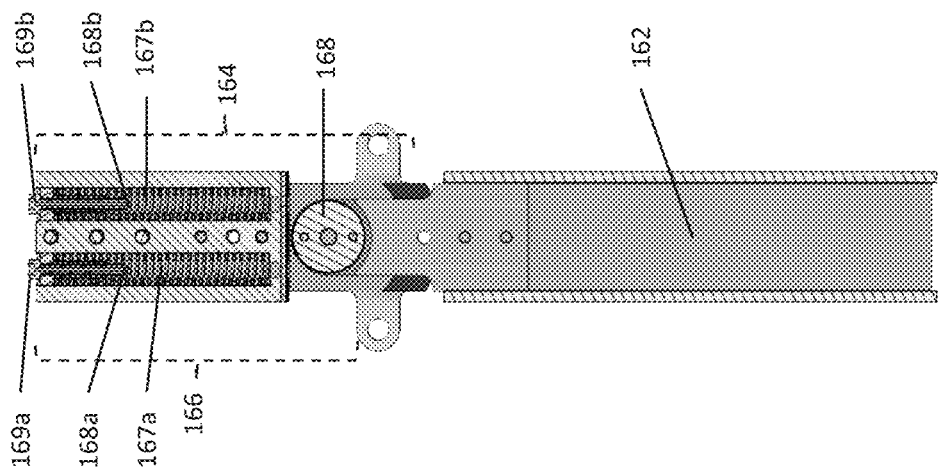
FIG. 10A, FIG. 10B, and FIG. 10C depict a fail-safe mechanism in accordance with an embodiment of the present disclosure.
Figure 10B:
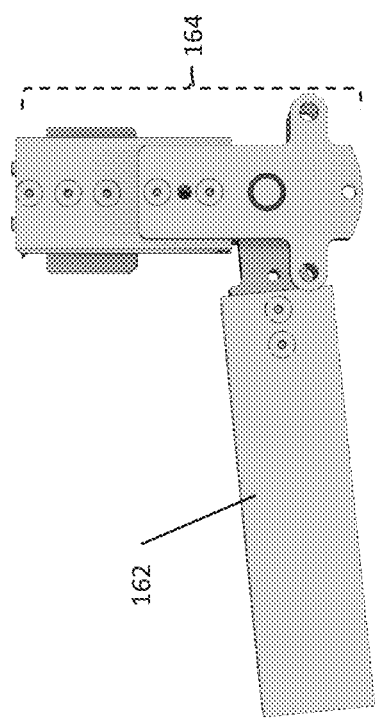
Figure 10A:
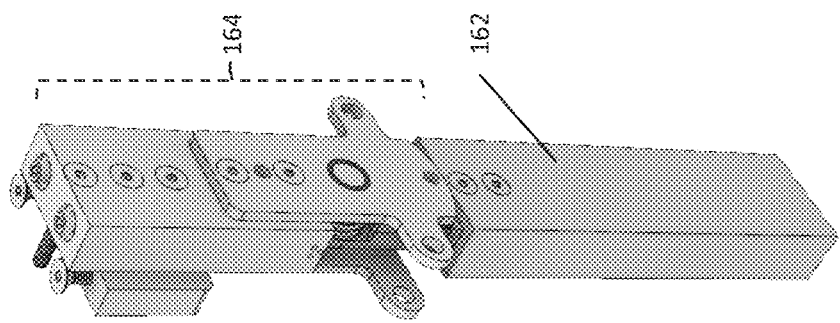

FIG. 10A, FIG. 10B, and FIG. 10C depict various views of a mechanism 160 for preventing robotic apparatus 100 from falling off of pipe 10 should robotic apparatus 100 decoupled from pipe 10. Also referred to herein as a "fail-safe mechanism", mechanism 160 may extend from one or more of wheel assemblies 101 and across open side 102 of robotic apparatus 100, such that robotic apparatus 100 effectively surrounds pipe 10 on all sides as shown in FIG. 11A, FIG. 11B, FIG. 11C, and FIG. 11D. As configured, should wheels 110 slip or otherwise disengage from pipe 10, robotic apparatus 100 will remain connected to pipe 10 in a manner that prevents it from falling to the ground and being damaged or destroyed.

Referring first to FIG. 10A, mechanism 160 may generally comprise an arm member 162 and a rotating joint 164. In various embodiments, rotating joint 164 forms a proximal portion of fail-safe mechanism 160, and is coupled to or forms part of wheel assembly 101. Arm member 162 may be coupled to or be integrally formed as part of rotating joint 164, and may extend across open side 102 of robotic apparatus 100 in a neutral state. To allow for a large protrusion or other obstacle to pass through open side 102 of robotic apparatus 100, rotating joint 164 may be configured to rotate within the plane of open side 102 in response to forces applied to arm member 162 by the obstacle as robotic apparatus 100 traverses a corresponding section of pipe 10. Stated otherwise, upon coming into contact with the obstacle, arm member 162 may passively sweep rearwards about a pivot point defined by rotating joint 164 until the obstacle has passed beyond the reach of arm member 162, as shown in FIG. 10B. Upon clearing the obstacle, arm member 162 may automatically sweep forward to return to the neutral state, where it again extends across open side 102 to prevent robotic apparatus 100 from falling should wheels 110 decouple from pipe 10.

To that end, rotating joint 164, in various embodiments, may include a biasing mechanism 166, such as torsion spring or other mechanism/assembly configured to apply a restorative force for returning arm member 162 to the neutral state after an obstacle is passed. In the embodiment shown in FIG. 10C, biasing mechanism 166 includes an assembly of linear springs 167a, 167b connected to a pulley assembly 168. In particular, springs 167a, 167b may be the same or substantially similar to one another, and may be arranged side-by-side and extend from a proximal end of fail-safe mechanism 160 towards pulley assembly 168. Pulley assembly 168 may include a pulley connected to springs 167a, 167b by a cable, wire, string, or other such connector (collectively, "cable" hereinafter). A first end 168a of the cable may extend axially through spring 167a and connect to a cap 169a positioned at a proximal end of spring 167a, and likewise a second end 168b of the cable may extend axially through spring 167b and connect to a cap 169b positioned at a proximal end of spring 167b. As configured, when arm member 162 (and by extension pulley 169), is swept clockwise this figure, pulley assembly 168 may pull cable end 168b (and attached cap 169b) downwards, thereby progressively compressing spring 167b. This in turn builds up a restoring force in spring 167b that generates a counterclockwise moment for sweeping arm member 162 counterclockwise in this figure back to the neutral state when the obstacle has cleared arm member 162. Likewise, when arm member 162 (and by extension pulley assembly 168), is swept counterclockwise in this figure, pulley assembly 168 may pull cable end 168a (and attached cap 169a) downwards, thereby progressively compressing spring 167a. This in turn builds up a restoring force in spring 167a that generates a clockwise moment for sweeping arm member 162 clockwise in this figure back to the neutral state when the obstacle has cleared arm member 162.

Notably, rotating joint 164, in various embodiments, may be constrained to rotation within the plane of open side 102 only, and thus not permitted to rotate transverse to (e.g., away from or towards pipe 10) said plane, such that fail-safe mechanism 160 does not permit pipe 10 to pass through open side 102 in the event robotic apparatus 100 were to decouple from pipe 10.

Figure 11A:
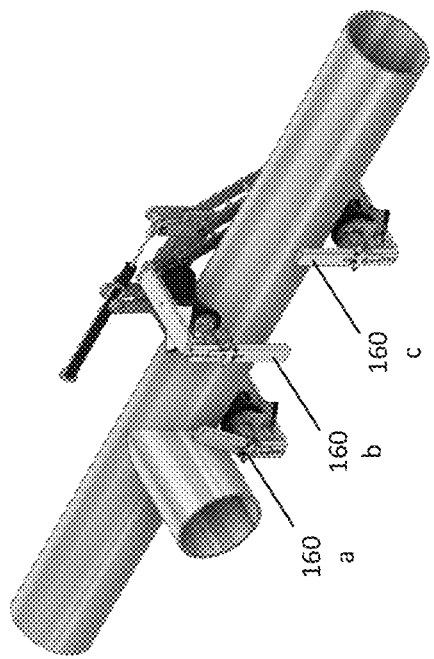
FIG. 11A, FIG. 11B, FIG. 11C, and FIG. 11D illustrate a fail-safe mechanism allowing passage of an obstacle in accordance with an embodiment of the present disclosure.
Figure 11B:
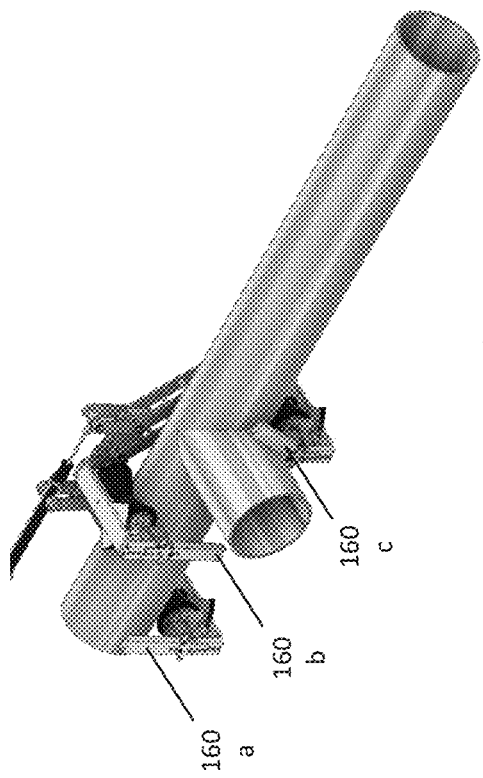
Figure 11C:
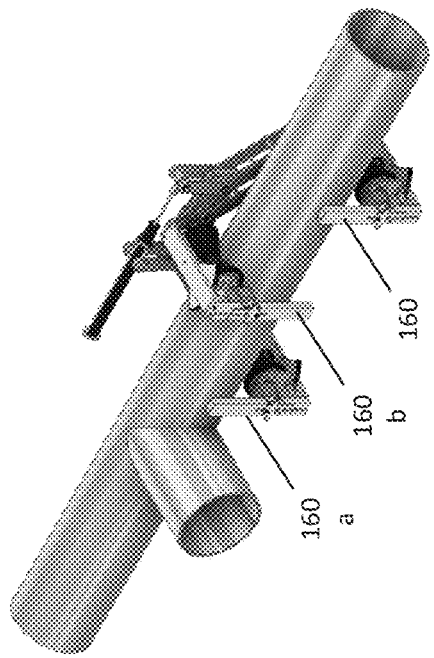
Figure 11D:
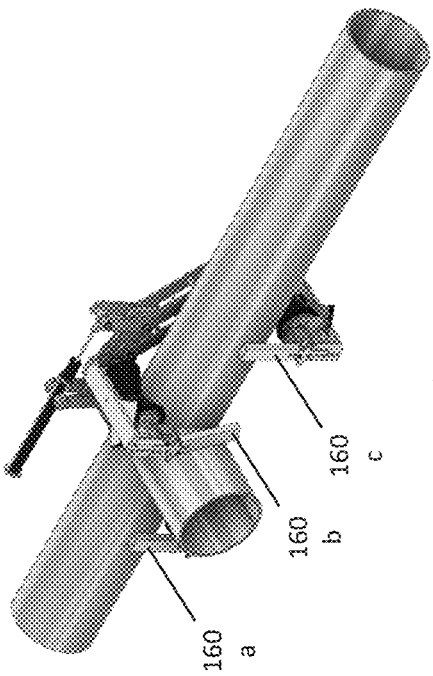

FIG. 11A, FIG. 11B, FIG. 11C, and FIG. 11D illustrate a representative approach for navigating a large unidirectional protrusion from pipe 10 such as pipe junctions and pipe supports when robotic apparatus 100 is equipped with fail-safe mechanism 160. FIG. 11A shows robotic apparatus 100 as it approaches an obstacle protruding from pipe 10. In this figure, robotic apparatus 100 is already in the preferred orientation for passing the protruding obstacle—that is, open side 102 is aligned with the protruding obstacle. It drives straight ahead, parallel to the longitudinal axis of the pipe. In FIG. 11B, robotic apparatus 100 starts to pass the obstacle and the failsafe mechanism 160a attached to the first wheel assembly has hit the protrusion. Since arm member 162 is free to rotate in this plane it starts to pivot as it gets pushed by the protruding obstacle. In FIG. 11C, the first failsafe mechanism 160 has completely passed the obstacle and biasing member 166 has returned arm member 162 to its neutral state. The middle failsafe mechanism 160b is now passing the protruding obstacle. FIG. 11D shows how the middle failsafe mechanism 160b has cleared the obstacle and returned to its neutral position. The last failsafe mechanism 160c is now contacting the protruding obstacle. Once the last wheel assembly passes the obstacle the last failsafe mechanism 160c will swing back to the neutral safe position and robotic apparatus 100 is free to return to its normal operation.

Figure 12B:
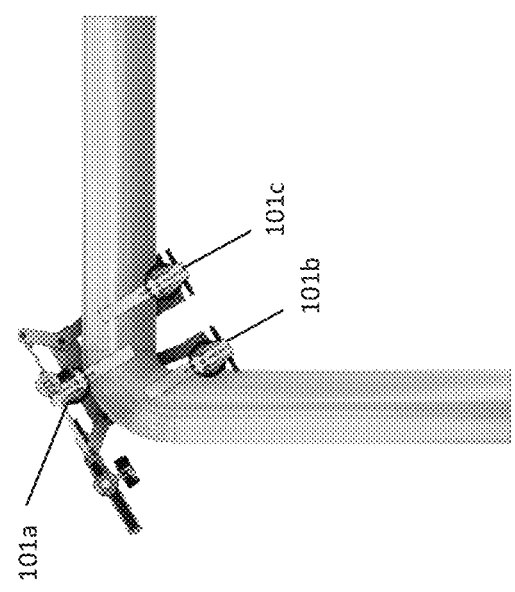
FIG. 12A, FIG. 12B, FIG. 12C, and FIG. 12D illustrate the robotic apparatus navigating a bend in a pipe in accordance with an embodiment of the present disclosure.
Figure 12D:
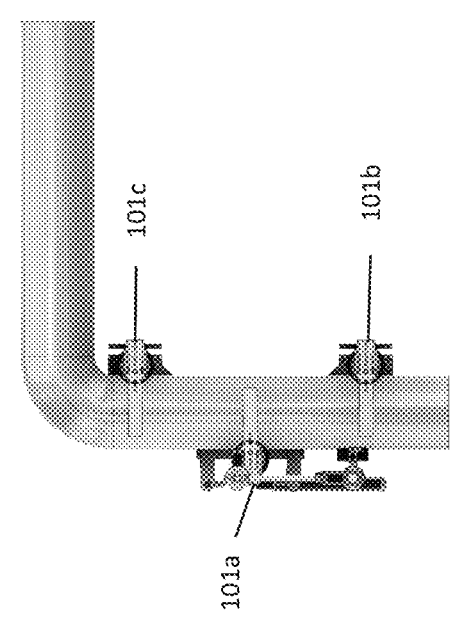
Figure 12A:
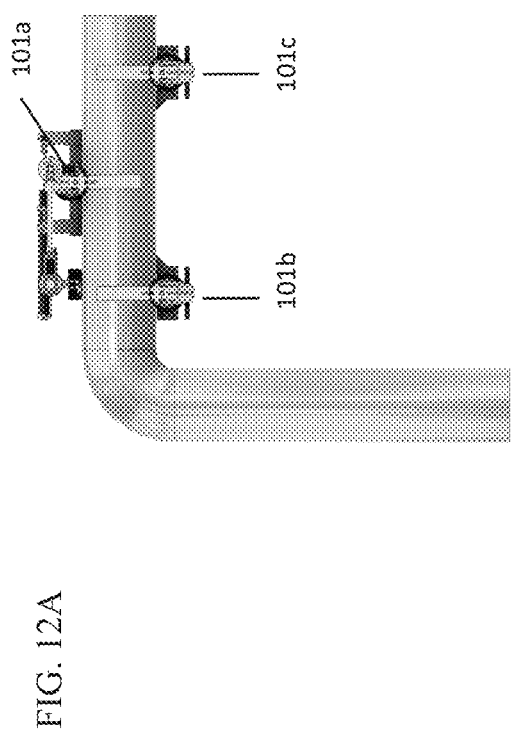
Figure 12C:
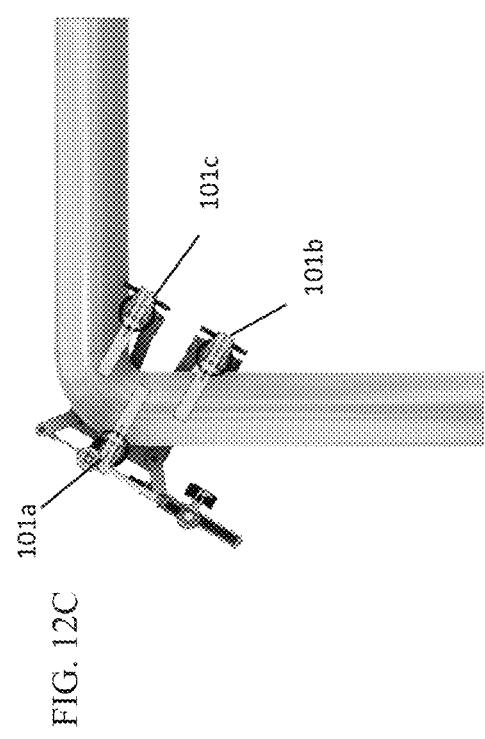

FIG. 12A, FIG. 12B, FIG. 12C, and FIG. 12D illustrate a representative approach for navigating a bend or curve in pipe 10 using robotic apparatus 100. FIG. 12A shows the ideal orientation of the robotic apparatus 100 as it approaches the bend. The depicted embodiment of robotic apparatus 100 is designed to traverse the bend with the single wheel assembly 101a driving along the outer centerline of the bend and the two wheel assemblies 101b, 101c on the opposing side to drive along the inner centerline of the bend. Alternative embodiments have been designed so that the single wheel assembly 101a can drive along the inside of the bend and the two wheel assemblies 101b, 101c can drive along the outside of the bend. However, these two different approaches place different constraints on the range of motion of the clamping mechanism 150, and a single embodiment is typically designed to employ one of the two approaches. FIG. 12B shows how the robotic apparatus 100 enters the bend. As shown, robotic apparatus 100 has to expand significantly as it drives towards the apex of the bend. The outside wheel in wheel assembly 101a will speed up as it enters the bend to compensate for the longer path length compared to the other wheels. In FIG. 12C, robotic apparatus 100 has passed the apex of the bend. At this stage clamping mechanism 150 gradually contracts to keep the wheels 110 in contact with the surface of the pipe 10 and the outside wheel 110a gradually returns to the same speed as the other wheels 110b, 110c, as the path length difference diminishes. In FIG. 12D, robotic apparatus 100 has completely passed the bend and it returns to its normal operation.

Pipeline Inspection and Other Payloads

Figure 13B:
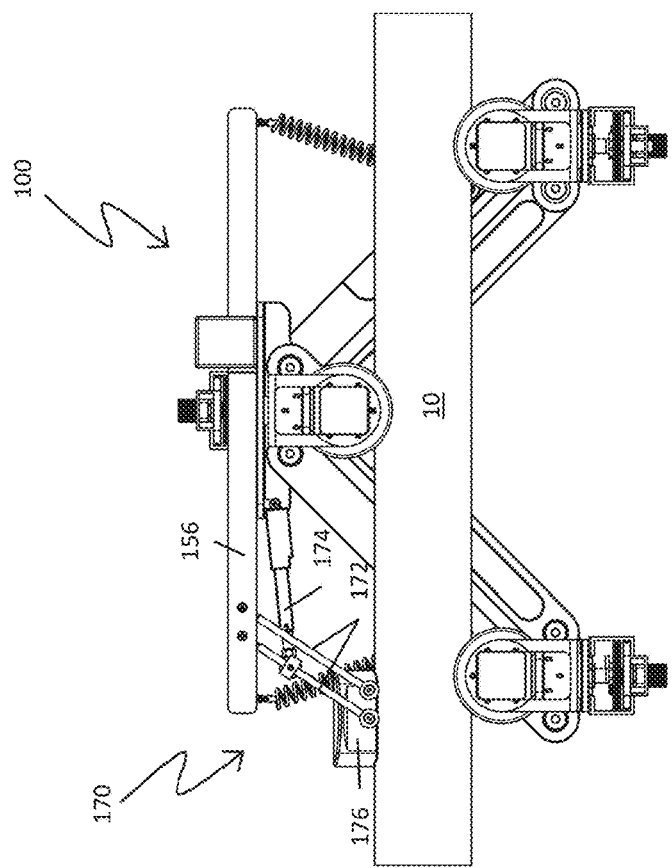
FIG. 13A and FIG. 13B depict a sensor assembly in a lowered and raised position in accordance with an embodiment of the present disclosure.
Figure 13A:
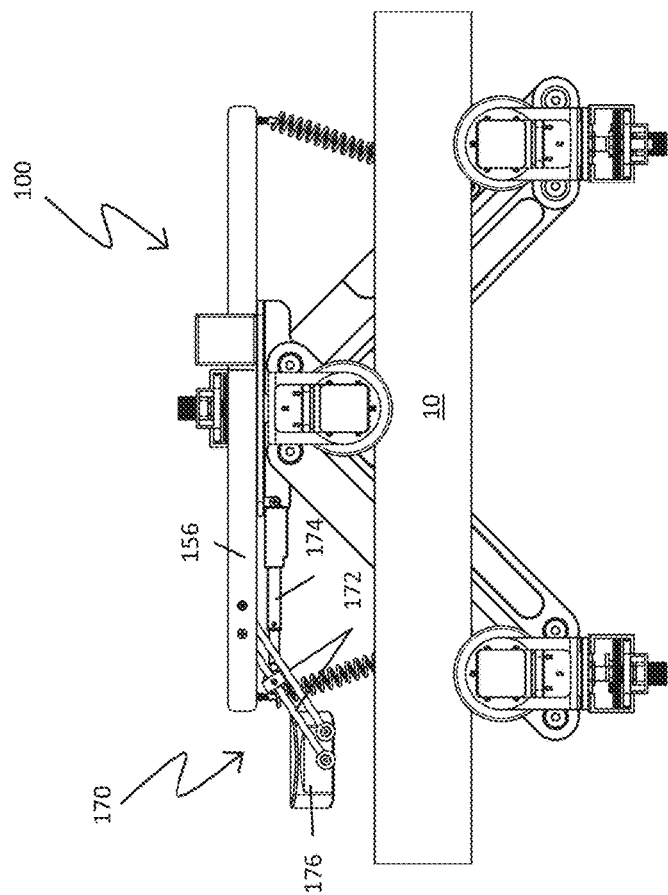

FIG. 13A and FIG. 13B illustrate an embodiment of robotic apparatus 100 including a sensor assembly 170 for performing structural inspections of pipe 10. Inspection sensor assembly 170, in various embodiments, may generally include one or more arms 172 and an actuator 174 for positioning a sensor 176 relative to pipe 10.

Sensor 176, in various embodiments, may include one of a variety of sensors suitable for inspecting or otherwise gathering information concerning pipe 10 and/or the surrounding environment. For example, in an embodiment, sensor 176 may include an ultrasonic sensor or other sensor suitable for non-destructive inspection (NDI) of structural aspects of pipe 10, such as measuring wall thickness or detecting cracks/corrosion. In another embodiment, sensor 176 may include a sensor configured to sample air proximate to pipe 10 for traces of fluids (e.g., natural gas, oil) that may have leaked out of pipe 10. Such traces may be indicative of cracks or corrosion in pipe 10, and thus may be used for structural inspection purposes. While inspection sensor assembly 170 of the present disclosure may be described in the context of positioning a sensor 176 for pipeline inspection purposes, it should be recognized that any sensor 170 may be used in connection with sensor assembly 170 for any suitable purpose.

Arm(s) 172, in various embodiments, may couple sensor 176 to robotic apparatus 100 and be moved to position sensor 176 relative to pipe 10. In particular, a first end of arm(s) 172 may be rotatably coupled to robotic apparatus 100, for example, on strut 156 as shown. As configured, arm(s) 172 may be pivoted up and down on strut 156 and thereby position sensor 176 away from or close to pipe 10, respectively. In an embodiment (shown), the second end of arm(s) 172 may also be rotatably coupled to sensor 176, thereby allowing sensor 176 to pivot relative to arm(s) 172 and thus remain parallel to the surface of pipe 10 if desired or necessary for sensor 176 to function optimally. FIG. 13A illustrates inspection sensor assembly 170 in a raised position and FIG. 13B illustrates sensor assembly in a lowered position. Arm(s) 172, in an embodiment, may be used to raise sensor 176 to a position away from pipe 10 when measurements are not needed and/or to prevent sensor 176 from colliding with an obstacle along pipe 10. Conversely, arm(s) 172, in an embodiment, may be used to lower sensor 176 to a position close to or against pipe 10 for taking measurements.

Actuator 174, in various embodiments, may be used to move arm(s) 172 in positioning sensor 176. Actuator 174 may include any actuator, motor, and associated assemblies (e.g., pulleys, gear trains). In the exemplary embodiment shown, actuator 174 includes a linear actuator having a proximal end rotatably coupled to wheel assembly 101a of robotic apparatus 100 and having a distal end coupled to arm(s) 172, and specifically here to a cross-bar member extending between arms 172 that freely rotates to maintain alignment with linear actuator 172, as shown, regardless of whether linear actuator 172 is in an extended or retracted position. Of course, one of ordinary skill in the art will recognize alternative actuators that may be suitable for the described purpose within the scope of the present disclosure. For example, in another embodiment (not shown), actuator 174 may include a motor configured to wind in/out a cable or pulley assembly positioning arm(s) 172 and sensor 176 coupled thereto.

Figure 14B:
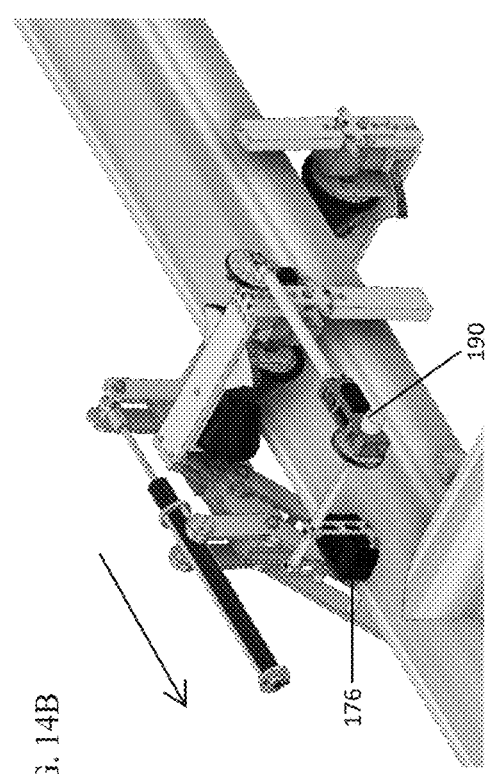
FIG. 14A, FIG. 14B, FIG. 14C, and FIG. 14D depict another sensor assembly in accordance with an embodiment of the present disclosure.
Figure 14D:
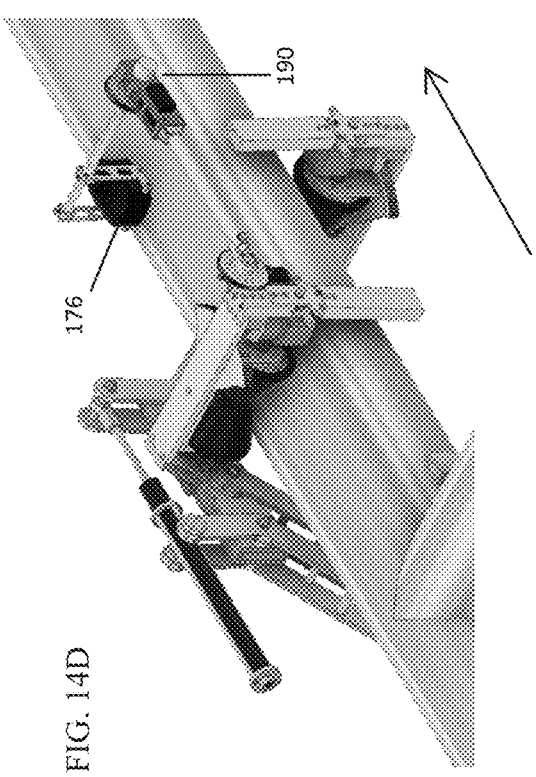
Figure 14A:
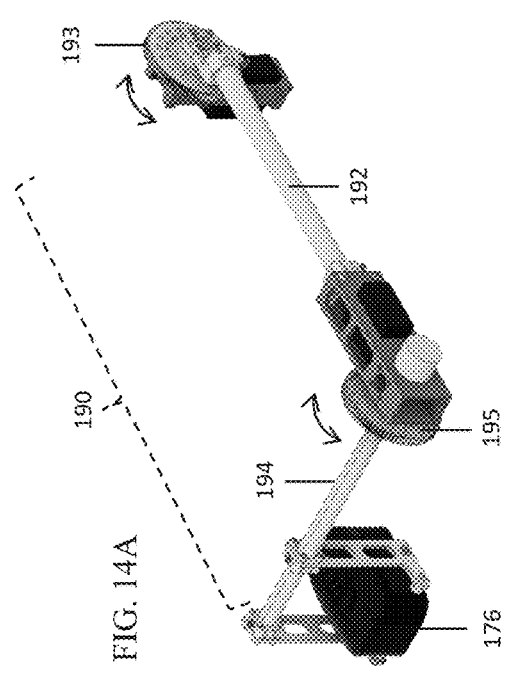
Figure 14C:
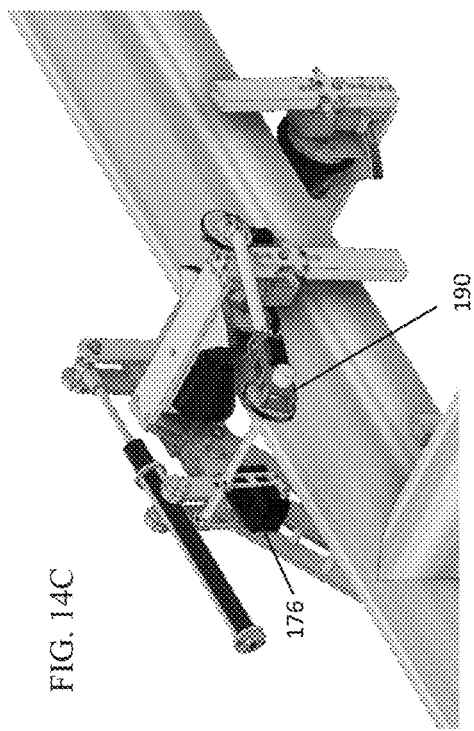
Figure 15A:
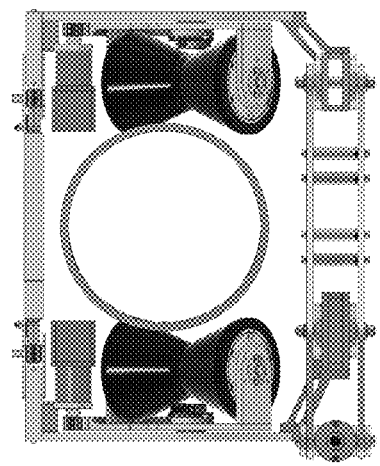
FIG. 15A, FIG. 15B, FIG. 15C, and FIG. 15D depict a robotic apparatus translating to account for wheel slip in accordance with an embodiment of the present disclosure.
Figure 15B:
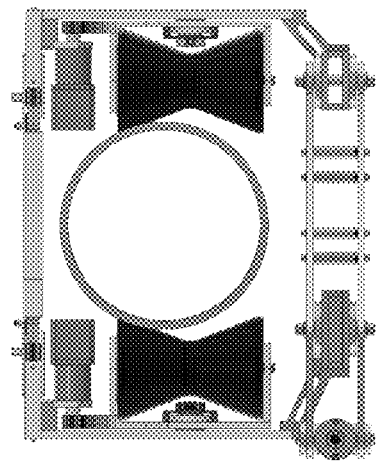
Figure 15C:
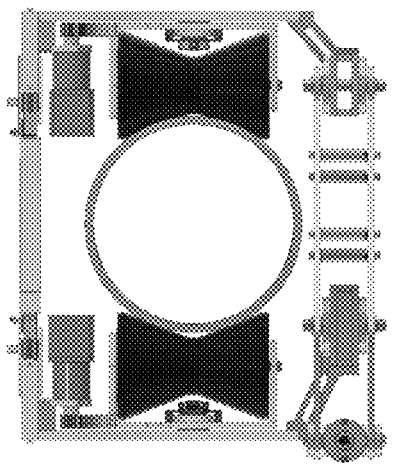
Figure 15D:
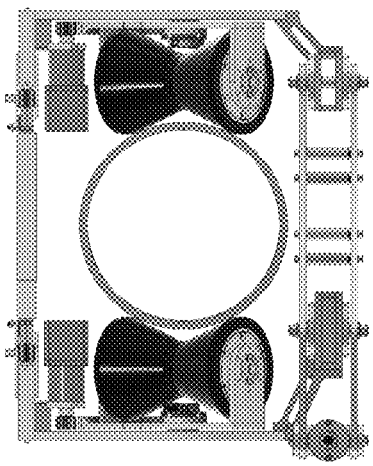

FIG. 14A, FIG. 14B, FIG. 14C, and FIG. 14D depict another embodiment of inspection sensor assembly 170, which generally includes sensor 176, and an articulated arm 190 comprising a first arm segment 192 and a second arm segment 194. A proximal end of first arm segment 192 may be rotatably coupled by a first rotating joint 193 to robotic apparatus 100 such that articulated arm 190 may be rotated relative to robotic apparatus 100. A proximal end of second arm segment 194 may be rotatably coupled by a second rotating joint 195 to a distal end of first arm segment 192 such that second arm segment 194 may be rotated relative to first arm segment 192. Each rotating joint 193, 195, in various embodiments, may be motorized and configured for independent rotation from one another. As configured, first rotating joint 193 may raise or lower articulated arm 190 relative to pipe 10 and second rotating joint 195 may independently adjust an orientation of sensor 176 relative to the surface of pipe 10, as shown in FIG. 14A and FIG. 14C.

Further, first rotating joint 193 may be rotated to a greater extent for positioning articulated arm 190 out in front of either end of robotic apparatus 100, as shown in FIG. 14B and FIG. 14D. As configured, sensor 176 may be positioned to take measurements in front of robotic apparatus 100 regardless of its direction of travel on pipe 10. In one aspect, this configuration may provide for more accurate measurements, as robotic apparatus 100 would not yet be in contact with the portion of pipe 10 being inspected with sensor 176, which may otherwise produce vibrations, cause a dampening effect, or otherwise affect structural properties of the portion of pipe 10 being inspected. In another aspect, by positioning sensor assembly out in front of robotic apparatus 100 (again, regardless of the direction of travel), it may be possible to inspect portions of pipe 10 all the way up to an upcoming obstacle. Contrast this with only being able to inspect only those portions of pipe 10 more than a length of robotic apparatus away from the upcoming obstacle because inspection sensor assembly 170 is positioned behind robotic apparatus 100.

Figure 21:
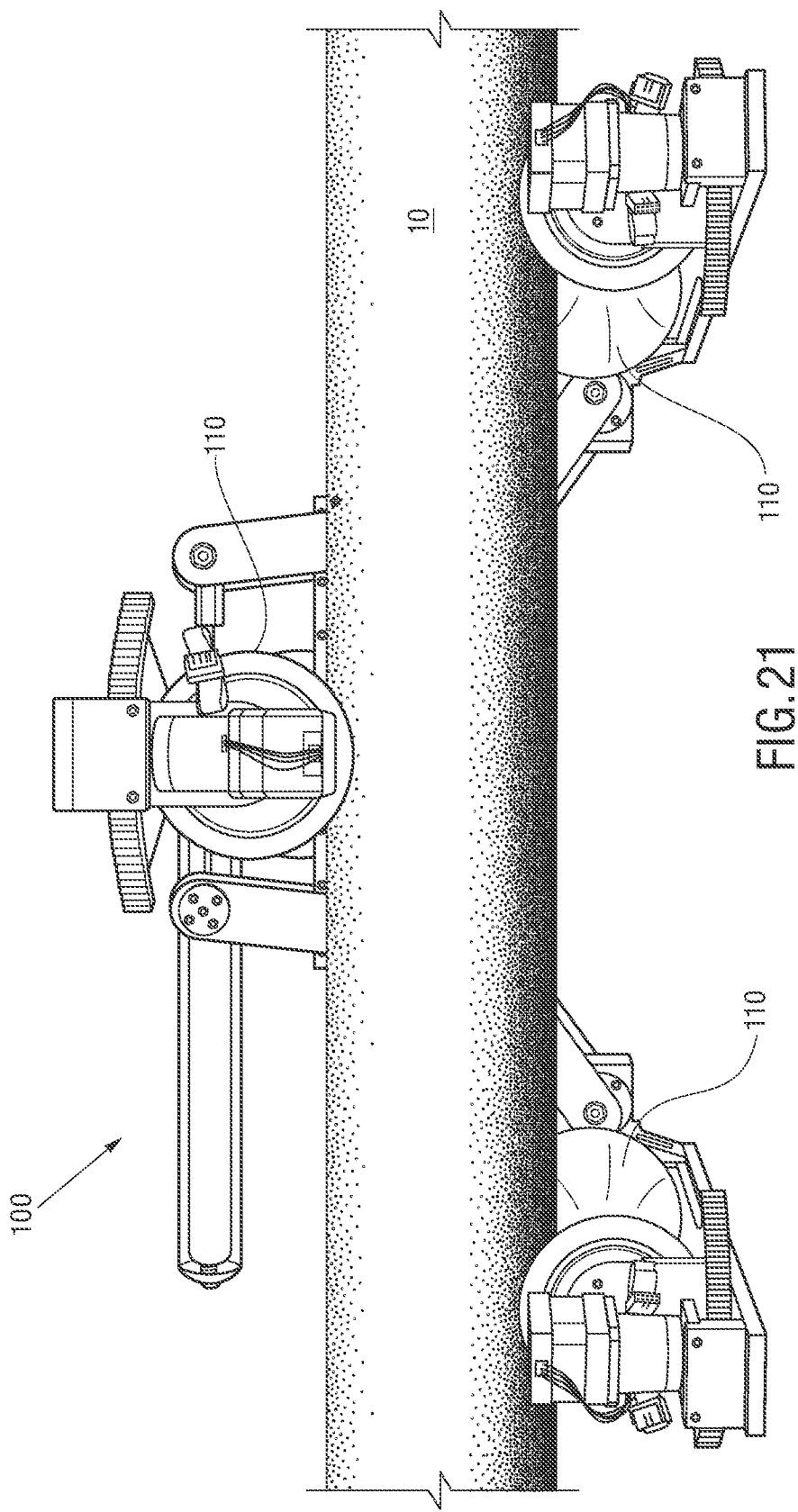
Figure 22:
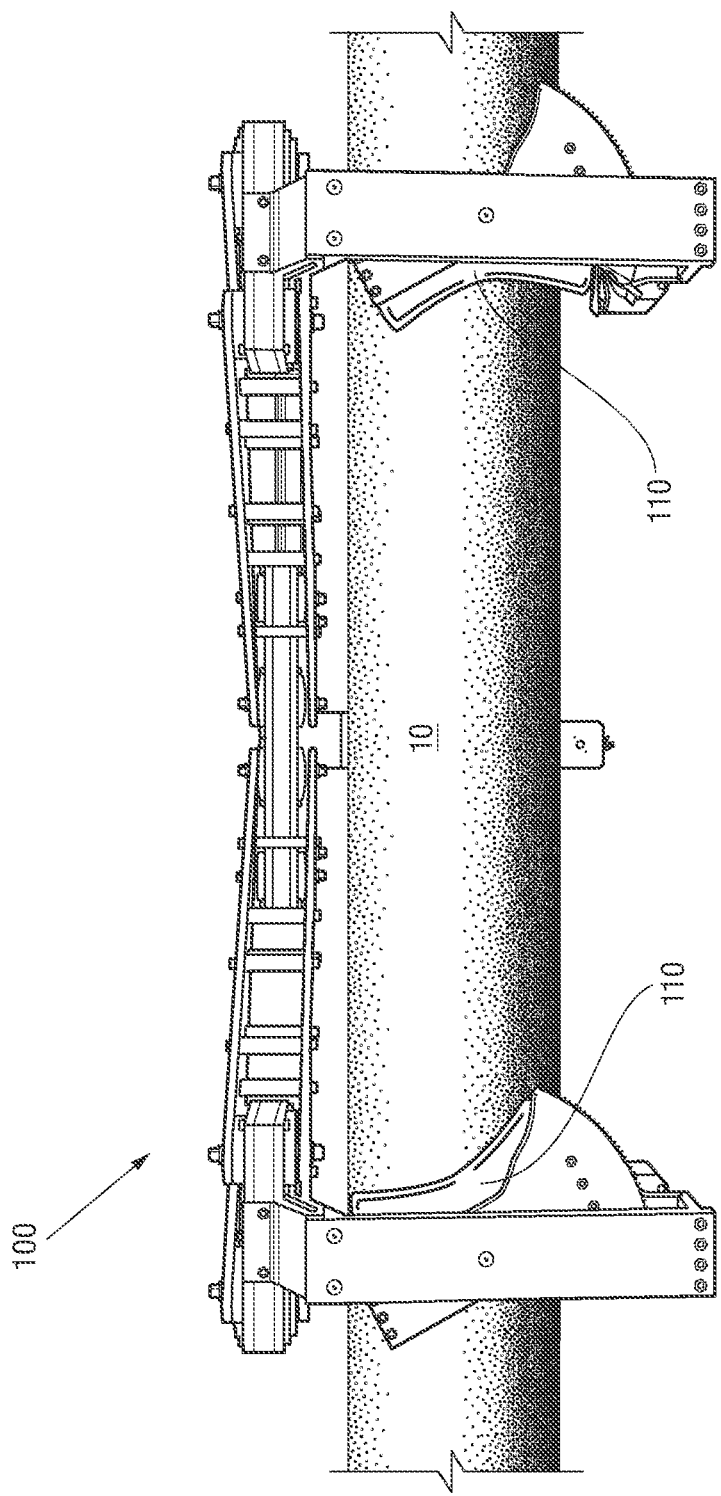
FIG. 22 depicts a bottom view of the prototype of a robotic apparatus, with the orientation of the wheels adjusted for helical travel along a pipe in accordance with an embodiment of the present disclosure.
Figure 23:
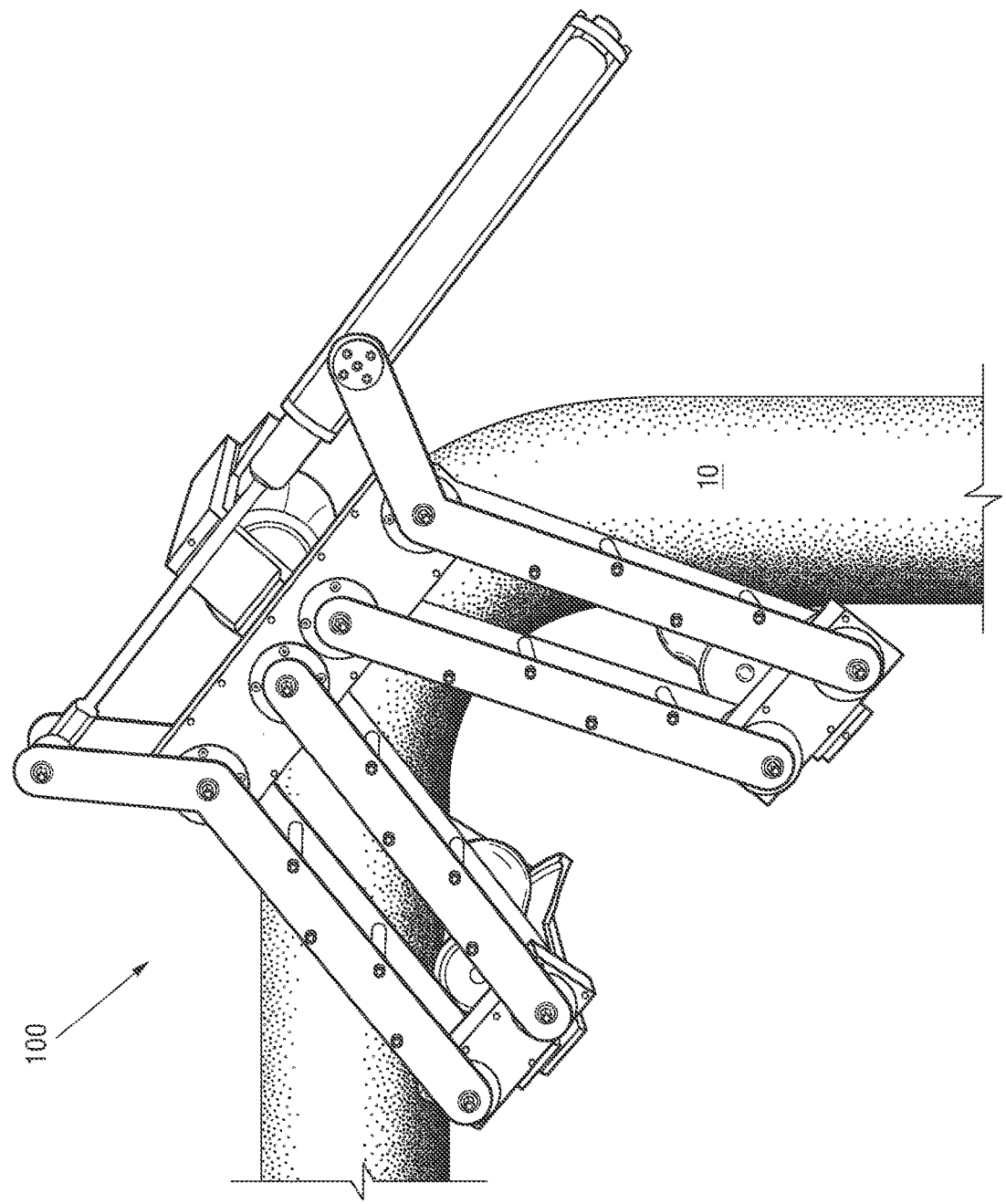
FIG. 23 depicts a side view of the prototype of a robotic apparatus navigating a bend in a pipe in accordance with an embodiment of the present disclosure.
Figure 24:
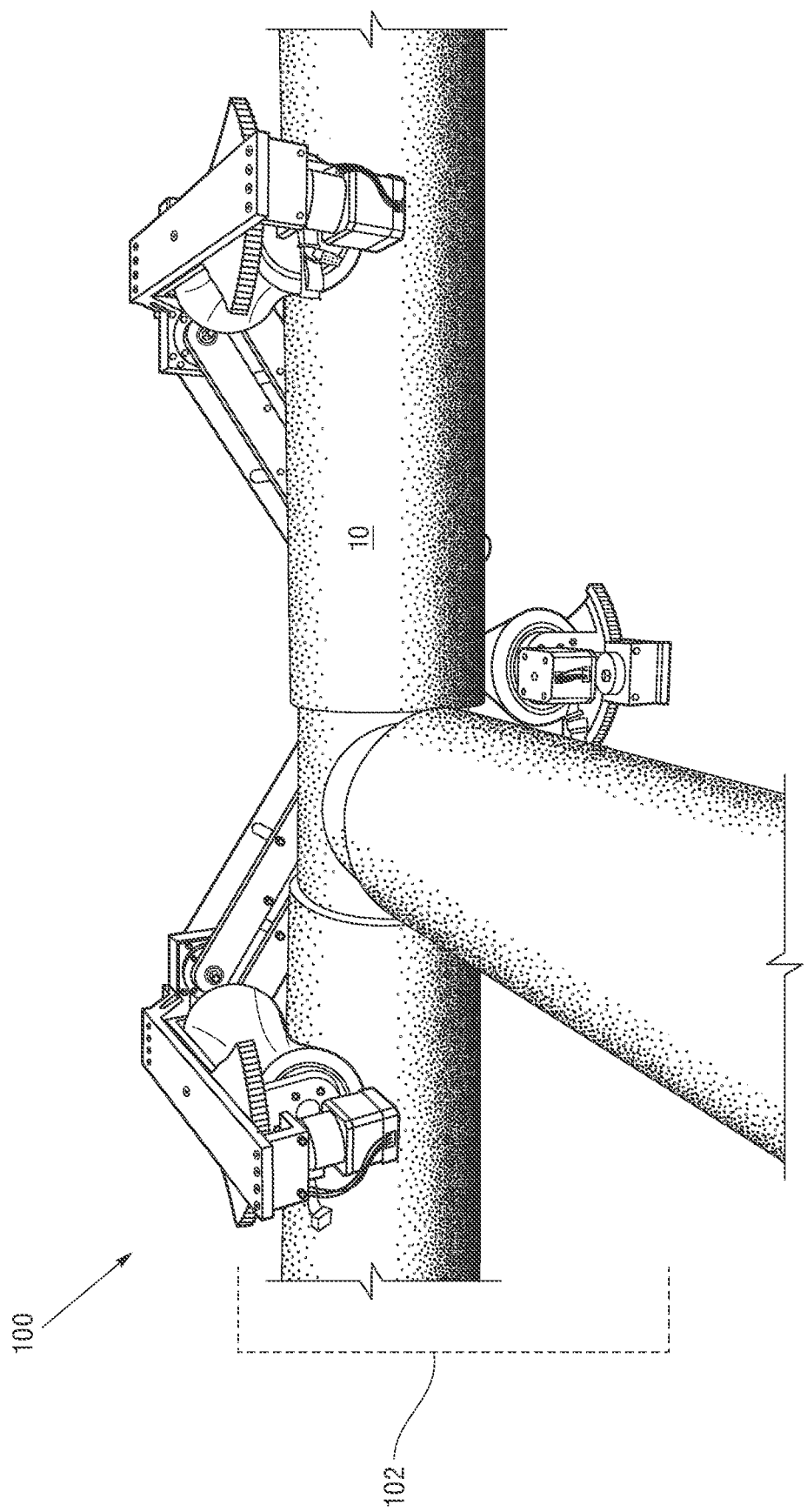
FIG. 24 depicts a side view of the prototype of a robotic apparatus, with an open side positioned for passing an obstacle protruding from the pipe in accordance with an embodiment of the present disclosure.

FIG. 20, FIG. 21, FIG. 22, FIG. 23, and FIG. 24 are photographs of a prototype of a representative embodiment of robotic apparatus 100 for further illustrative purposes. FIGS. 20 and 21 depict side views of the prototype of robotic apparatus 100, with wheels 110 aligned for straight travel along pipe 10. FIG. 22 depicts a bottom view of the prototype of robotic apparatus 100, with the orientation of wheels 110 adjusted for helical travel along pipe 10. FIG. 23 depicts a side view of the prototype of robotic apparatus 100 navigating a bend in pipe 10. FIG. 24 depicts a side view of the prototype of robotic apparatus 100, with open side 102 positioned for passing an obstacle protruding from pipe 10.

Alternative Wheel Assemblies 101

FIG. 25A, FIG. 25B, FIG. 26A, FIG. 26B, FIG. 27A, FIG. 27B, FIG. 28A, FIG. 28B, FIG. 29A, and FIG. 29B depict various alternative wheel assemblies 101 of robotic apparatus 100 of the present disclosure.

Figure 25A:
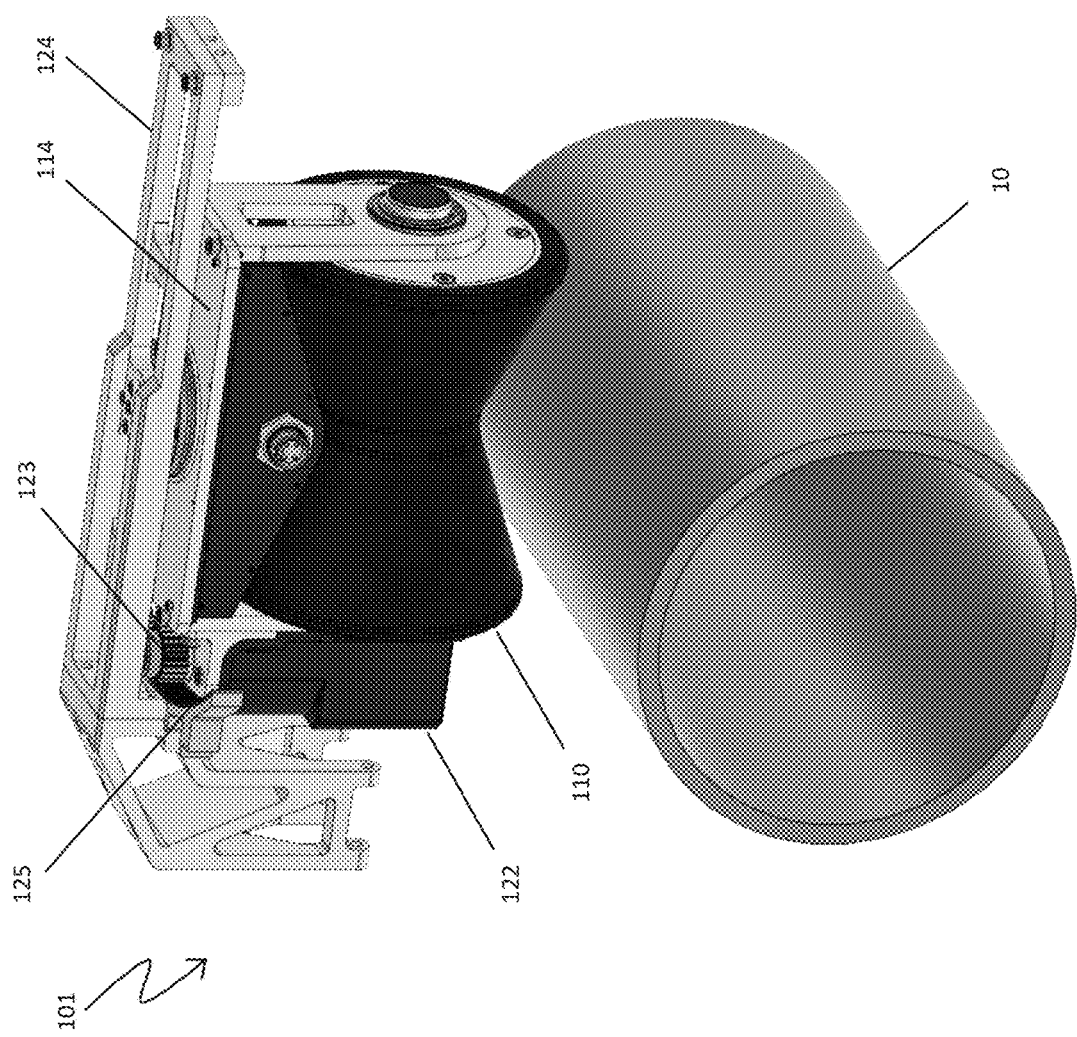
FIG. 25A and FIG. 25B are perspective views of another wheel assembly in accordance with an embodiment of the present disclosure.
Figure 25B:
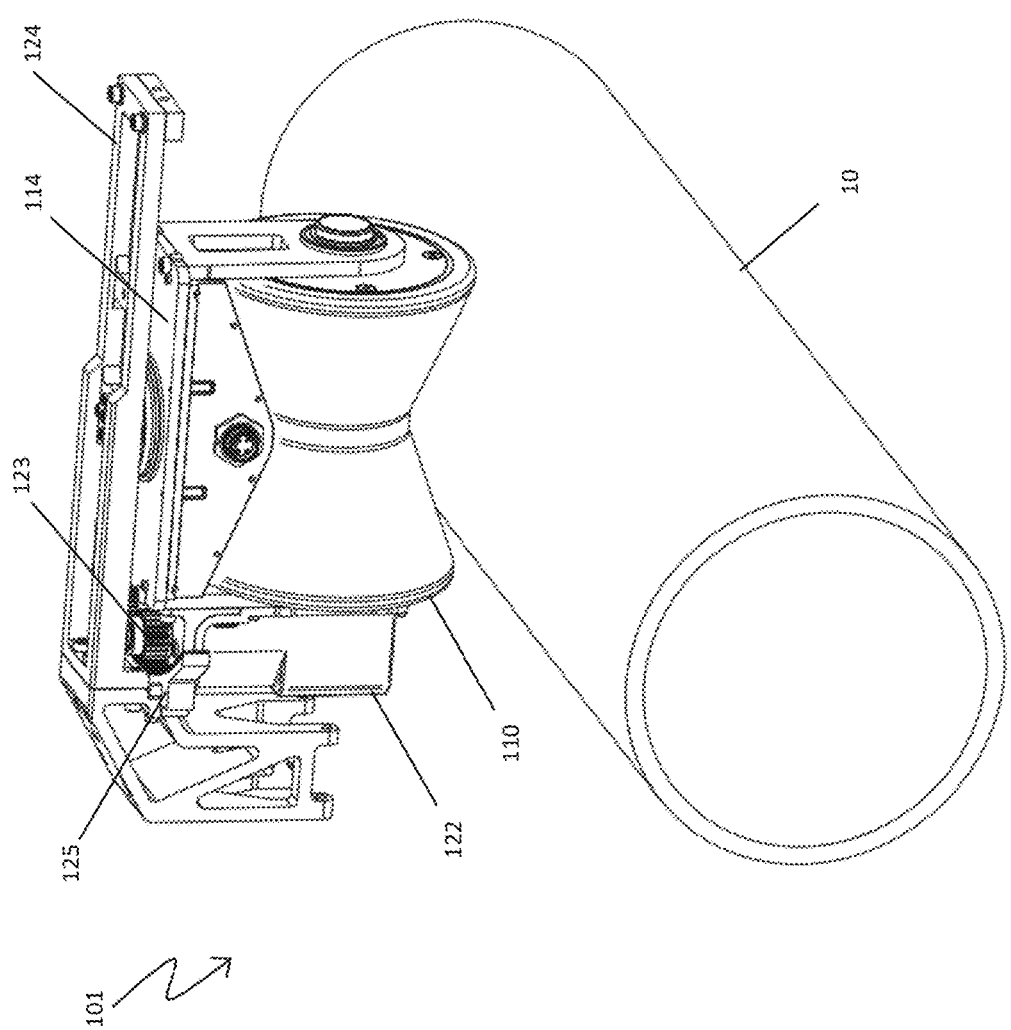

FIG. 25A and FIG. 25B depict an embodiment of wheel assembly 101 similar to that of FIG. 4B; however, in the present embodiment, motor 122 is coupled to wheel frame 114, and motor 122 and base plate 124 are provided with gear teeth 123, 125, respectively, which may be interfaced with one another such that rotation of motor 122 causes a rotation of wheel assembly 114 about an axis normal to base plate 124 to adjust the orientation of wheel 110. An advantage of the present configuration is the ability to package electronics for controlling motor 130 (which drives wheel 130) and motor 122 (which rotates alignment mechanism 120) together within wheel assembly 101. As configured, there is no relative motion between motors 130, 122 and the associated electronics that control them, which can make it easier to route cables, waterproof robot 100, and reduce the likelihood of pinched cables.

Figure 26A:
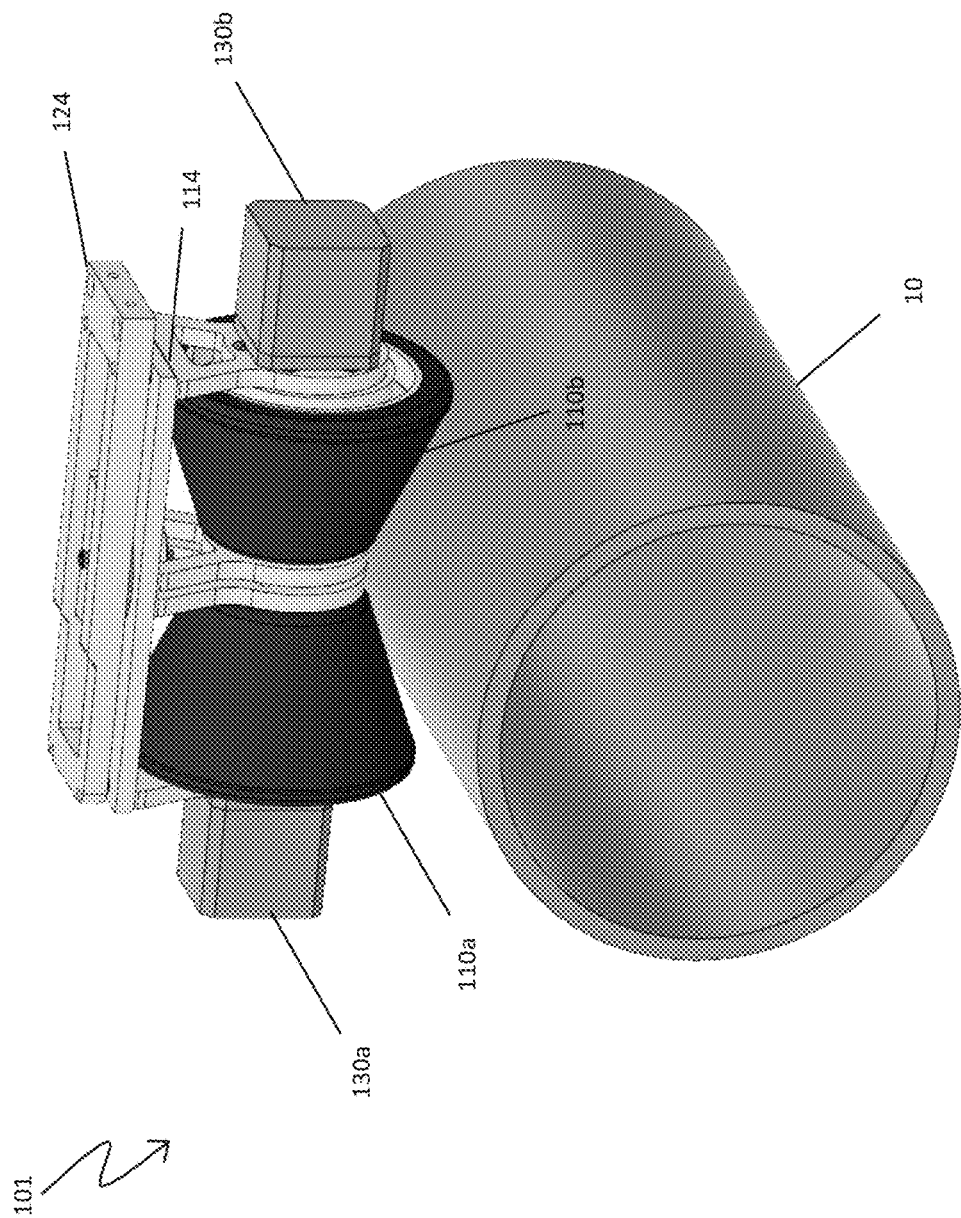
FIG. 26A and FIG. 26B are perspective views of a wheel assembly featuring differential steering and cone-shaped wheel halves in accordance with an embodiment of the present disclosure.
Figure 26B:
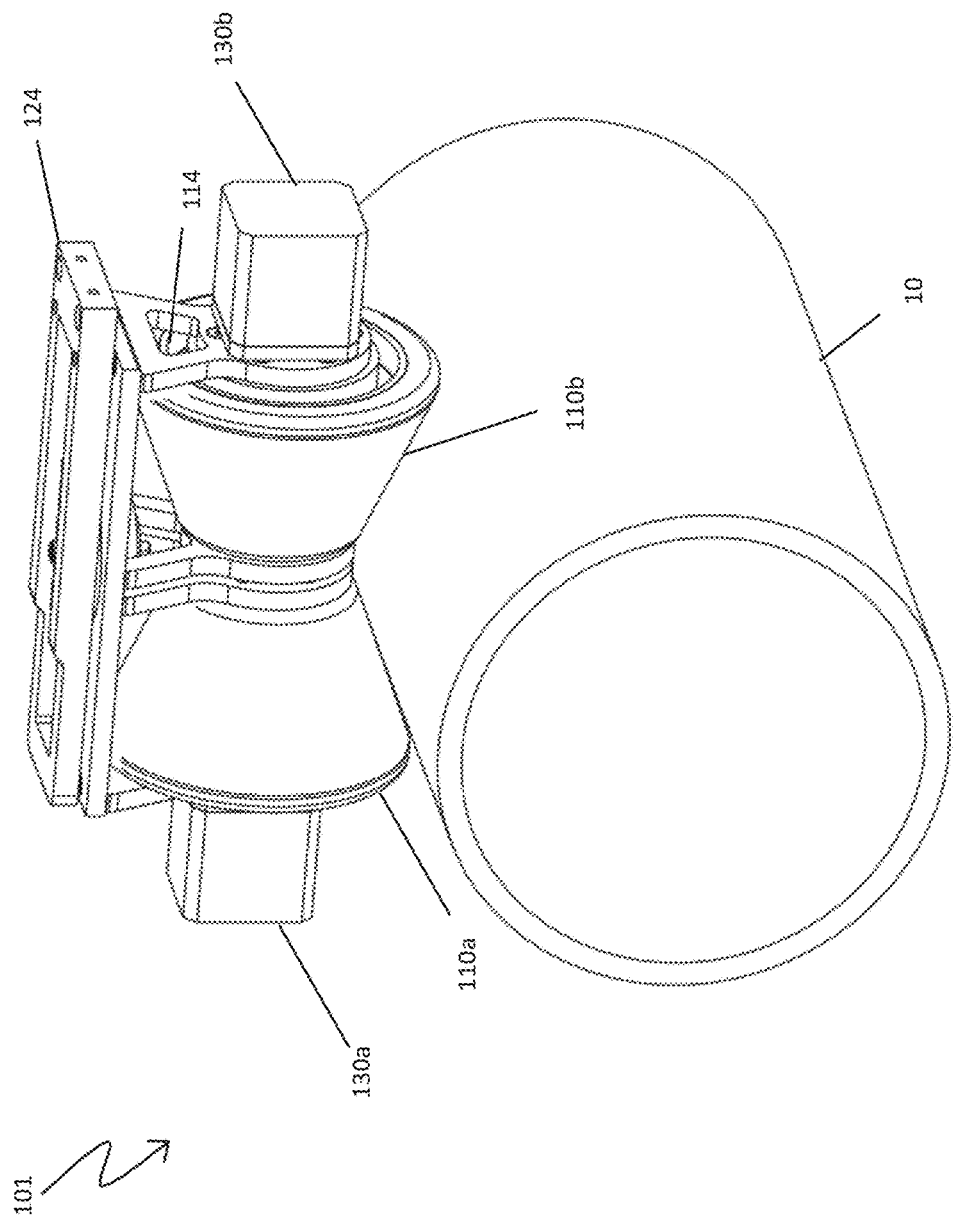

FIG. 26A and FIG. 26B depicts another embodiment of wheel assembly 101 featuring an alternative drive and alignment approach. In the present embodiment, the previously disclosed combinations of drive motor 130 and alignment motor 122 are replaced by a combination of two individually-controlled, mirrored motors 130a, 130b that independently drive two identical cone-shaped halves 110a, 110b of wheel 110, respectively. If motors 130a, 130b apply the same torque, wheel 110 will continue to drive in its current orientation relative to base plate 124. Conversely, if motors 130a, 130b apply different torques or apply torques in different directions (e.g., motor 130a drives forward and motor 130b drives backwards), they will exert a moment on wheel 110 that causes wheel 110 to change its orientation relative to base plate 124. As configured, motors 130a, 130b serve both as drive motors and alignment motors. This type of steering, commonly called differential steering, removes the need for an alignment motor 122 and associated gear mechanisms (e.g., 123, 116 in FIG. 4B; 123, 125 in FIG. 25A and FIG. 25B) to adjust the orientation of wheel assembly 101. Further, the present embodiment includes a simpler wheel design that potentially makes robotic apparatus 100 more reliable and easier to manufacture.

It should be recognized that the amount of torque produced for adjusting alignment of wheel 110 may differ between the present embodiment of FIG. 26A, FIG. 26B and the embodiments of FIG. 4B, FIG. 25A and FIG. 25B. In particular, the resulting torque from the differential steering using motors 130a, 130b may be lower than the torque produced by the alignment mechanism 120 of the embodiment of FIG. 4B and FIG. 25A and FIG. 25B due to the effective moment arms of each configuration. For example, in the embodiment of FIG. 26A and FIG. 26B, the force produced by motor 130 for turning wheel 110 is applied at or close to the center of rotation of wheel 110 such that any torque-boosting moment arm is minimized. Conversely, in the embodiments of FIG. 4B and FIG. 25A and FIG. 25B, the force produced by alignment motor 122 is offset from the center of rotation of wheel frame 114/base plate 124 such that the resulting torque for adjusting alignment of wheel 110 is boosted by the corresponding moment arm of the offset. Accordingly, in an embodiment, motor 130 of the present embodiment may be sized up to compensate for any reductions in alignment torque compared with the embodiments of FIG. 4B, FIG. 25A, and FIG. 25B, if desired.

Figure 27A:
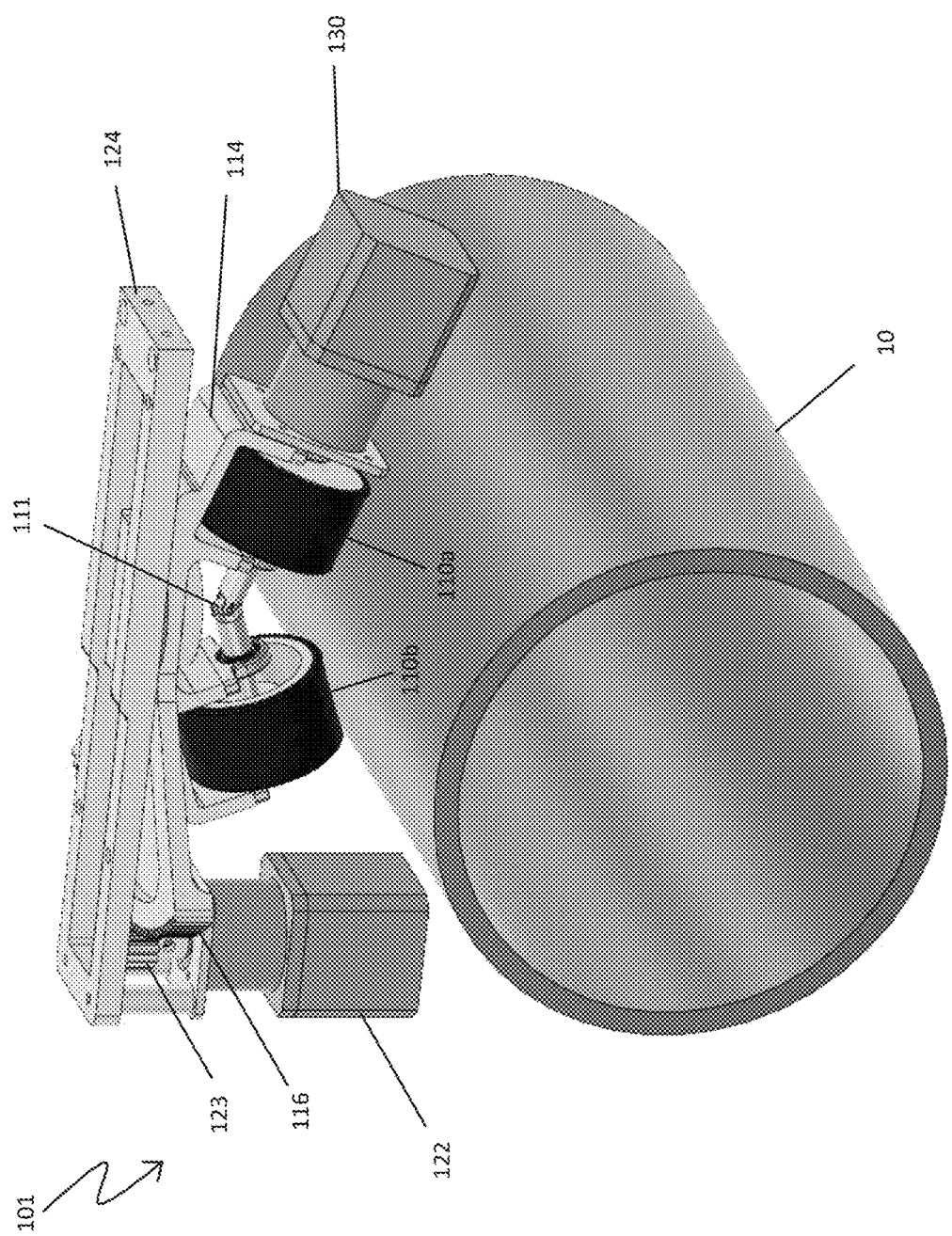
FIG. 27A and FIG. 27B are perspective views of a wheel assembly featuring two cylindrical wheels in accordance with an embodiment of the present disclosure.
Figure 27B:
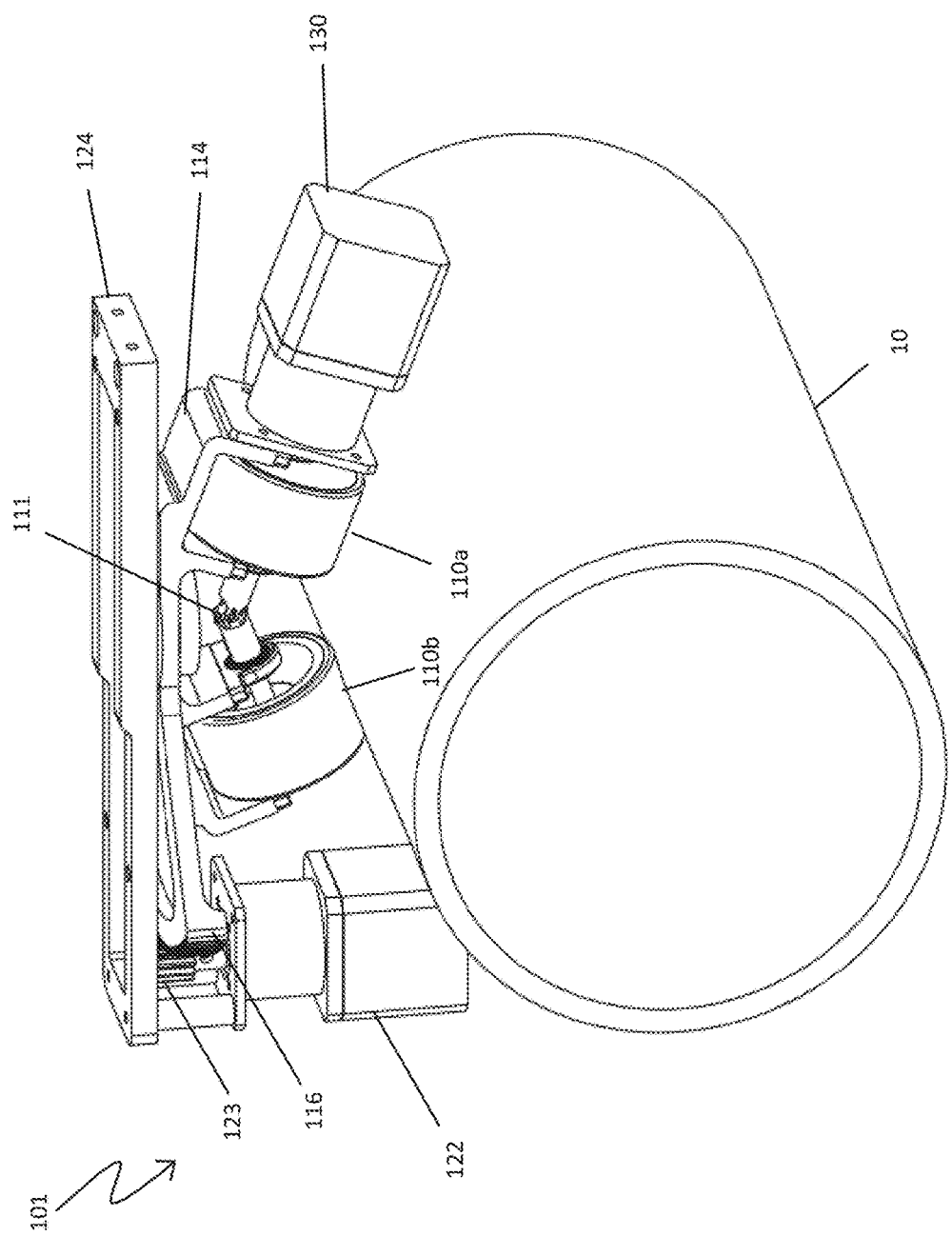

FIG. 27A and FIG. 27B depicts yet another embodiment of wheel assembly 101 featuring two cylindrical wheels 110a, 110b. Each wheel 110a, 110b may be rotatably mounted to wheel frame 114 with their respective axes of rotation oriented at a fixed angle relative to one another. As shown, this angle may be similar to the angle at which concave surfaces 112 of cone-shaped wheel 110 slope away from one another in the embodiment of FIG. 4B, for example, so as to maintain the associated benefits of concavity previously described in the present disclosure. Drive motor 130 may be coupled to and drive wheel 110a, and a transmission 111 between wheel 110a and wheel 110b, such as a universal joint (shown) or a gear train (not shown), may transfer the applied torque to wheel 110b. An alignment mechanism 120 comprising a geared alignment motor 122, and either a geared wheel assembly 114 (FIG. 4B) or geared base plate 124 (FIG. 25A and FIG. 25B), may be provided to adjust the orientation of wheels 110a, 110b. Advantageously, wheel assembly 101 of the present embodiment can be made with a lower profile (measured as the maximum distance from the surface of pipe 10) and have lower motor torque requirements due to the smaller diameter of cylindrical wheels 110. That said, wheel assembly 101 of the present embodiment may have a wider profile since the alternative wheel shape may make it more difficult to fit motors 130 inside wheels 110, and have higher motor speed requirements due to smaller wheel diameter.

Figure 28A:
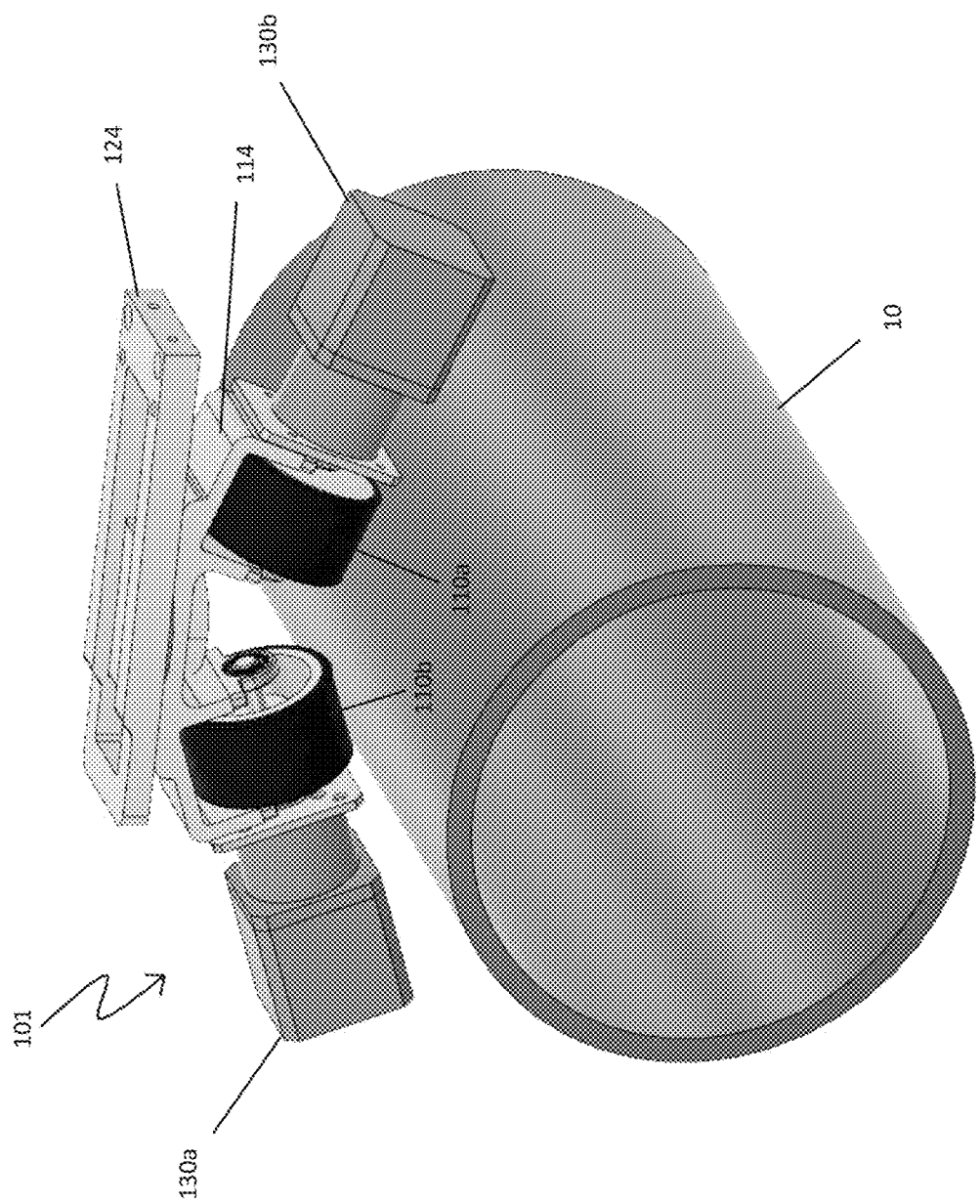
FIG. 28A and FIG. 28B are perspective views of a wheel assembly featuring differential steering and two cylindrical wheels in accordance with an embodiment of the present disclosure.
Figure 28B:
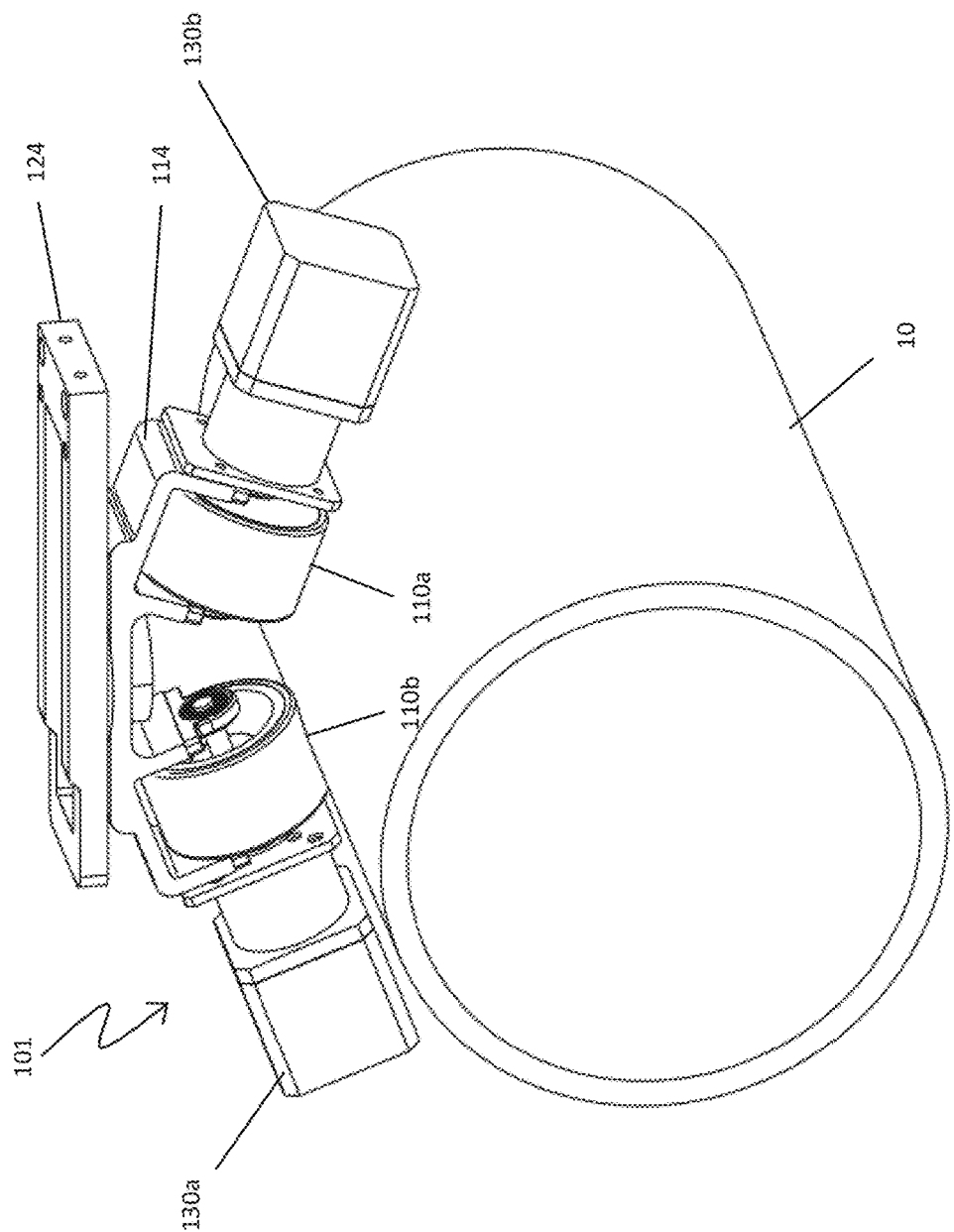

FIG. 28A and FIG. 28B depicts another embodiment of wheel assembly 101 in which the embodiment of FIG. 26A and FIG. 26B has been modified to replace cone-shaped wheel halves 110a, 110b with the cylindrical wheels 110a, 110b of the embodiment of FIG. 27A and FIG. 27B. In such an embodiment, each cylindrical wheel 110a, 110b would have a separate drive motor 130a, 130b, coupled thereto to drive the respective wheel 110a, 110b and adjust the orientation of the wheel assembly.

Figure 29A:
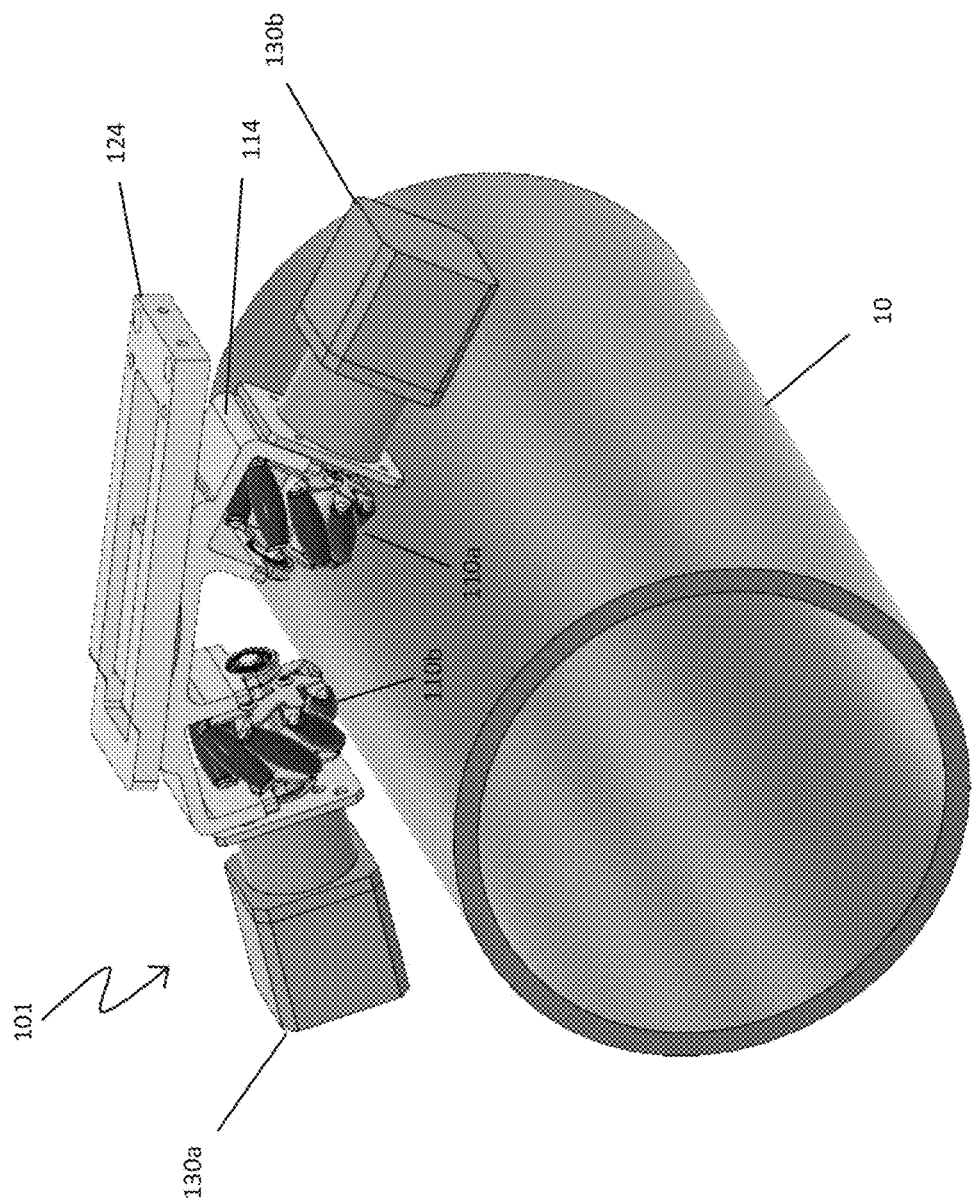
FIG. 29A and FIG. 29B are perspective views of a wheel assembly featuring differential steering and two mecanum wheels in accordance with an embodiment of the present disclosure.
Figure 29B:
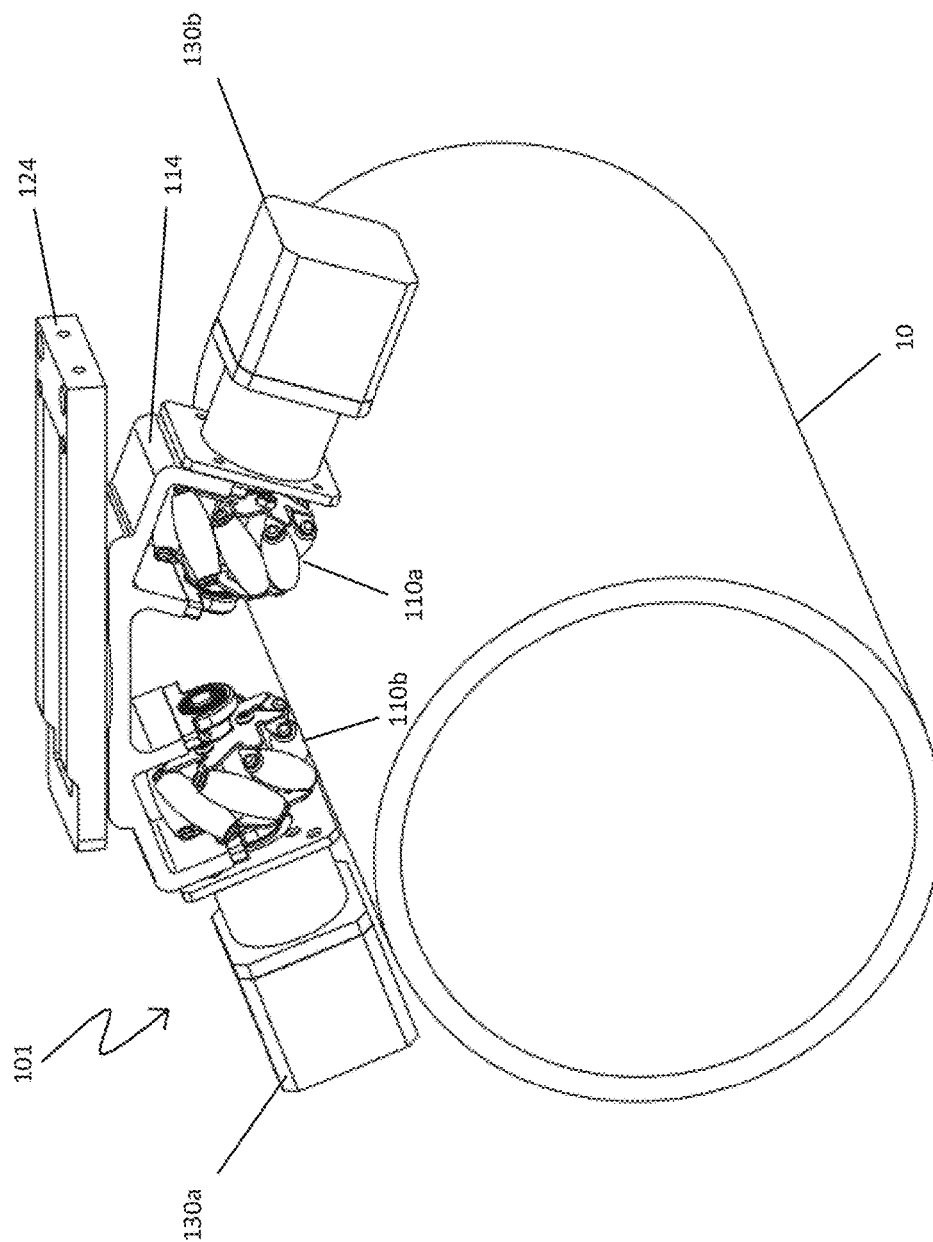

FIG. 29A and FIG. 29B depicts another embodiment of wheel assembly 101 similar to the embodiment of FIG. 28A and FIG. 28B, except that the present embodiment features two mecanum wheels 110a, 110b instead of two cylindrical wheels. Mecanum wheels are wheels with a series of rollers attached at a 45 degree angle along the circumference of the wheel, as shown. Because the rollers are spinning freely, the mecanum wheel can slide without spinning on its main axis at a 45 degree angle from the axis of rotation. Mecanum wheels were first patented in the United States in 1974 in U.S. Pat. No. 3,876,255 (which is incorporated herein by reference for all purposes) and have since undergone improvements known in the art. When motors 130a, 130b drive mecanum wheels 110a, 110b, these wheels can exert a force on the surface of pipe 10 at a 45 degree angle in the opposite direction from the axis of rotation (i.e., 90 degrees from the freely sliding direction). In the present embodiment, mecanum wheels 110a, 110b may be mounted in mirrored orientations (one right-hand and one left-hand), as shown, such that mecanum wheels 110a, 110b exert forces perpendicular to each other when driven by motors 130a, 130b. Driven independently, mecanum wheels 110a, 110b can exert a net force in any direction along pipe 10. Hence, by mounting two mirrored mecanum wheels 110a, 110b next to each other in wheel assembly 101, robotic apparatus 100 can drive in any direction along the surface of pipe 10. In other words, robotic apparatus 100 of the present embodiment can drive in a purely longitudinal direction, purely circumferential direction, or any combination thereof (e.g., helical motion), rather than being limited to travel in only longitudinal and helical directions as with previously described embodiments. It should be noted that in the present embodiment, wheel frame 114 need not be rotatably coupled to base plate 124 as in previous embodiments—instead, base plate 124 may either be eliminated, merged into a single component with wheel frame 114, or otherwise non-rotatably coupled to wheel frame 114. Further, unlike other wheel designs, mecanum wheels 110a, 110b of the present embodiment should contact pipe 10 along the centerline of the wheels and thus mecanum wheels 110a, 110b may be spaced apart or angled accordingly for a given pipe diameter.

Similar to the embodiments of FIG. 27A, FIG. 27B, FIGS. 28A, and 28B, the present embodiment featuring mecanum wheels provides for a lower profile and lower motor torque requirements due to smaller wheel diameter relative to the embodiments of FIG. 4B, FIG. 25A, FIG. 25B, FIG. 26A, and FIG. 26B. Further, the present embodiment advantageously allows for the ability to drive robotic apparatus 100 in a purely circumferential direction and is easier to manufacture due to not requiring wheel frame 114 to be able to rotate. That said, wheel assembly 101 of the present embodiment may have a wider profile since the alternative wheel shape may make it more difficult to fit motors 130 inside wheels 110, and have higher motor speed requirements due to smaller wheel diameter.

Configurations for Decreasing Required Clearance

Many industrial environments in which robotic apparatus 100 may operate are dense with pipes and other structures. This can make it difficult for some embodiments of robotic apparatus 100 to traverse and rotate pipe 10 without running into one of these nearby pipes or structures. In various embodiments, certain adaptations may be made to components and the configuration of robotic apparatus 100 to decrease the required clearance such that robotic apparatus 100 can drive and rotate around pipes 10 that are closer to such other pipes and structures.

Figure 30A:
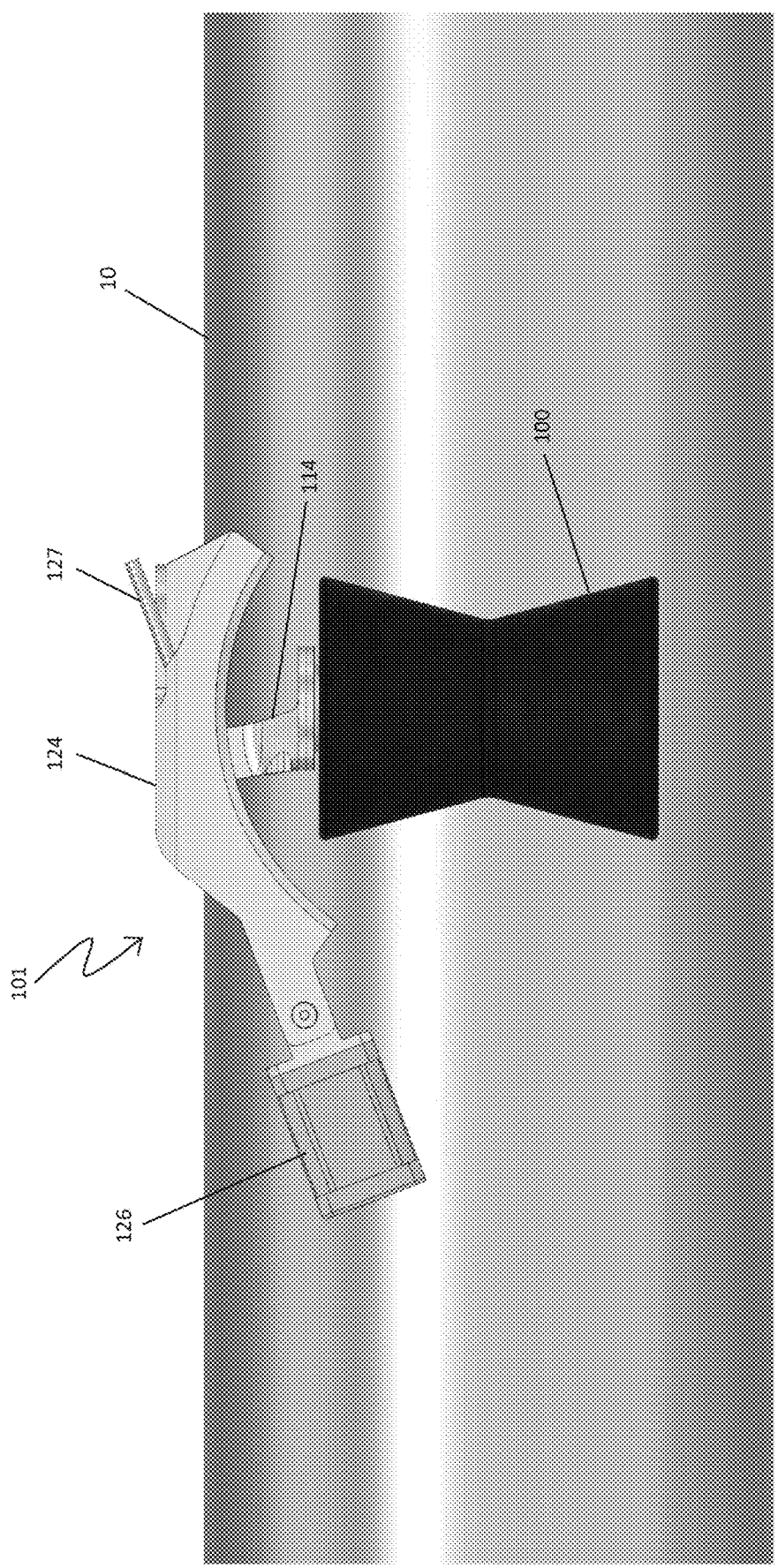
FIG. 30A, FIG. 30B, and FIG. 30C illustrate another reduced-clearance configuration of a robotic apparatus, in accordance with an embodiment of the present disclosure.
Figure 30B:
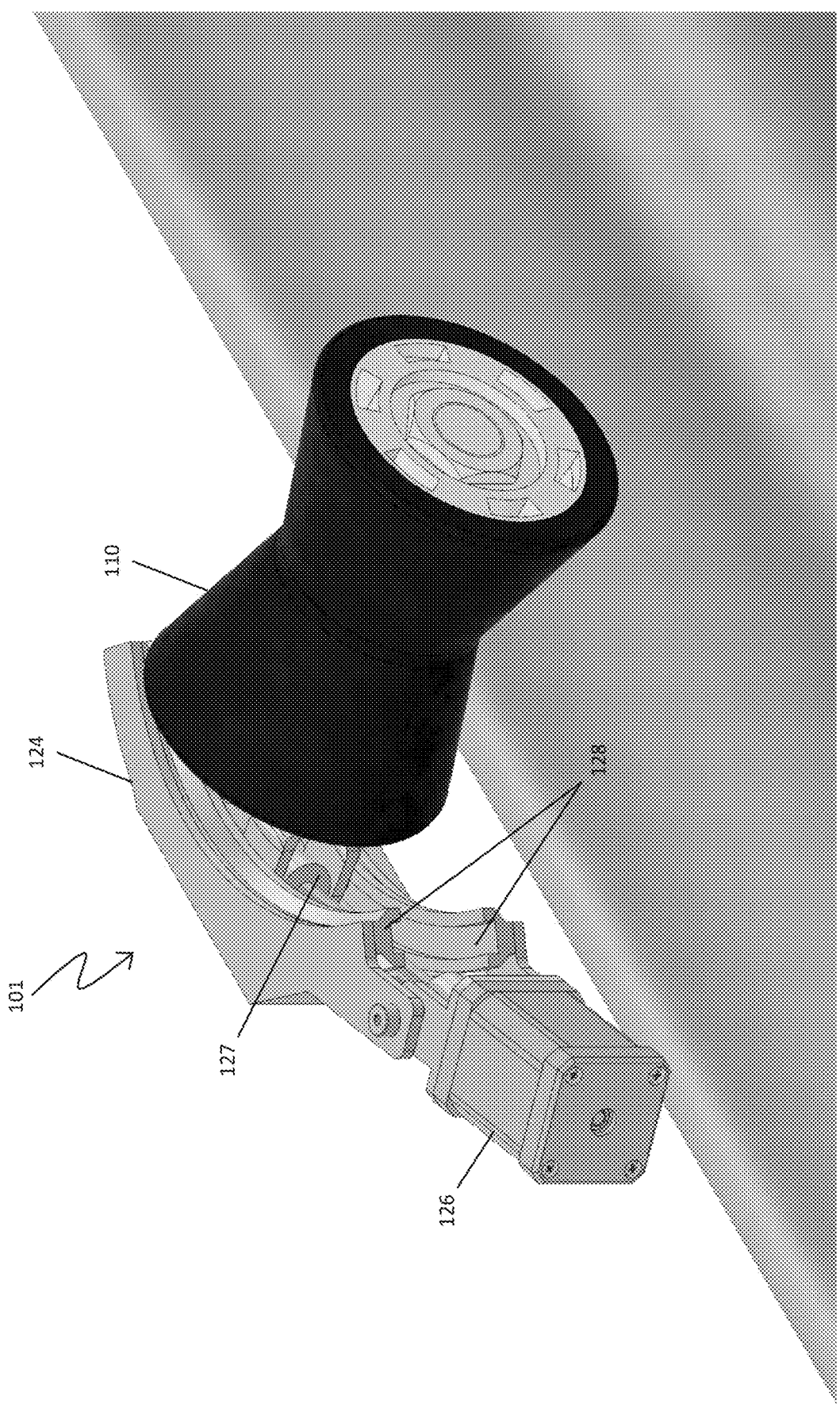
Figure 30C:
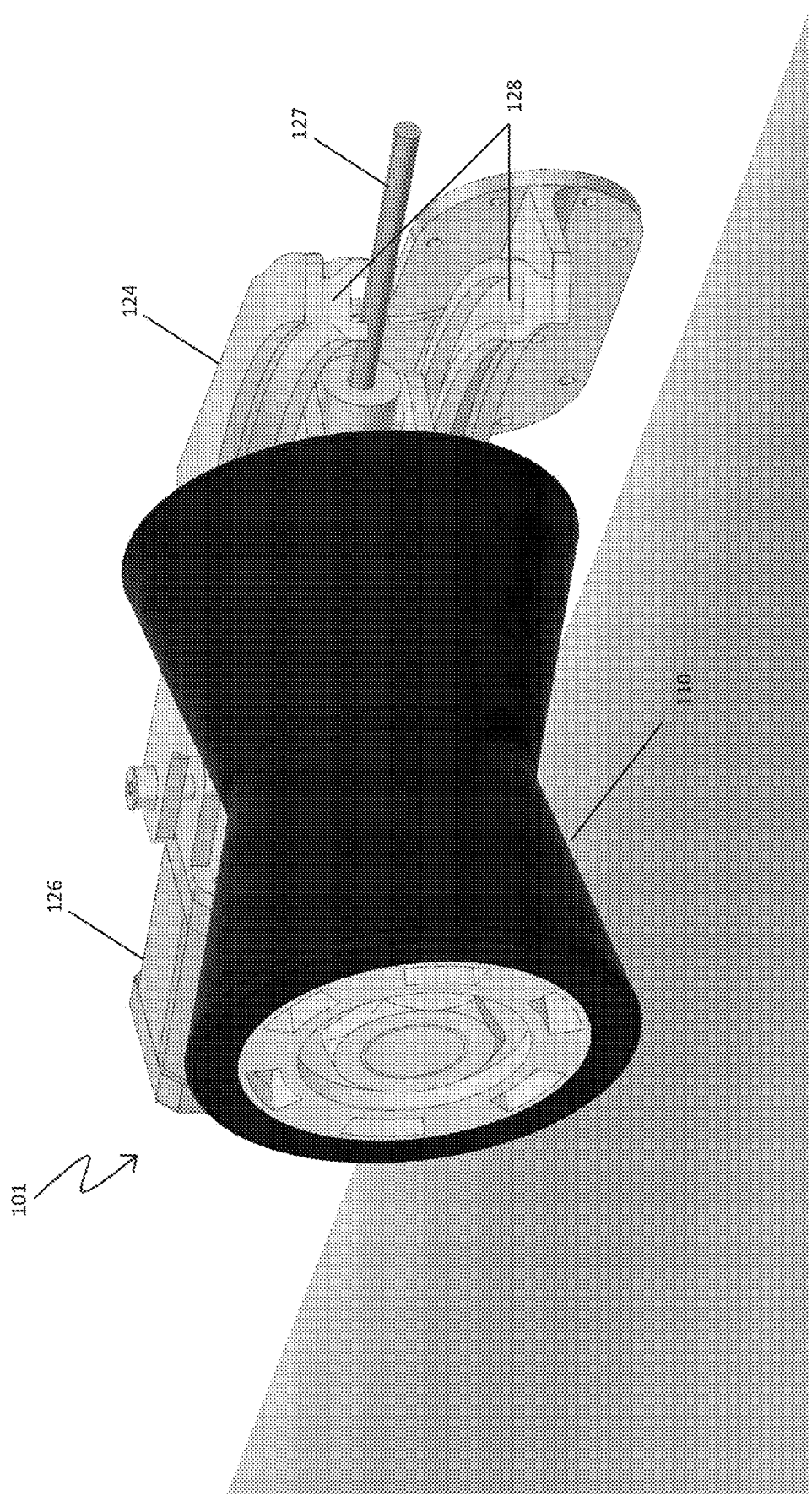

FIG. 30A, FIG. 30B, and FIG. 30C illustrate one such adaptation for reducing required clearance in which alignment mechanism 120 is modified for positioning next to wheel 110, rather than above wheel 110, which reduces the height of wheel assembly 101.

Modified alignment mechanism 120, in various embodiments, may generally include a curved track 128 and a wheel post 129 configured to slide within curved track 128. Curved track 128, in an embodiment, may be positioned to the side of wheel 110 and oriented such that the inside of its curvature faces the side of wheel 110, as shown. Wheel post 129, in an embodiment, may extend laterally from wheel 110 (e.g., along an axis of rotation of wheel 110) and slidably couples with curved track 128 such that wheel post 129 is aligned with the radius of curvature of curved track 128. Stated otherwise, wheel post 129 constantly points towards the focal point of the arc defined by curved track 128 and pivots about this focal point as wheel post 129 slides to various positions along curved track 128. The resulting change in orientation of wheel post 129 effectively steers wheel 110 about a yaw axis of robotic apparatus 100 for side-to-side for helical maneuvers or to run straight along pipe 10.

In various embodiments, the position of wheel post 129 along curved track 128 can be controlled by extending and retracting a actuation member 127 using a linear actuator 126. As best shown in FIG. 30, linear actuator 126 may be coupled to an end of curved track 128 and a distal end of actuation member 127 may be coupled to wheel post 129. As configured, when linear actuator 126 extends actuation member 127, actuation member 127 pushes wheel post 129 towards a distal end of curved track 128. Likewise, when linear actuator 126 retracts actuation member 127, actuation member 127 pulls wheel post 129 towards a proximal end of curved track 128.

Due to the curvature of track 128, the orientation of actuation member 127 should remain predominately tangential to curved track 128 at the point where actuation member 127 couples with wheel post 129, otherwise the forces applied to wheel post 129 by actuation member 127 will not be substantially aligned with the pathway of curved track 128. If the applied forces become too misaligned, the assembly may jam. Manufacturing curved track 128 to tight tolerances, along with coating it with an oil film, low friction plastic, or other friction-reducing material or mechanism can help minimize jamming. By rotatably coupling linear actuator 126 about an axis transverse to curved track 128, as best shown in FIG. 30, linear actuator 126 is allowed to rotate and thereby accommodate realignment of actuation member 127 as urged by reaction forces applied by wheel post 129 as it follows curved track 128. Stated otherwise, by allowing linear actuator 126 to rotate, actuation member 127 can push or pull wheel post 129 in a localized direction of curved track 128 such that wheel post 129 slides smoothly within curved track 128 as it is repositioned along track 128 accordingly.

It should be recognized that, while described in the context of reducing the amount of clearance necessary for robotic apparatus 100 to avoid nearby pipes and structures, the preceding embodiments are not necessarily limited to tight-clearance applications, but rather may be utilized in any suitable application.

Figure 31A:
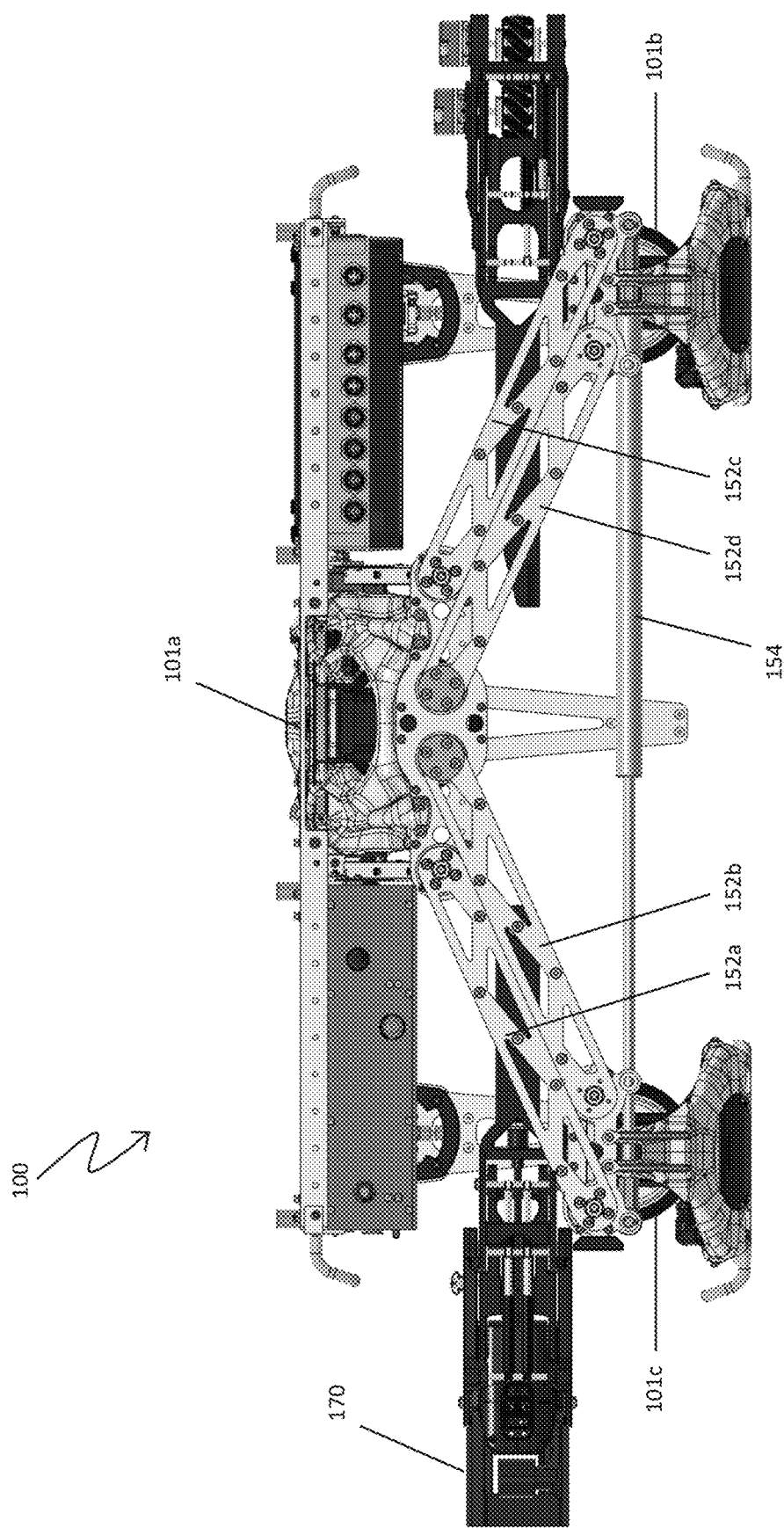
FIG. 31A, FIG. 31B, and FIG. 31C illustrate a reduced-clearance configuration of a robotic apparatus, in accordance with an embodiment of the present disclosure.
Figure 31B:
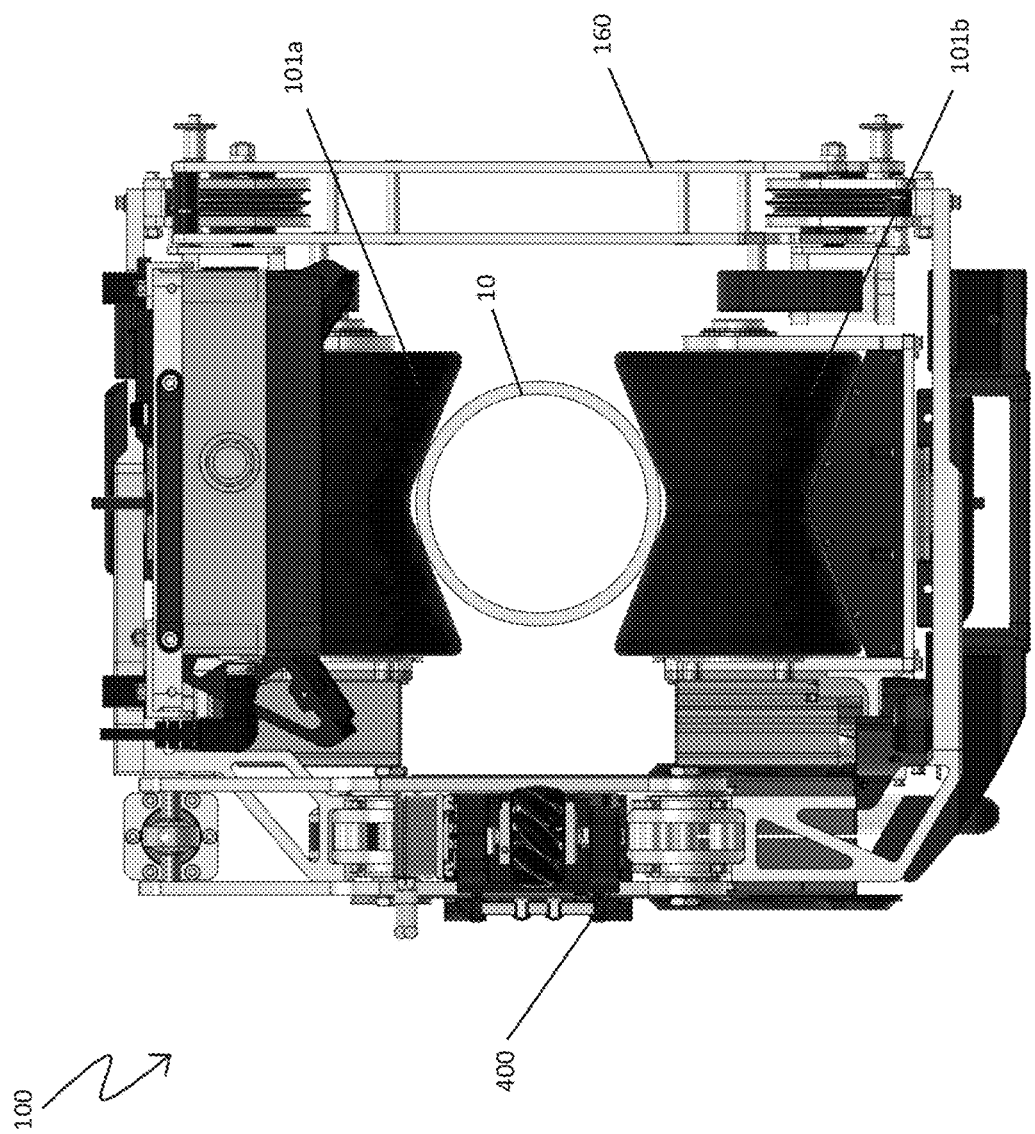
Figure 31C:
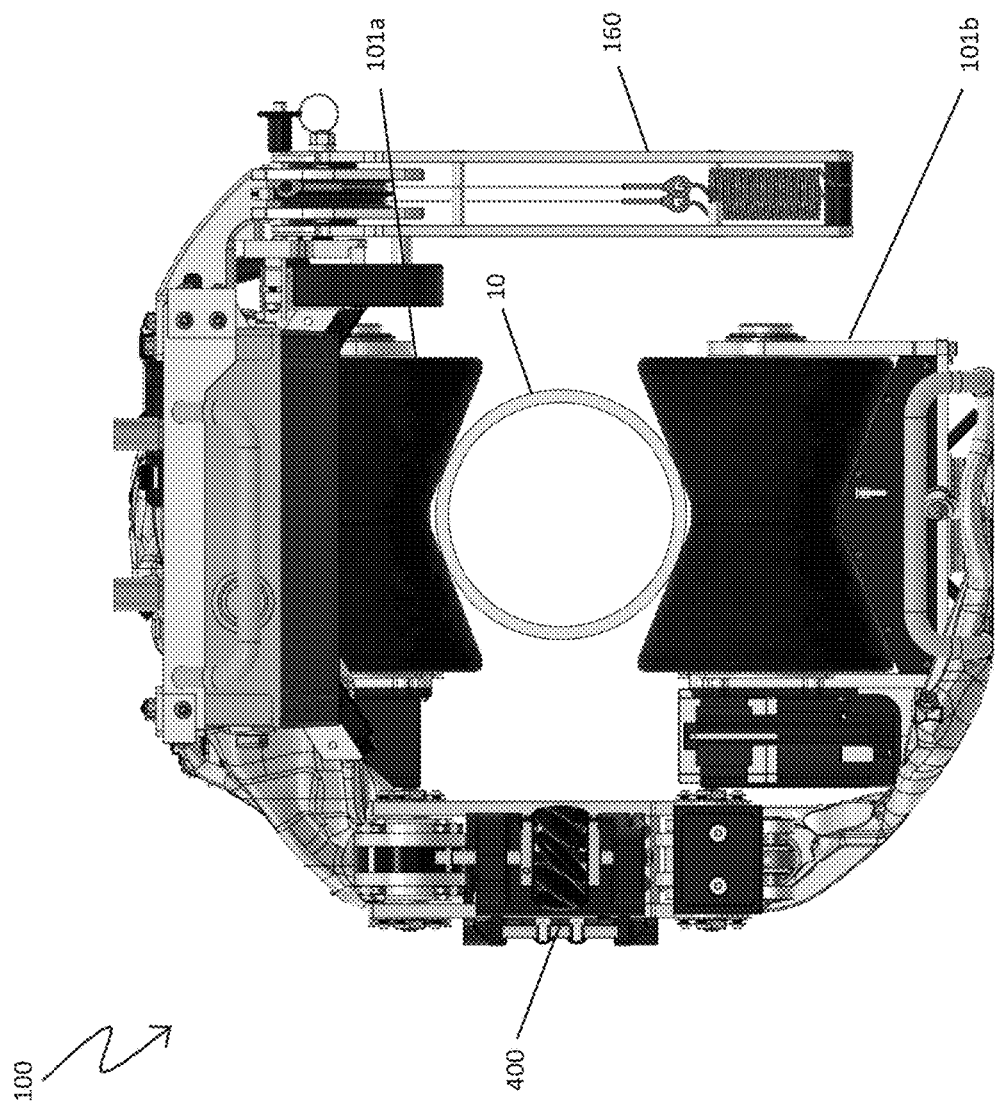

FIG. 31A, FIG. 31B, and FIG. 31C illustrate another adaptation in which the mounting location of biasing member 154 is moved to another location to reduce the clearance required around wheel assembly 101a. As previously described and best shown in FIGS. 5A-5C, in some embodiments, biasing member 154 may take the form of a gas tension spring or other pulling member that connects clamping mechanism arms 152a, 152c. In such a configuration, biasing member 154 may need to be positioned above wheel assembly 101a where arms 152a, 152c can extend far enough from their pivot points to provide favorable leverage for clamping member 150 to clamp robotic apparatus 100 securely to pipe 10, which increases the clearance is required for the top of robotic apparatus 100 to freely pass by nearby obstacles. As shown in FIG. 31A, FIG. 31B, and FIG. 31C, in various embodiments, biasing member 154 can be moved downward so as to connect wheel assemblies 101b and 101c. This way, biasing member 154 is positioned within the vertical footprint of robotic apparatus 100 defined between wheel assemblies 101a, 101b, 101c at any given time, thereby reducing required clearance between pipe 10 and nearby obstacles. Because, in this adapted configuration, biasing member 154 now acts on clamping mechanism 150 on the opposite side of the pivot points about which arms 152 rotate, biasing member 154 may be configured to extend and thereby push apart wheel assemblies 101b, 101c in order to effect a clamping force on pipe 10. Conversely, in embodiments where biasing member 154 connects arms 152a, 152c above the pivot points (as in FIG. 5A, FIG. 5B, and FIG. 5C, for example), biasing member 154 may be configured to retract and thereby pull upper portions of arms 152a, 152c together, such that the lower portions of arms 152a, 152c associated with wheel assemblies 101b, 101c on the opposite side of the pivot points spread apart in order to effect a clamping force on pipe 10.

Locking Fail-Safe Mechanism

Testing indicates that some embodiments of fail-safe mechanism 160 may be pushed away from their neutral orientation unintentionally. For example, if robotic apparatus is slowly slipping off of pipe 10, friction between pipe 10 and arm members 162 can cause arm members 162 to swing away from their neutral position as robotic apparatus 100 continues to move forward. If arm members 162 swing far enough, they may not catch robotic apparatus 100 as it falls off of pipe 10.

Figure 32B:
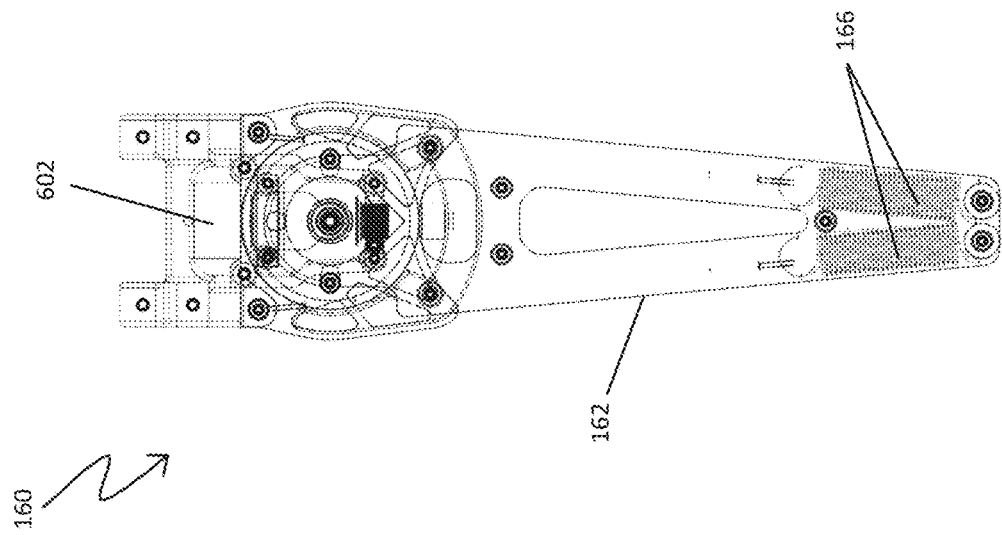
Figure 32A:
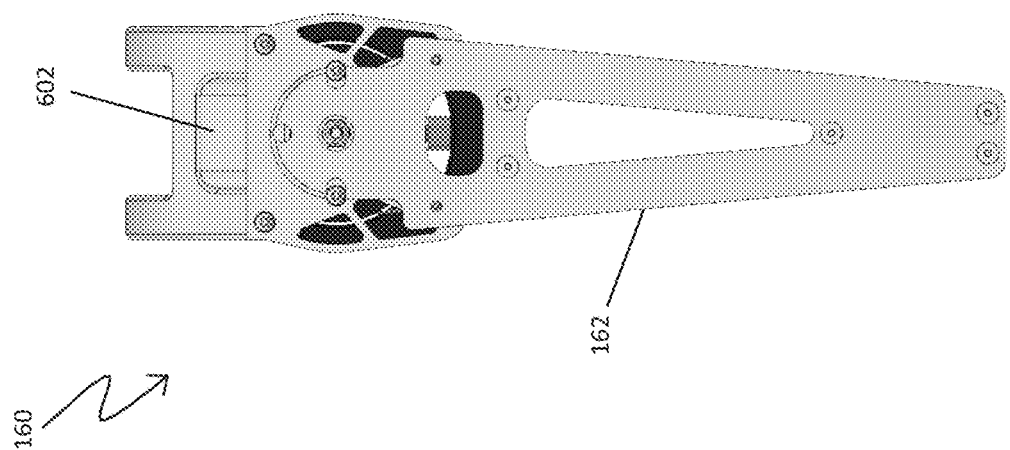

FIG. 32A, FIG. 32B, and FIG. 32C depict an embodiment of fail-safe mechanism 160 configured to address these challenges by actively controlling when arm members 162 are permitted to swing and when they are not. For example, in situations where robotic apparatus 100 is traversing pipes 10 (or sections of pipes 10) that do not include obstacles such as supports, junctions, flanges, valves, vents, bleeders, or the like, an operator or autonomous control system could lock arm members 162 in the neutral position since it is not necessary for them to swing in order for robotic apparatus 100 to traverse such obstacles. Should robotic apparatus 100 slip during such operation, the locked arm members 162 would arrest its fall. As another example, robotic apparatus 100, in an embodiment, may be configured to automatically lock arm members 162 upon detecting slip conditions with its onboard sensors. Likewise, an operator could quickly send a command to lock arm members 162 if he/she detected that robotic apparatus 100 was slipping while monitoring onboard sensor readings, live stream video send from robotic apparatus 100, or while watching robotic apparatus in-person. In another embodiment, arm members 162 may be locked by default (including when robotic apparatus 100 is powered off) and selectively unlocked when needed. For example, arm members 162 may be selectively unlocked when installing/uninstalling robotic apparatus 100 on pipe 10 and/or when traversing obstacles protruding from pipe 10. One of ordinary skill in the art will recognize other scenarios in which it may be beneficial to lock or unlock arm members 162 to mitigate fall risk while preserving practical functionality.

Fail-safe mechanism 160, in various embodiments, may include a locking mechanism 600 configured to actively lock and unlock swinging motion of arms 162. In the embodiment of FIG. 32A, FIG. 32B, and FIG. 32C, locking mechanism 600 may include a "pin-and-track" arrangement in which an actuator 602 (e.g., a solenoid) is used to control the position of a pin 604 around which a track 606 is moving. Pin 604, in an embodiment, may be rigidly mounted to the stationary section of fail-safe mechanism 160 and track 606, in an embodiment, may be rigidly mounted to swinging arm member 162. When pin 604 is retracted, it does not interfere with movement of track 606, and thus arm member 162 is permitted to swing. When pin 604 is extended, it interferes with track 606 (e.g., by extending into a cutout 607 in track 606 such that a side wall of the cutout 607 hits pin 606) and thus the range of motion of arm member 162 is limited to the size of the cutout 607 in track 606. In an embodiment, the cutout 607 in track 606 is wider than pin 604 such that pin 604 can engage track 606 even if arm member 162 does not fully swing back to the neutral position in response to the restorative forces applied by biasing members 166.

Similar to the embodiment of FIG. 10C, biasing mechanism 166 may include an assembly of linear springs 167a, 167b connected by a cable to a pulley assembly 168; however, in the present embodiment, linear springs 167a, 167b are placed in swinging arm member 162 and pully assembly 168 is placed in the upper static section of fail-safe mechanism 160. Each biasing member 166 (e.g., tension springs) in arm member 162 may have the same spring constant and oppose one another such that the net force generated by motion of arm member 162 is a restorative force that moves arm member 162 to the neutral (middle) position. While the present configuration frees up space for accommodating locking mechanism 600 in the static portion of fail-safe mechanism 160, it should be recognized that previously-described embodiments of biasing mechanism 166 may also be used with active locking/unlocking configurations as well, space permitting.

Figure 33:
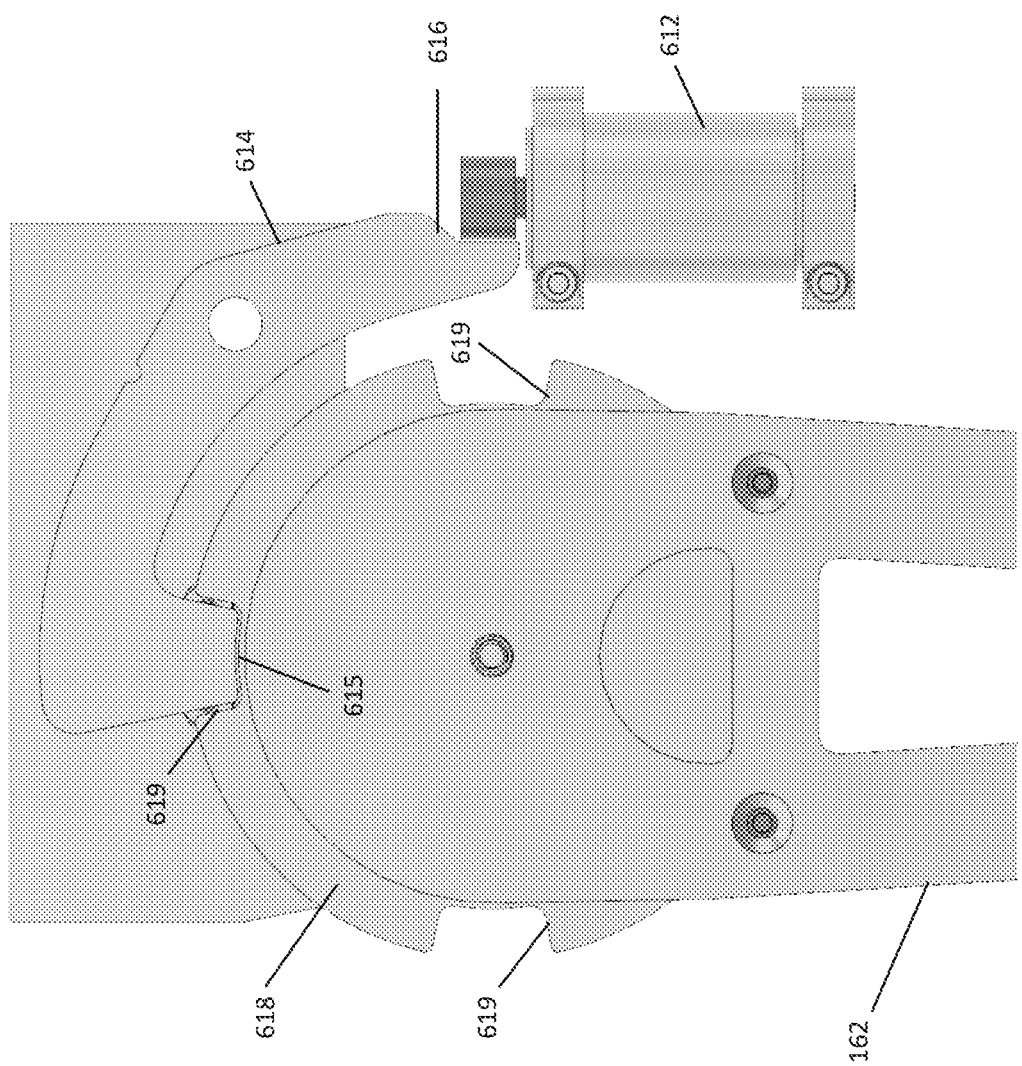
FIG. 33 depicts another embodiment of a fail-safe mechanism including a locking mechanism, in accordance with an embodiment of the present disclosure.

FIG. 33 depicts another embodiment of fail-safe mechanism 160 including a locking mechanism 600 configured to actively lock and unlock swinging motion of arms 162. In the embodiment of FIG. 33, locking mechanism 600 may include a "lever-and-cog" arrangement in which an actuator 612 (e.g., solenoid) is used to control the position of a lever 614 relative to a cog 618. Cog 618, in an embodiment, may be rigidly mounted to the swinging arm member 162. Lever 614, in an embodiment, may be rotatably coupled to the stationary part of fail-safe mechanism 160 and, in an embodiment, may be biased by a passive element such as a torsion spring at the rotatable coupling (not shown) so that a first end 615 of lever 614 engages a cutout 619 in cog 618, thereby preventing arm member 162 from swinging. Actuator 612 may be positioned so as not to interfere with a second end 616 of lever 614 in this locked state, but also in a position that allows actuation 612 to push on the second end 616 of lever 616 in a direction that causes the first end 615 of lever 614 to disengage from cog 618 when actuator 612 is actuated. As configured, actuator 612 can be selectively actuated and released to actively unlock arm member 162 and to allow arm member 162 to be locked by lever 614, respectively. Advantageously, for embodiments using a lever-and-cog locking mechanism 600, if a sideways force is applied to arm member 162 lever-and-cog embodiment of locking mechanism 600, most of the force will be transferred to lever 614 and its pivot point rather than to pin 604 of actuator 602, which may not always be configured to handle large sideways forces depending on the construction.

It should be recognized that the pin-and-track and lever-and-cog mechanisms described herein are merely representative embodiments of locking mechanism 600 and that one of ordinary skill in the art benefitting from the present disclosure will recognize alternative constructions of locking mechanism 600 that may be suitable or actively controlling when arm members 162 are permitted to swing and when they are not.

Positioning of Sensor Assemblies

Figure 34A:
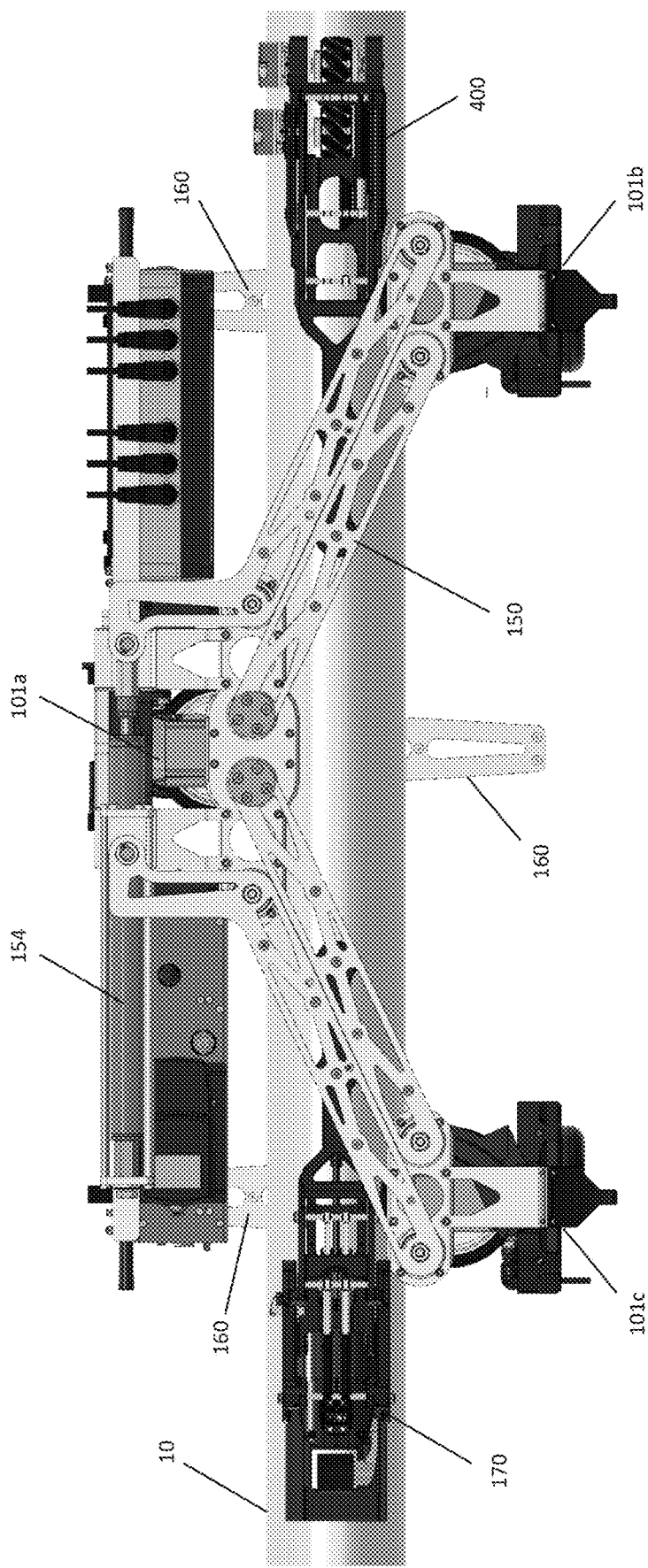
FIG. 34A, FIG. 34B, and FIG. 34C illustrate another embodiment of a robotic apparatus featuring an alternative sensor assembly, in accordance with an embodiment of the present disclosure.
Figure 34B:
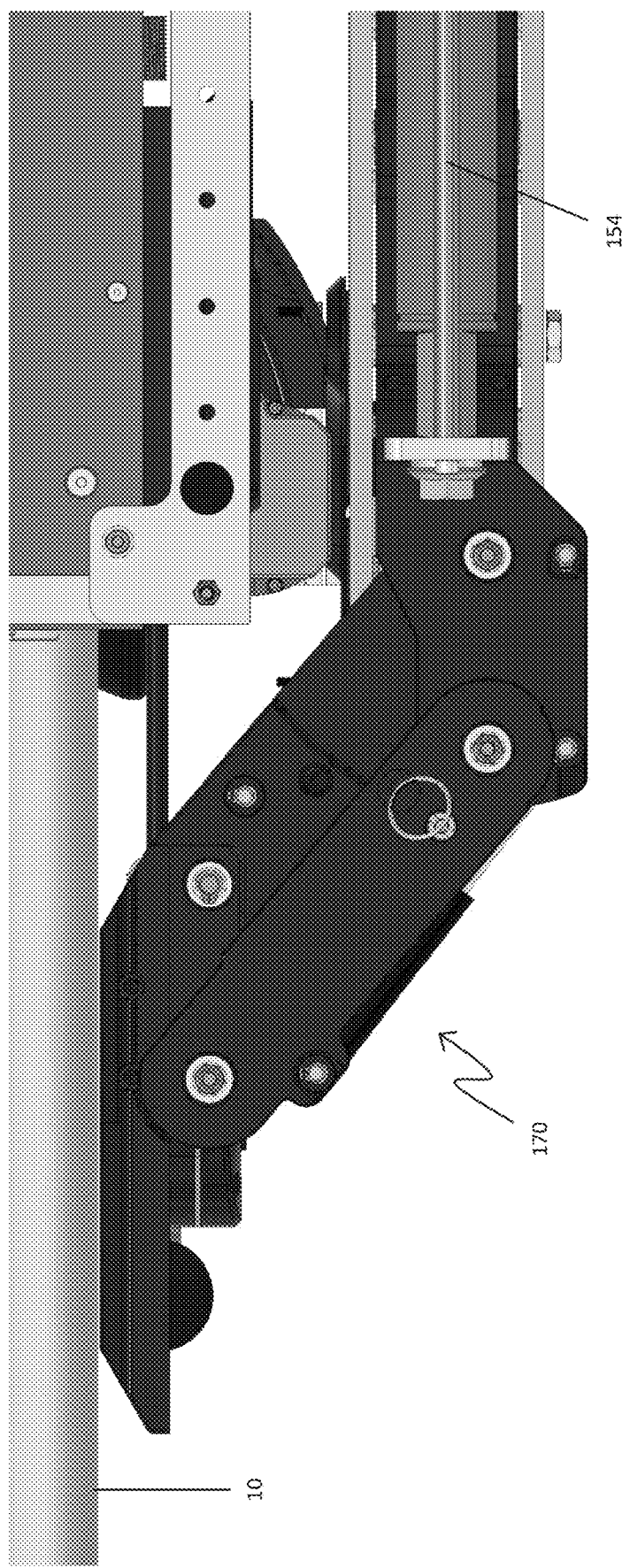
Figure 34C:
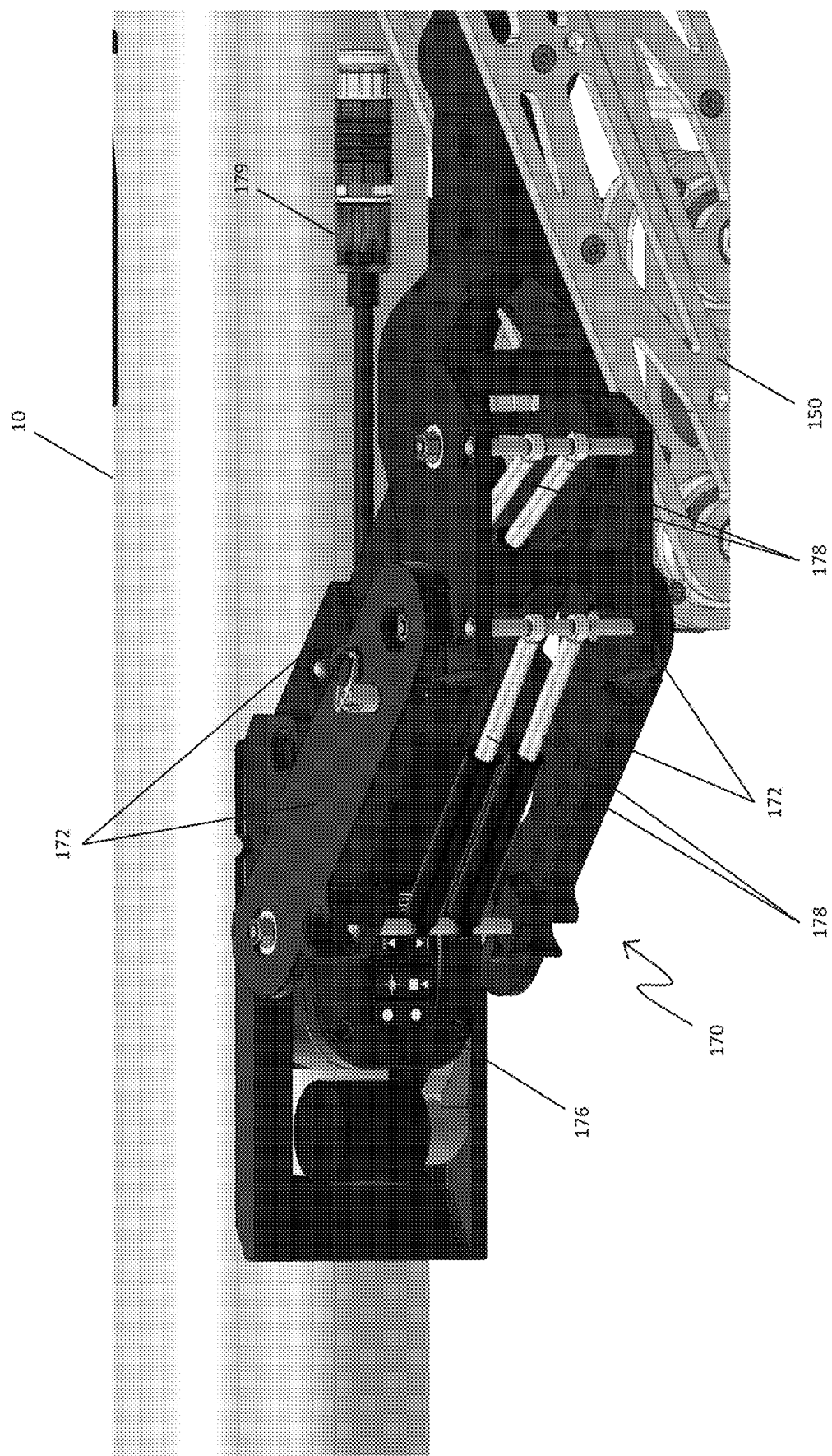

FIG. 34A, FIG. 34B, and FIG. 34C illustrate another embodiment of robotic apparatus 100 featuring an alternative inspection sensor assembly 170 for performing structural inspections of pipe 10. FIG. 31A also shows the alternative inspection sensor assembly 170. Unlike some other embodiments, the alternative inspection sensor assembly 170 now described does not require any active elements such as actuators or motors to hold sensor 176 against the surface of pipe 10. This reduced complexity, in some cases, decrease manufacturing costs and increase reliability.

Similar to other embodiments described herein, the alternative inspection sensor assembly 170 may include arms 172 comprising a four-bar linkage which keeps sensor 176 parallel to is mounting points. Instead of using active biasing elements, arms 172 of the alternative inspection sensor assembly 170 now described may be biased by passive elements 178, such as compression springs, to push sensor 176 against pipe 10 and passively adjust. As configured, sensor 176 and arms 172 are permitted to move up and down to adjust for changes in pipe diameter, and also allow robotic apparatus 100 to slip off of the centerline of pipe 10 without sensor 176 losing contact with pipe 10. A cable 179 may connect sensor 176 to other electronics onboard robotic apparatus 100, such as processor 1030 (later described).

Inspection sensor assembly 170, in various embodiments, may be mounted parallel to and halfway up and down (i.e., at the vertical midpoint of) clamping mechanism 150, as best shown in the embodiments of FIG. 31A and FIG. 34A. Advantageously, such a configuration places sensor 176 such that it will always be strictly radial with respect to pipe 10. Stated otherwise, as sensor 176 and arms 172 toward and away from pipe 10, sensor 176 remains parallel to the surface of pipe 10 (although this is not necessarily unique to this mounting location). Further, such a configuration facilitates installation of robotic apparatus 100 on pipe 10. Since arms 172 are mounted on the opposite side from the "open" side of robotic apparatus 100, arms 172 will automatically be pushed away and adjust to pipe 10 as robotic apparatus 100 is maneuvered to accept pipe 10 in its interior through the "open" side during installation on pipe 10. Likewise, as later described, sensor assembly 400 may be mounted parallel to and halfway up and down (i.e., at the vertical midpoint of) clamping mechanism 150 to similar effect.

Robotic Sensing and Controls

Sensing and Controls Architecture

Figure 35:
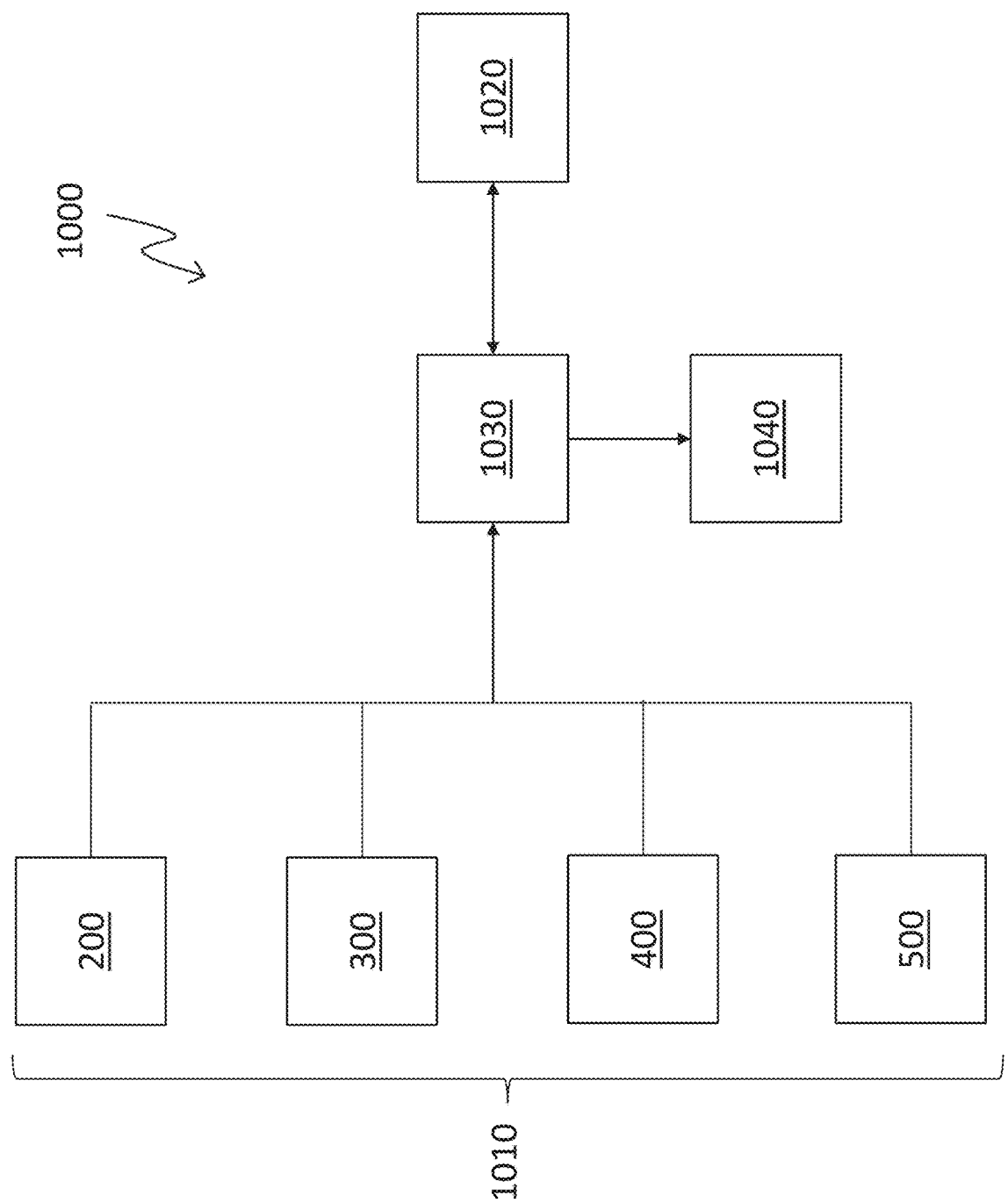
FIG. 35 depicts a representative sensing and controls system architecture for use with a robotic apparatus, in accordance with an embodiment of the present disclosure.

FIG. 35 depicts a representative sensing and controls system architecture 1000 for use with robotic apparatus 100 in various embodiments of the present disclosure. Architecture 1000, in various embodiments, may generally include sensor(s) 1010, a memory(s) 1020, a processor(s) 1030, and optionally actuator(s) or motor(s) 1040, as later described in more detail. While described as separate components, one of ordinary skill in the art will recognize sensor(s) 1010, memory(s) 1020, and processor(s) 1030, or any combination of all or some of these components, may be provided as subcomponents of computer hardware having corresponding functionalities. For example, memory(s) 1020 and processor(s) 1030 may be provided in combination in the form of a microcontroller, along with input/output peripherals for connecting to sensor(s) 1010, actuator(s)/motors(s) 1040, and the like. In various embodiments, references to various sensing and robotic controls methodologies throughout the present disclosure may be enabled using architecture 1000.

It should be further recognized that architecture 1000 may optionally include one or more human-machine interfaces (not shown), such as a handheld remote and a laptop computer, to provide input to robotic apparatus 100 (e.g., send instructions to processor 1030) and/or to receive and monitor real-time output from sensors 1010. Representative inputs include, without limitation, joystick controls and button-presses on a handheld remote and text input on a laptop. Representative output includes, without limitation, information collected by sensors 1010 (whether or not preprocessed by processor 1030), live video feed from an onboard camera(s), and text-based outputs from onboard sensors 1010 relaying information such as distance, speed, and orientation.

Sensor(s) 1010, in various embodiments, may include one or more onboard and/or offboard sensors configured to provide information about robotic apparatus 100 and its interactions with the surrounding environment. In various embodiments, sensors 1010 may include any one or combination of those sensors provided in sensor assemblies 200, 300, 400, 500, depending on the particular sensing and/or controls application at hand. Representative information collected by sensors 1010 about robotic apparatus 100 may include, for example, relative positions of wheel assemblies 101; relative speeds of wheels 110; orientations of wheels 110; and positions of actuator(s) 1040. Representative information about interactions between robotic apparatus 100 in its environment may include the position, speed, acceleration, and orientation of robotic apparatus 100 on pipe 10; forces applied to or exerted by robotic apparatus 100 such as clamping forces and wheel traction. Of course, the preceding examples are merely representative and sensor(s) 1010 may collect any other information relevant to operating robotic apparatus 100 in accordance with the present disclosure.

Memory(s) 1020, in various embodiments, may include any hardware suitable for storing computer-readable instructions relevant to executing the various sensing methodologies presented herein, such as volatile and/or non-volatile memory units. For example, with reference ahead to FIG. 36 and FIG. 37, memory 1020 may contain instructions for processing information provided by distance sensors 210 or rotary encoders 310, respectively, along with known information stored in memory 1020 regarding the geometry of robotic apparatus 100, in accordance with the associated mathematical models to calculate the diameter of pipe 10 and/or measure radial movement of robotic apparatus 100 on pipe 10. As another example, with reference ahead to FIG. 39A, FIG. 39B, FIG. 40A, FIG. 40B, memory 1020 may contain instructions for processing information provided by rotary encoder 420 in accordance with the associated mathematical calculations to determine motion of robotic apparatus 100 along pipe 10. Likewise, memory 1020 may contain instructions for processing information provided by encoder 510, inertial measurement unit 520 and or optical flow sensors 530 in accordance with the associated mathematical calculations to measure axial and circumferential movement of robotic apparatus 100 on pipe 10. In yet another example, with reference ahead to FIG. 38, memory 1020 may contain instructions for utilizing data input from the four sources described in accordance with the associated methodologies to determine the absolute position of robotic apparatus 100 on pipe 10.

Memory(s) 1020, in various embodiments, may additionally or alternatively store computer-readable instructions relevant to executing the various controls methodologies presented herein. For example, with reference ahead to FIG. 47, memory 1020 may contain instructions for processing sensor information regarding actual position to detect radial slip, circumferential slip, longitudinal slip, or any combination thereof and to automatically correct the slip by actuating drive motors 130 and/or alignment motors 122 in accordance with the methodologies described in the associated disclosure. In another example, with reference ahead to FIG. 45, FIG. 46A, and FIG. 46B, memory 1020 may contain instructions for commanding drive motors 130 to rotate wheels 110 in accordance with wheel speed profiles suitable for navigating an upcoming bend or curve in pipe 10. In yet another example, with reference ahead to FIG. 43 and FIG. 44, memory 1020 may contain instructions for processing sensor information regarding a location of robotic apparatus 100 on pipe 10 relative to intended location to develop commands for driving robotic apparatus along a predetermined path and correcting for any deviations therefrom in accordance with the methodologies described in the associated disclosure.

Processor 1030, in various embodiments, may include any hardware suitable for executing the computer-readable instructions stored in memory 1020 to perform the various sensing and controls methodologies presented herein. Processor 1030, for example, may in various embodiments monitor information provided by relevant sensors 1010 to detect certain thresholds, triggers, trends, and other indicia of conditions relevant to a particular sensing methodology described herein. In embodiments involving robotic controls, processor 1030 may also use such information to, in turn, control motion of robotic apparatus 100 using actuators or motors 1040 (e.g., relevant actuators or motors described throughout the present disclosure) and its components in accordance with control laws provided in the instructions stored on the memory. As configured, processor 1030 may function as a controller. It should be recognized that references herein to a controller may refer to embodiments of processor 1030 that are configured in this way.

Measuring Diameter of Pipe 10

Sensing and control system 1000, in various embodiments, may be configured in part to measure the diameter of pipe 10 on which robotic apparatus 100 is travelling. Knowing the diameter of pipe 10 at any given time may provide can facilitate many important sensing and control operations. For example, the diameter of pipe 10 may be used in calculating the circumferential and longitudinal distance robotic apparatus 100 has travelled during a helical maneuver, such as when positioning robotic apparatus 100 to navigate an upcoming obstacle or bend or when indexing robotic apparatus to follow a subsequent segment of a raster path (as later described in the context of FIG. 43 and FIG. 44). Processor 1030 could, for example, calculate where robotic apparatus 100 is at any point during the maneuver by comparing speed, duration, and attitude (e.g., from wheel encoders, IMUs) with pipe diameter to determine the axial and circumferential components of travel during the maneuver. Likewise, the diameter of pipe 10 may be used in tracking an absolute position of robotic apparatus 100 on pipe 10 by determining the longitudinal distance travelled by robotic apparatus 100 during helical maneuvers as later described in the context of FIG. 38. As another example, the diameter of pipe 10 may be used in determining whether robotic apparatus is experiencing any radial displacement on the pipe (e.g., radial slip) as later described in the context of FIG. 48 and FIG. 49. Pipe diameter may also be of interest to an operator or end user of data collected by robotic apparatus 100 if, for example, the person needs to configure an inspection tool (e.g., inspection sensor assembly 170) or other sensor (e.g., sensor assembly 400, later described) based on pipe diameter.

Figure 36:
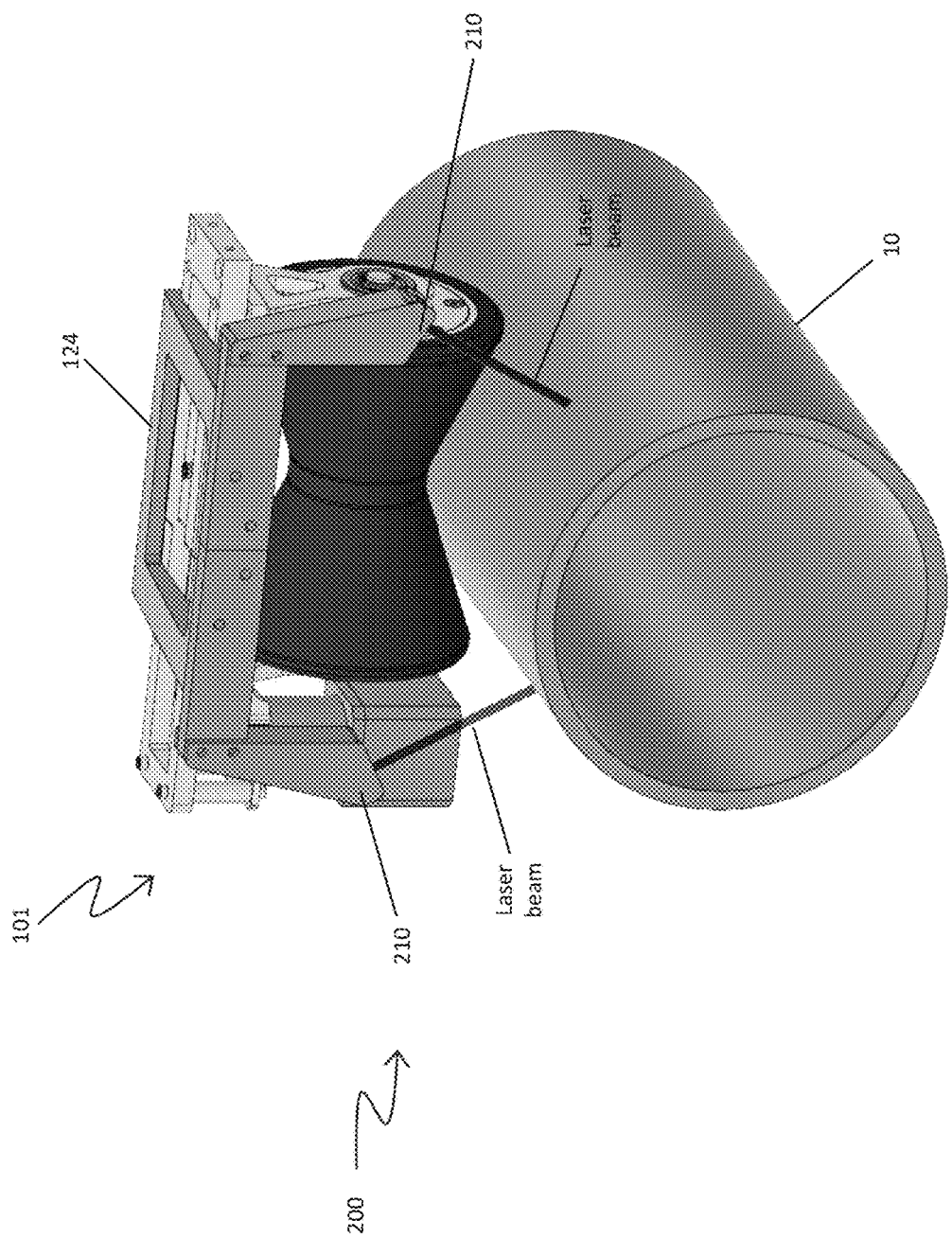
FIG. 36 illustrates a sensor assembly for measuring a diameter of a given portion of a pipe along which a robotic apparatus is traversing in accordance with an embodiment of the present disclosure.
Figure 37:
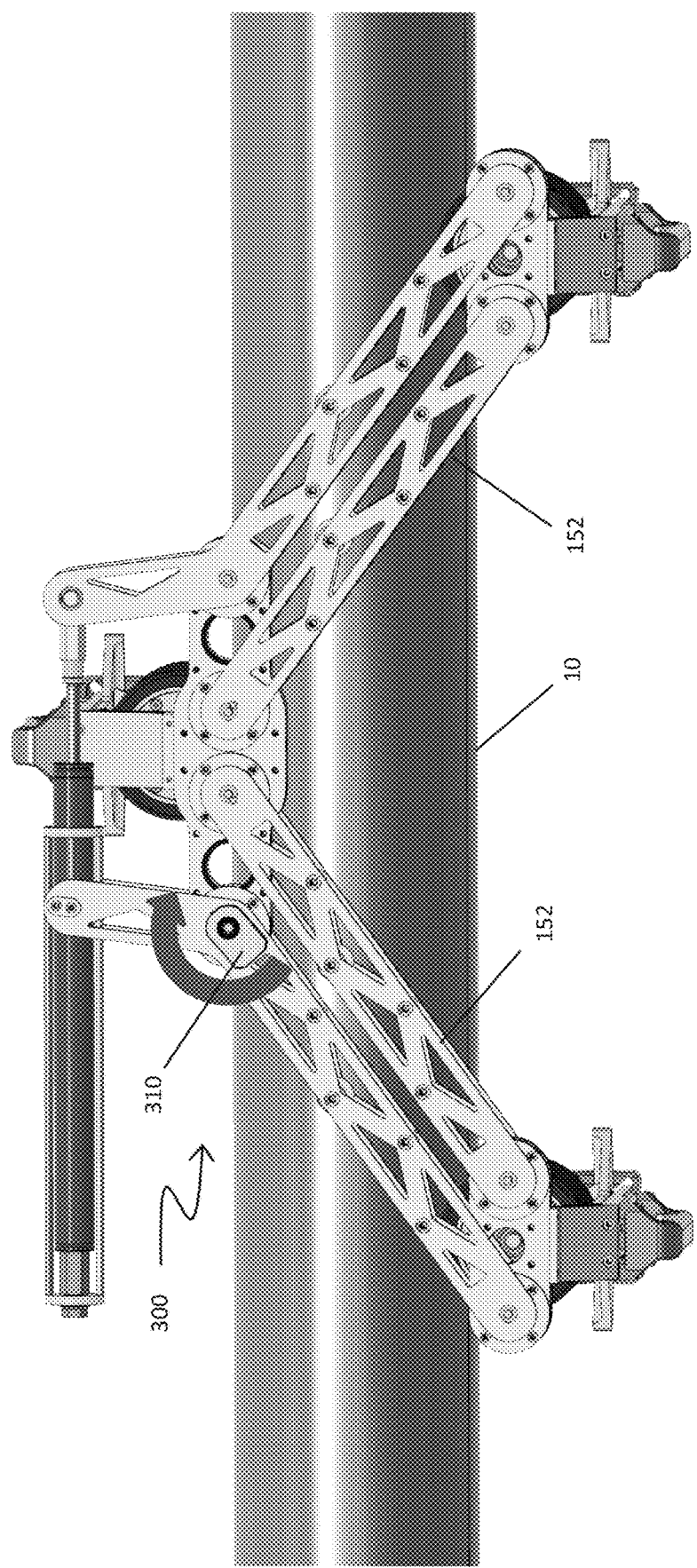
FIG. 37 illustrates an approach for measuring a diameter of a given portion of a pipe along which a robotic apparatus is traversing in accordance with an embodiment of the present disclosure.

FIG. 36 and FIG. 37 illustrate representative embodiments of sensor assembly 200 and sensor assembly 300 which, in various embodiments, may be configured in part for measuring the diameter of pipe 10. It should be understood that sensor assembly 200 and sensor assembly 300 are provided merely as representative embodiments for this purpose and one of ordinary skill in the art may recognize additional and alternative sensor configurations for measuring the diameter of pipe 10.

Sensor assembly 200, in various embodiments, may generally include one or more distance sensors 210 mounted rigidly to robotic apparatus 100 at known positions and orientations. For example, in the embodiment shown, distance sensors 210 may be attached to base plate 124 of wheel assembly 101, amongst other suitable locations on robotic apparatus 100. Using more than one distance sensor 210 may be beneficial in that comparing measurements from multiple distance sensors 210 may provide for differentiating between changes in pipe diameter and radial displacement (e.g., radial slip) resulting in wheels 110 no longer centered on pipe 10, as later described in more detail.

Distance sensor 210, in various embodiments, may include any sensor or sensors suitable for measuring (or providing measurements suitable for the estimating or calculating) a distance between the location where distance sensor 210 is mounted on robotic apparatus 100 and a surface of pipe 10. Distance sensor 210, in some embodiments, may utilize technologies do not contact the surface of pipe 10, such as time-of-flight technologies (e.g., optical distance sensors such as laser rangefinders; ultrasonic proximity sensors), capacitive displacements sensors, and the like. As later described in more detail, in some other embodiments, distance sensor 210 may include a contact member configured to physically contact the surface of pipe 10 and measure the relative position of the contact member to measure the distance between the surface and the location of the distance sensor as mounted to robotic apparatus 100.

Generally speaking, when correctly installed, the particular architecture and geometry of robotic apparatus 100 should situate distance sensor 210 at a predicable location relative the centerline of pipe 10 regardless of pipe diameter. Accordingly, the expected vector and distance between the predicted location and the centerline of pipe 10 can be predetermined. In some embodiments, distance sensor 210 may be oriented on robotic apparatus 100 to take distance measurements along the expected vector. As configured, the diameter of pipe 10, in an embodiments, can be determined by subtracting the measured distance between distance sensor 210 and the surface of pipe 10 from the expected distance between the predicted location and the centerline of pipe 10.

More specifically, the distances measured by each distance sensor 210 may be used as inputs in a mathematical model that calculates pipe diameter based on known information about the geometry of robotic apparatus 100, including the size of wheels 110 and locations at which distance sensors 210 are mounted. The mathematical model is based on the geometry in the 2-dimensional cross-sectional plane that is normal to the longitudinal axis of the pipe and is parallel with the axis of rotation of the wheel. In this plane there are three unknown variables that describes the pipe position and size (x-coordinate, y-coordinate, diameter). As described in linear algebra, a system of three independent equations can be used to find a unique solution for three unknown variables. In the aforementioned mathematical model, the three independent equations specify that (i) the coordinates extrapolated from the first distance sensor mounting point, angle, and measured distance must coincide with a first point on the circumference of the pipe, that (ii) the coordinates extrapolated from the second distance sensor mounting point, angle, and measured distance must coincide with a second point on the circumference of the pipe, and that (iii) the pipe circumference must be tangent to the wheel.

Additionally or alternatively, multiple distance sensors 210, in various embodiments, may be used to recalibrate processor 1030 to measure the diameter of pipe 10 should robotic apparatus 100 be incorrectly installed on pipe 10 or experience radial displacement thereon. In particular, processor 1030, in an embodiment, may be configured to detect a relative change in the various distance measurements generated by the distance sensors (e.g., some might get shorter and others longer in different ratios) and, based on the known architecture and geometry of robotic apparatus 100, apply triangulation or similar techniques to these distance measurements to determine how far robotic apparatus may have shifted from correct positioning on pipe 10 (e.g., with wheel 110 centered laterally on pipe 10). Processor 1030, in an embodiment, may then calculate and apply an appropriate correction factor to account for the shift when determining the diameter of pipe 10.

Sensor assembly 300, in various embodiments, may generally include a rotary encoder 310 coupled to one of the joints of clamping mechanism 150 of robotic apparatus 100. As configured, rotary encoder 300 can measure rotation of the joint and thus calculate how far clamping mechanism 150 has expanded or contracted to accommodate the diameter of the particular pipe 10 on which robotic apparatus is traversing. The angle measured by rotary encoder 310 may be used as an input into a mathematical model that calculates the diameter of pipe 10 based on known geometry of robotic apparatus 100, including the size of wheels 110 and the dimensions of clamping mechanism 150. More specifically, in an embodiment, the diameter of the pipe, D, can be calculated using the length of arms 152, l, the angle between the arms 152 and the projected longitudinal axis of the pipe, θ, the offset (perpendicular to the longitudinal axis of the pipe) between the joints of the arms 152 and the axis of rotation of the wheel, m, and the radii of the wheels 110, r, according to the equation: $D = l \cdot \sin(\theta) + 2 \cdot m - 2 \cdot r$ Use of rotary encoder 310 versus distance sensors 210 may beneficial from a reliability standpoint (e.g., optical distance sensors are sensitive to lighting conditions) and may provide for a potentially lower profile design. Conversely, distance sensors 210 may have advantages over rotary encoders 310 including potentially more precise measurements due to higher resolution and fewer losses due to mechanical backlash and tire wear. Further, distance sensors 210 can serve an additional function—measuring slip, as later described in more detail.

Absolute Position of Robotic Apparatus 100 on Pipe 10

Figure 38:
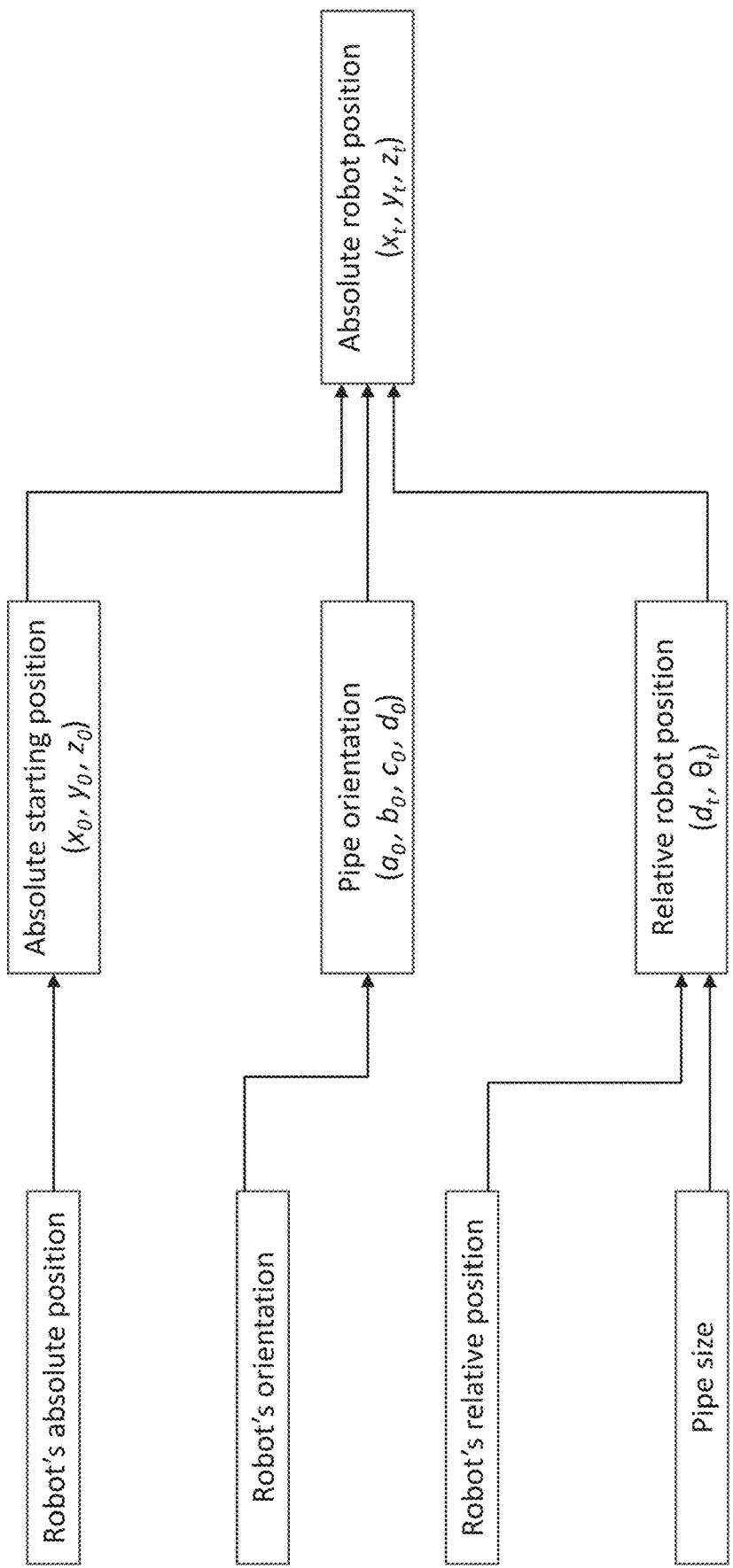
FIG. 38 is a flow chart depicting a method for localizing the position of a robotic apparatus in 3-dimensional space, while simultaneously mapping the pipe's position and orientation in 3-dimensional space in accordance with an embodiment of the present disclosure.

FIG. 38 is a flow chart depicting a method for localizing the position of robotic apparatus 100 in 3-dimensional space, while simultaneously mapping the pipe's 10 position and orientation in 3-dimensional space. As used herein, the term "absolute position" refers to a position of robotic apparatus 100 in a global coordinate system and the term "relative position" refers to a position of robotic apparatus 100 in a local coordinate system (e.g., relative to a starting position of robotic apparatus on pipe 10).

As shown in FIG. 38, the method utilizes data input from four sources: (i) the absolute (world) position of robotic apparatus 100 (e.g., from GNSS or manually entered); (ii) the orientation of robotic apparatus 100 (e.g., from an IMU); (iii) the relative position of robotic apparatus 100 (e.g., from sensor assembly 400 and/or sensors 500); and (iv) the diameter of pipe 10 (e.g., as determined using distance sensors 210 or rotary encoder 310 described above, or manually entered).

It should be recognized that, in an embodiment, the method could rely on absolute position measurements alone rather than all four sources of data so long as the absolute position measurements are precise enough for a given application. However, in practice, most systems capable of measuring absolute position precisely can be expensive and time consuming to set up in a new environment (e.g., video tracking), and/or require specialized equipment that may not work in GPS-denied areas (e.g., RTK GPS). Accordingly, the method presented herein uses a combination of less expensive and readily-available sensors.

The method, in a representative embodiment, may begin by calculating an absolute starting position of robotic apparatus 100 on pipe 10 using a conventional GPS or manually entered coordinates. Next, the absolute orientation of pipe 10 may be calculated based on a measured orientation of robotic apparatus 100, since we generally how the robotic apparatus 100 is oriented with respect to pipe 10. This absolute orientation can be refined while robotic apparatus 100 traverses pipe 10 since pipe 10 is assumed to be stationary. Robotic apparatus 100 may continuously measure its relative position on pipe 10 (e.g., relative to the starting position) by measuring is axial and circumferential movement as described above, and using pipe diameter measurements to convert circumferential movement to angular position. With a known starting point, known pipe orientation, and known movement along the surface of the same pipe, the robotic apparatus' 100 absolute position in 3-dimensional space can be calculated. As configured, the method can be used to produce a 3-dimensional map illustrating the movement of robotic apparatus 100 along pipe 10. The method can be repeated for several connected pipes, and their known sequence and orientations can be used to create a 3-dimensional map of an entire piping system.

Measuring Axial and Circumferential Movement of Robotic Apparatus 100 on Pipe 10

Figure 39:
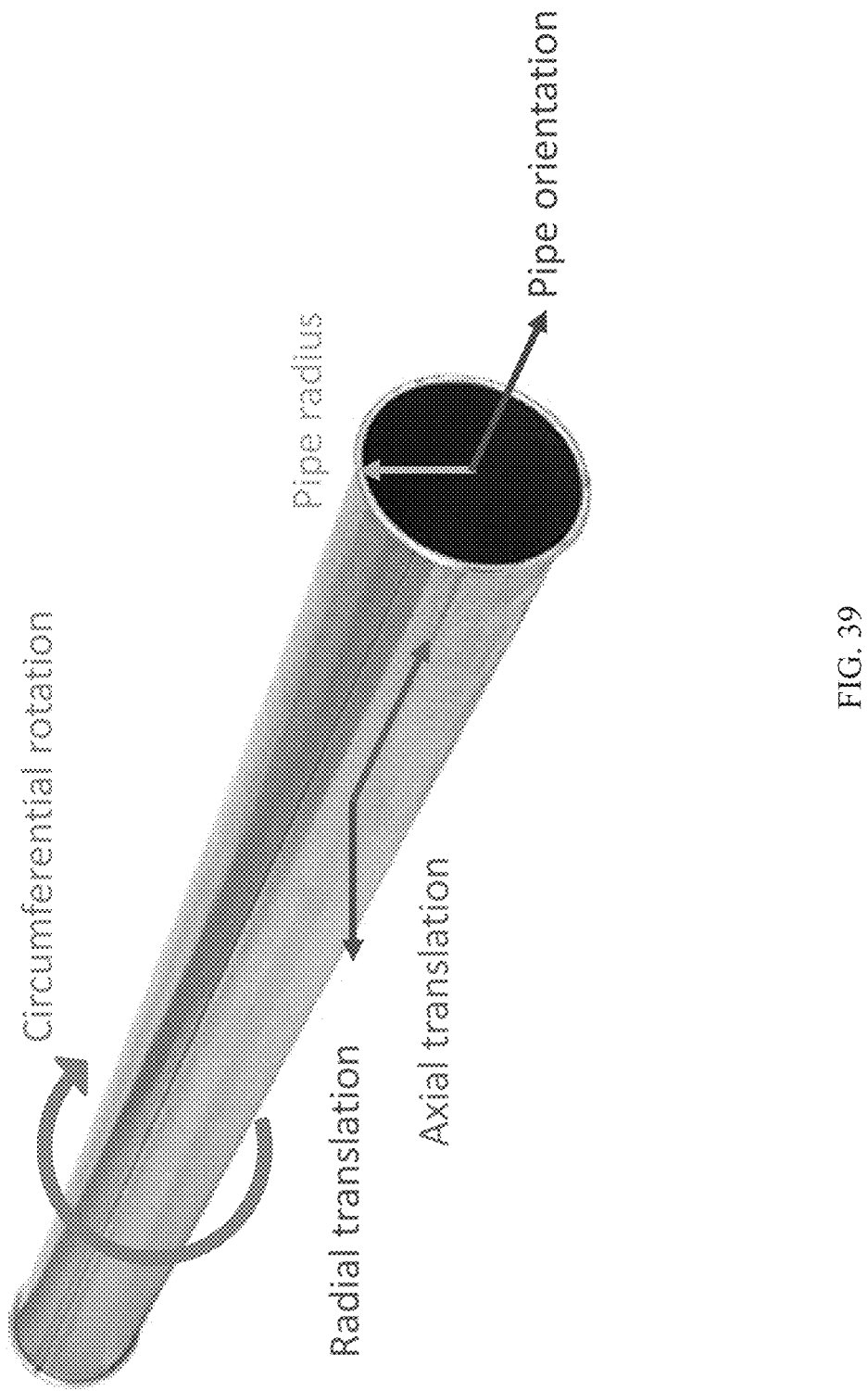
FIG. 39 is a schematic illustration showing how a robotic apparatus may move axially, circumferentially, radially, and various combinations thereof, relative to a pipe.
Figure 40A:
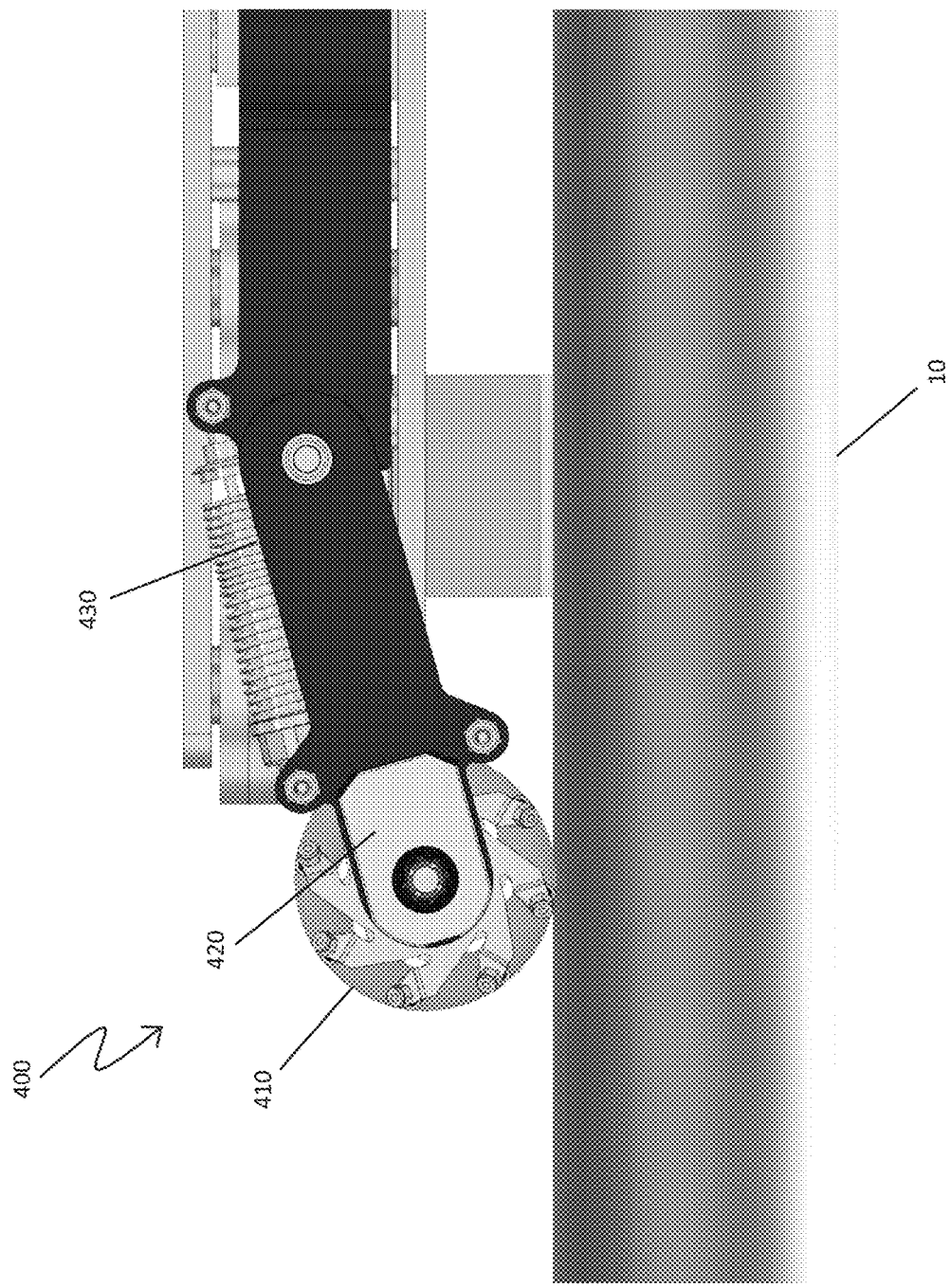
FIG. 40A, FIG. 40B, FIG. 41A, FIG. 41B, and FIG. 41C illustrate a sensor assembly for measuring motion of a robotic apparatus along a pipe in accordance with an embodiment of the present disclosure.
Figure 40B:
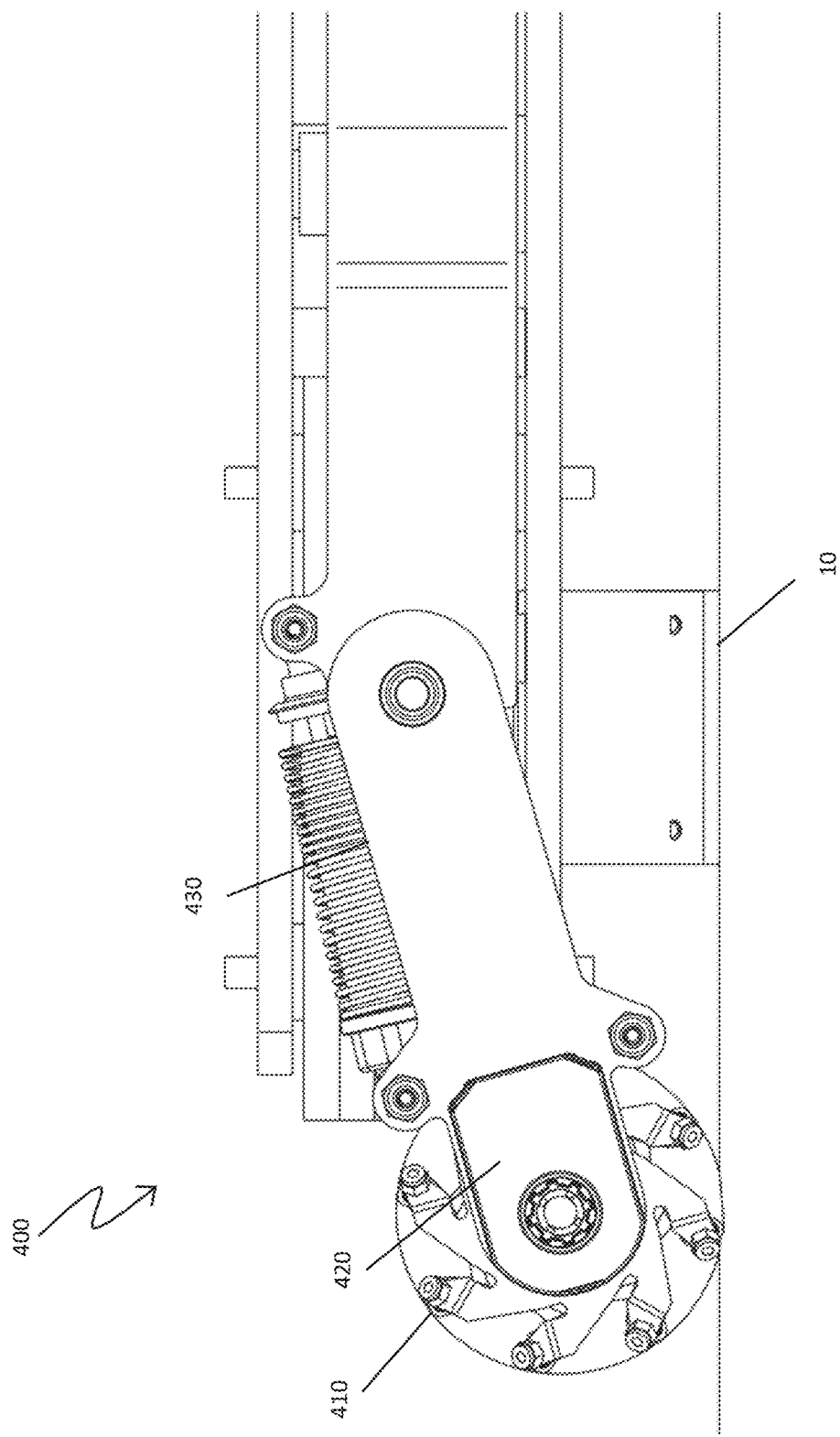

As illustrated by FIG. 39, in operation, robotic apparatus 100 may move axially, circumferentially, radially, and various combinations thereof, relative to pipe 10. For example, robotic apparatus may move axially along pipe 10 when traversing pipe 10 in a straight line, circumferentially when reorienting about the circumference of pipe 10 (e.g., when navigating obstacles or preparing to traverse a bend or curve in pipe 10), a combination of axially and circumferentially when following a helical path along pipe 10 (e.g., when navigating obstacles or preparing to traverse a bend or curve in pipe 10, or when performing a general inspection of pipe 10), and radially which tends to occur on horizontal pipes when robotic apparatus 100 slips due to its weight.

FIG. 40A, FIG. 40B, FIG. 41A, and FIG. 41B illustrate a representative sensor assembly 400 for measuring axial and circumferential movement of robotic apparatus 100 along pipe 10. Sensor assembly 400, in various embodiments, may generally include one or more freely-rotating mecanum wheel 410 and at least one sensor 420 configured to measure rotation of mecanum wheel(s) 410.

Mecanum wheel(s) 410 of sensor assembly 400, in various embodiments, may be constructed as a wheel with a series of rollers 412 attached at a an angle (e.g., 45 degree angle) along the circumference of the wheel. Since the rollers are spinning freely, mecanum wheel(s) 410 can slide without spinning on its main axis at a 45 degree angle from the axis of rotation. Conversely, mecanum wheel 410 has maximum traction in a direction that is at a 45 degree angle in the opposite direction from the axis of rotation (i.e., 90 degrees from the freely sliding direction). When sensor(s) 420, such as rotary encoder(s), is attached to the central axis of mecanum wheel 410 it will measure mecanum wheel's 410 motion in the direction of maximum traction. In some embodiments, encoder 420 may be configured to measure angular displacement of the mecanum wheel 410 to which it is attached, but this can be easily converted to linear displacement by multiplying the angular displacement (in radians) with the radius of mecanum wheel 410.

Sensor assembly 400, in some embodiments, may further include a spring-loaded arm 430 or similar mechanism to which mecanum wheel 410 and rotary encoder 420 are coupled. Spring-loaded arm 430 may be configured to bias mecanum wheel 410 against pipe 10 and thereby maintain consistent contact between mecanum wheel 410 and pipe 10 despite changes in pipe diameter, uneven pipe surface, or slipping of robotic apparatus 100 on pipe 10.

Figure 41A:
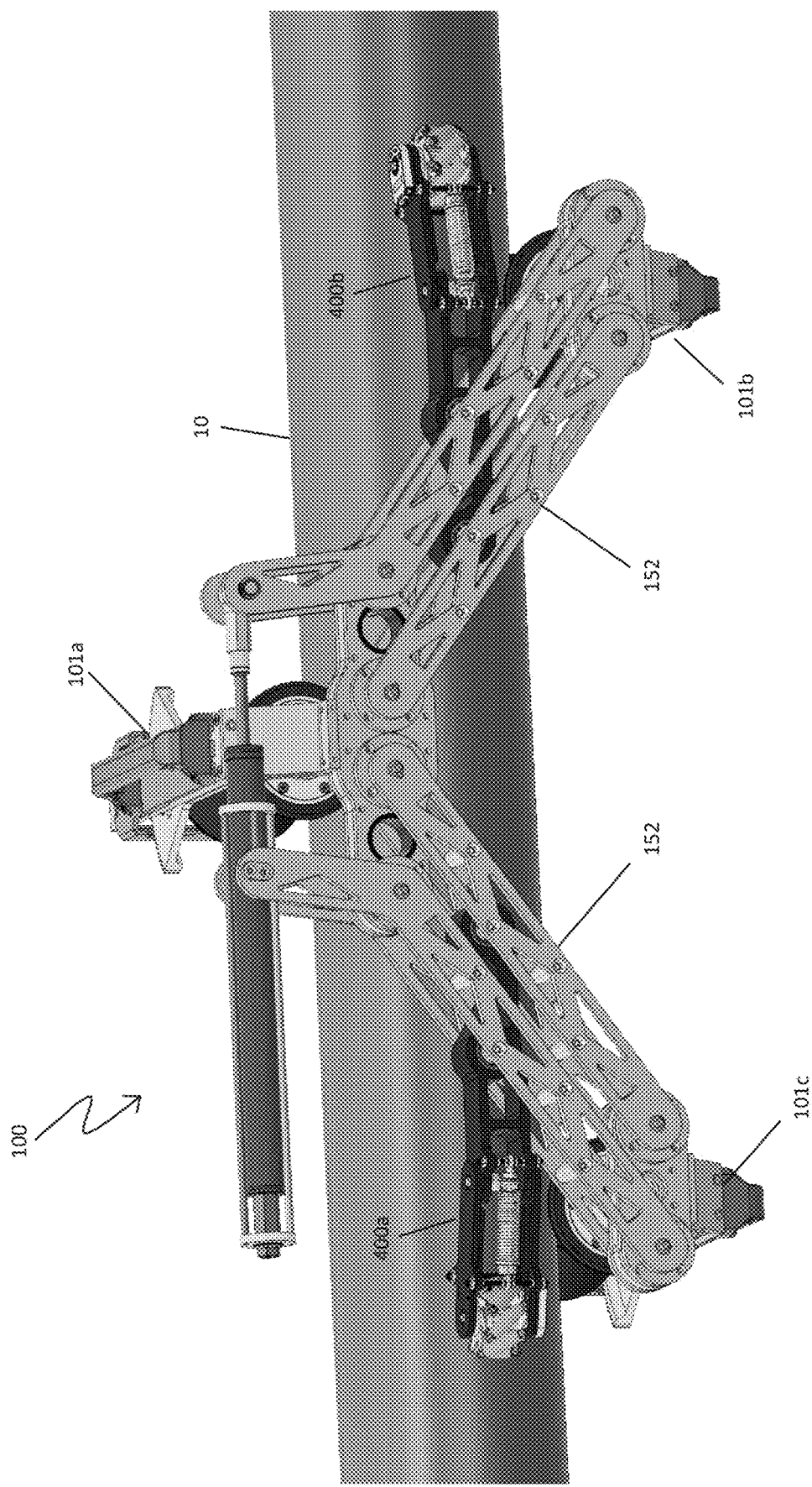
Figure 41B:
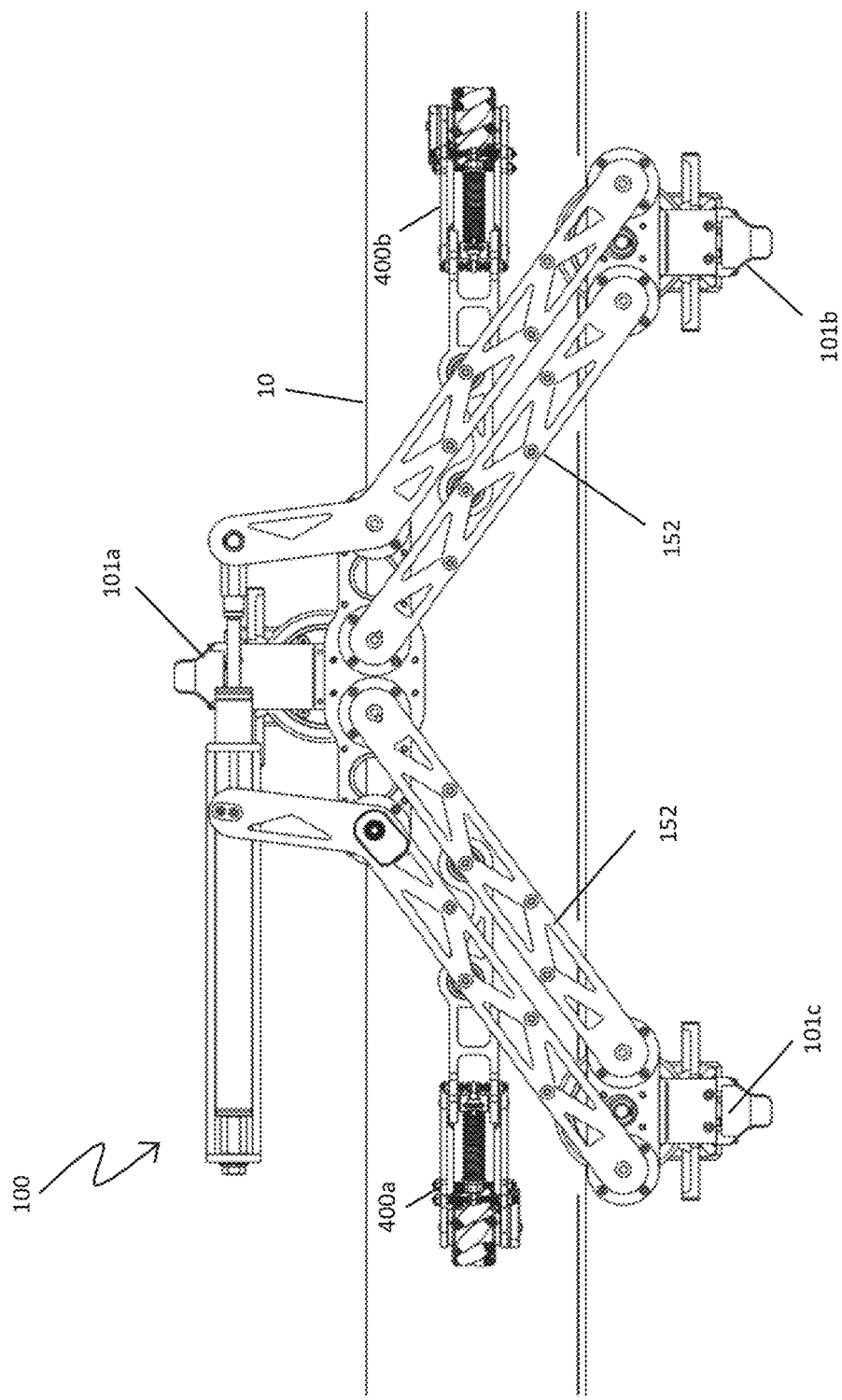

As best shown in FIG. 41A and FIG. 41B, sensor assembly(s) 400 can be mounted on clamping mechanism 150 of robotic apparatus 100. In particular, in the embodiment shown, sensor assemblies 400a, 400b may be mounted near a mid-points of arms 152 of clamping mechanism 150 and parallel to wheel assemblies 101, such that each mecanum wheel 410 is positioned and aligned to contact pipe 10 over a range of pipe diameters. Alternatively, sensor assembly(s) 400 can be mounted next to either of wheel assemblies 101 (rather than near the midpoint therebetween) such that the centerline of mecanum wheel 410 contact pipe 10 on a range of pipe sizes. Positioning sensor assembly 400 near wheel assembly 101 may be contingent upon there being enough space here since the electronic enclosures are positioned proximate wheel assembly 101a the embodiment shown. It may also be difficult to accommodate sensor assembly 400 near wheel assembly 101b or 101c as there may not be enough space around wheel assemblies 101b or 101c as robotic apparatus traverses bends or curves in pipe 10. It should be recognized that positioning sensor assembly(s) 400 on the closed side of robotic apparatus 100 as described also keeps sensor assembly(s) 400 from interfering with obstacles passing through open side 102 of robotic apparatus on the opposing side of pipe 10.

Figure 41C:
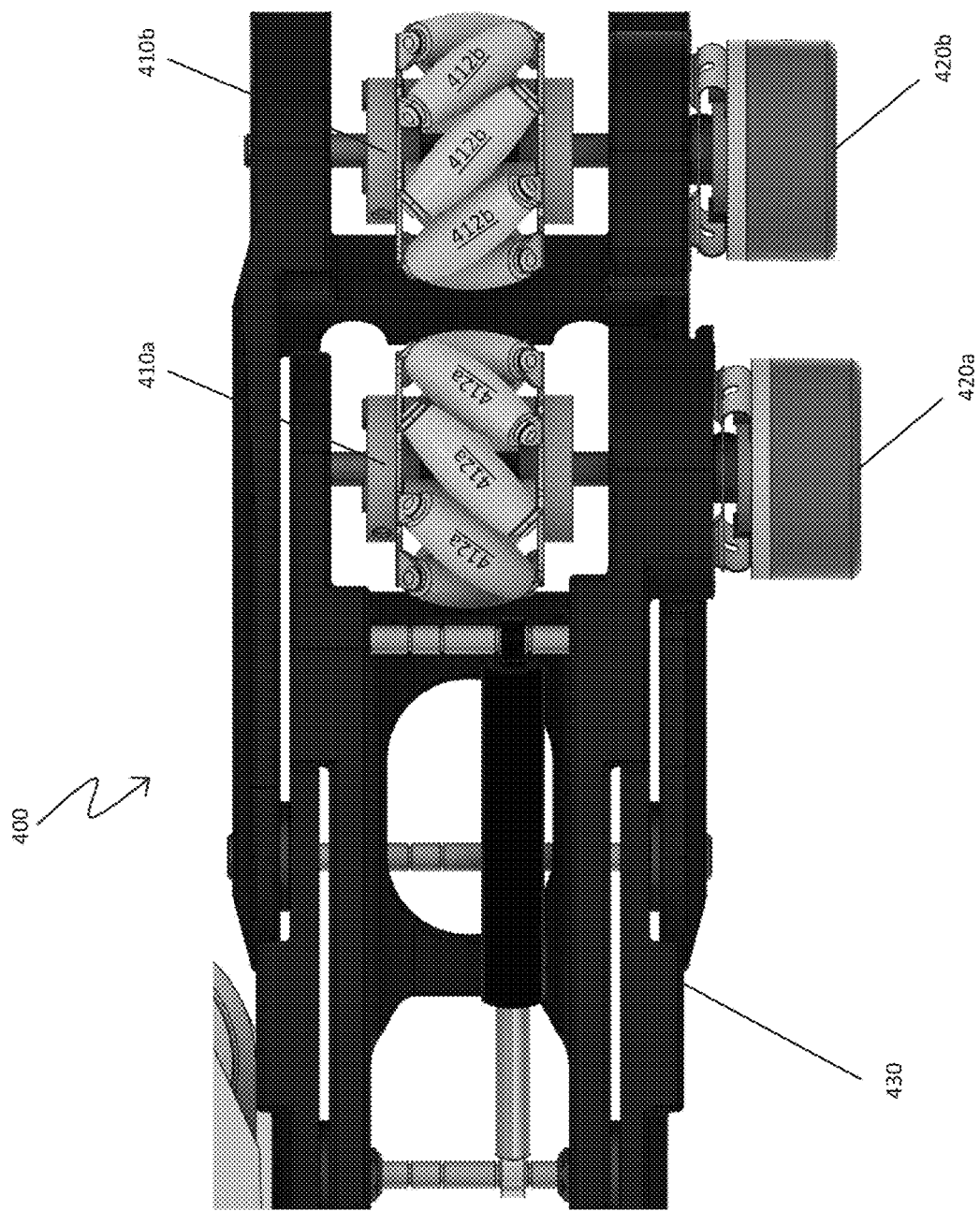

Referring to FIG. 41C, sensor assembly 400, in an embodiment, may include two mirrored mecanum wheels 410a (having rollers 412a arranged in a left-hand orientation) and 410b (having rollers 412b arranged in a right-hand orientation) mounted with axes of rotation parallel to each other but perpendicular to the longitudinal axis of pipe 10. In this configuration one mecanum wheel 410a will measure motion in a 45 degree (positive) angle from the longitudinal axis of pipe 10 and the other mecanum wheel 410b will measure motion in a −45 degree (negative) angle from the longitudinal axis of the pipe. These two measurements will be perpendicular and independent from each other. Hence, any motion along the surface of the pipe will produce a unique combination of two distance measurements from encoders 420a, 420b attached to the mirrored mecanum wheels 410a, 410b As such, sensor assembly 400 enables the robotic apparatus 100 to measure any arbitrary motion it makes along the surface of pipe 10. Unlike some other wheel encoder designs, the two axes of rotation are parallel, which is beneficial for saving space and simplifying the mechanical design.

A system 1000 for tracking the position of robotic apparatus 100 on pipe 10, in various embodiments, may generally include sensor assembly 400 comprising first mecanum wheel 410a and a second mecanum wheel 410b, each mecanum wheel 410a, 410b configured to be freely-rotating and including a plurality of rollers 412a, 412b disposed at 45-degree angles about a circumference of the respective mecanum wheel 410a, 410b, the rollers 412a of the first mecanum wheel 410a having an orientation mirroring that of the rollers 412b of the second mecanum wheel 410b; at least one sensor 420 (shown here as encoders 420a, 420b) configured to measure rotation of each of the first mecanum wheel 410a and the second mecanum wheel 410b; a processor 1030 configured to: calculate a linear displacement of each respective mecanum wheel 410a, 410b based on the measured rotation of each respective wheel 410a, 410b and a diameter of each respective wheel 410a, 410b, and calculate a distance and an associated direction of axial and circumferential movement of robotic apparatus 100 on the pipe 10 based on the calculated linear displacements of the first mecanum wheel 410a and the second mecanum wheel 410b. In an embodiment, processor 1030 may be configured to execute computer-readable instructions stored in memory 1020 configured to perform the preceding operations. In an embodiment, the first mecanum wheel 410a and the second mecanum wheel 410b have axes of rotation parallel to one another and configured to be perpendicular to a longitudinal axis of the pipe 10. In an embodiment, two sensors 420 such as rotary encoders may measure rotation of mecanum wheels 410a, 410b. Processor 1030, in an embodiment, may calculate the distance and an associated direction of axial and circumferential movement of the robotic apparatus 100 on the pipe 10 based on the calculated linear displacements of the first mecanum wheel 410a and the second mecanum wheel 410b by vector addition. Each rotary encoder 420 attached to a mecanum wheel 410 will measure the robotic apparatus' 100 motion as projected on a vector at an angle (most commonly 45 degrees) with respect to the rotary encoder's 420 axis of rotation. With two mecanum wheels 410a, 410b, the robotic apparatus' 100 motion along a 2-dimensional surface can be calculated, as long as the mecanum wheels 410a, 410b are not measuring the motion as it is projected on the same vector. For example, if the two wheels 410a, 410b have parallel axes of rotation but are mirrored, they will measure motion along perpendicular vectors. To calculate the robotic apparatus' 100 axial and circumferential movement, the axial and circumferential components of the vectors associated with the mecanum wheels are added, respectively. System 1000, in an embodiment, may further include at least one spring loaded arm 430 configured to bias at least one of the first and second mecanum wheels against a surface of the pipe. In an embodiment, system 1000 may be mounted at a vertical midpoint of the robotic apparatus 100.

Additionally or alternatively, other sensors 500 such as encoders 510, inertial measurement units (IMUs) 520, and optical flow sensors 530, and the like may be used to measure axial and circumferential translation of robotic apparatus 100 along pipe 10. For example, robotic apparatus 100, in an embodiment, may be equipped with one or more encoders 510 coupled to the drive shafts of motors 130 and/or motor 122 of the various wheel assemblies 101 described herein such that each encoder 510 can measure the degree of rotation of its respective motor 130, 122. For example, in the context of embodiments utilizing alignment motors to rotate wheel assembly 114 and base plate 124 relative to one another (as in FIG. 4, FIG. 25A, FIG. 25B, FIG. 27A, and FIG. 27B), an encoder 510 may be coupled with alignment motor 122 to measure the alignment angle of the corresponding wheel assembly 101 (accounting for any gear ratios therebetween). For example, encoder 510 may be configured to associate a 0 degree encoder angle to be parallel with a longitudinal axis of robotic apparatus 100 such that a 0 degree measurement indicates that wheel 110 is pointed in a purely axial direction along pipe 10, positive degree measurements up to 89 degrees indicate that wheel 110 is pointed somewhat to starboard with an axial component and circumferential component, and negative degree measurements up to 89 degrees indicate that wheel 110 is pointed in somewhat to port with an axial component and circumferential component. It should be recognized that these conventions could be reversed when drive motor(s) 130 are driven in the opposite direction to move robotic apparatus 100 in reverse on pipe 10. An encoder 510 could also be coupled with drive motor 130 in such embodiments to measure the distance, speed, and/or acceleration of travel by robotic apparatus 100. In particular, an encoder 510 coupled with drive motor 130 can measure the degree of rotation of drive motor 130 and thus rotation of corresponding wheel 110 (accounting for any gear ratios therebetween). The distance travelled per revolution of wheel 110 is equal to the circumference of wheel 110 or the product of π×wheel diameter. The corresponding velocity and acceleration of robotic apparatus 100 can likewise be calculated as time derivatives of wheel angular rotation measured by encoder 510 on drive motor 130.

As another example, in the context of embodiments utilizing differential steering (as in FIG. 26A, FIG. 26B, FIG. 28A, FIG. 28B, FIG. 29A, FIG. 29B), encoders 510 may be coupled with each motor 130 to measure parameters from which the magnitude, direction, velocity, and acceleration of travel of robotic apparatus 100 can be calculated. In particular, each encoder 510 can measure the degree of rotation of its corresponding drive motor 130 and thus rotation of its corresponding wheel 110 (accounting for any gear ratios therebetween). The corresponding rotational velocity of each wheel can be calculated as the time derivative of degree of rotation. The rotational velocity of each wheel 110 can be compared to determine if robotic apparatus is travelling straight (e.g., both wheels rotating at same speed), turning starboard (e.g., port wheel turning faster than starboard wheel), or turning port (e.g., starboard wheel turning faster than port wheel), along with calculating the radius of the turn therefrom. Likewise, encoder 510 may measure the direction of rotation of motor 130 to determine if robotic apparatus is moving forward or in reverse. The distance each wheel travels per revolution is equal to the circumference of the respective wheel 110 or the product of π×wheel diameter, and thus the magnitude of distance travelled by robotic apparatus may be calculated from the above referenced measurements according to physics formulas known in the art.

Robotic apparatus 100, in other embodiments, may additionally or alternatively be equipped with one or more inertial measurement units (IMUs) 520 to measure axial and circumferential movement of robotic apparatus 100. IMU 520 is preferably a 9-axis IMU (i.e., 3-axis accelerometer+3-axis gyroscope+3-axis magnetometer) with an onboard sensor fusion processor that can calculate absolute orientation by combing data from all three sensors in IMU 520. Circumferential movement can be measured with IMU 520 by measuring the change in robot orientation associated with moving circumferentially around pipe 10. IMU 520 may measure the orientation of robotic apparatus 100 by measuring the change in the direction of the gravitational acceleration, the angular displacement by integrating the angular velocity from the gyroscopes, and by measuring the change in the direction of the earth's magnetic field. Any orientation of robotic apparatus 100 is uniquely associated with the angular position of robotic apparatus 100, because robotic apparatus 100 can only clamp to the pipe along a specific plane. The angular position can easily be translated to the circumferential position by multiplying by the pipe radius (if the angle is in radians). It should be recognized that IMU 520 may be able to measure circumferential position around pipe 10 with considerably higher precision if robotic apparatus 100 is traversing a horizontal pipe 10 compared with a vertical pipe 10 because the gravitational accelerations serves as an effective reference to measure the orientation of IMU 520 on horizontal pipes 10.

In order to measure axial movement with IMU 520, acceleration measurements collected by IMU 520 can be integrated twice to approximate axial movement. In practice, various embodiments of robotic apparatus 100 may accelerate slowly though, so a signal-to-noise ratio from the accelerometer of IMU 520 may be low in such instances. Further, since the acceleration measurements are integrated twice, the error grows exponentially with time. Even with low precision, however, IMU 520 can be used to detect significant radial movement (e.g., slipping) if all wheels 110 start to spin in place on pipe 10 because robotic apparatus is stuck on an obstacle.

Robotic apparatus 100, in other embodiments, may additionally or alternatively be equipped with one or more optical flow sensors 530 to measure axial and circumferential movement of robotic apparatus 100. Optical flow sensors 530, in an embodiment, may be similar to those used in a computer mouse peripheral and may operate in similar fashion to track movement of robotic apparatus as they would track movement of a computer mouse peripheral. Such sensors have the benefit of being very simple to mount to robotic apparatus 100 from a mechanical design standpoint, but may be sensitive to the surface properties of pipe 10 and ambient lighting conditions.

Robotic apparatus 100, in various embodiments, may be equipped with a combination of at least two of the above referenced sensors 500 and/or sensor assembly 400. For example, in an embodiment, robotic apparatus 100 may utilize sensor assembly 400 to measure axial movement, while circumferential movement may be calculated as a weighted average between movement approximated by IMU 520 and movement measured by sensor assembly 400. This can also be a dynamic weighted average that, for example, gives IMU 520 more weight on horizontal pipes and less weight on vertical pipes. Even more sophisticated methods, such as an Extended Kalman filter, can be used to combine measurements form several sensors 510 and weight them according to their variance in order to measure axial and circumferential movement.

Navigation of Predetermined Path

There may be scenarios in which it is preferable to manually control robotic apparatus 100, while there may be other scenarios in which automatic control is preferred. As used in the present disclosure, "manual" control refers to a control scheme in which the operator is giving robotic apparatus 100 real-time instructions to control its speed and direction in that moment. This control scheme, in some embodiments, may still include features such as automatic slip adjustment, which corrects the motion of robotic apparatus 100 if it is deviating from the movement instructed by the operator. As used in the present disclosure, "automatic" control refers to a control scheme in which a human operator plots or otherwise identifies a particular path prior for robotic apparatus to follow and then provides all instructions needed for robotic apparatus 100 to then automatically traverse the path without further instructions from the operator.

A representative use case for automatic control involves data collection activities, such as using inspection sensors assembly 170 to inspect pipe 10. The operator may wish robotic apparatus 100 to drive along a path that allows an entire region of pipe 10 to be inspected. At the same time, the operator may also want the path to be as short as possible to minimize inspection time. A raster path 20, in various embodiments, can be used to satisfy these criteria.

Figure 42:
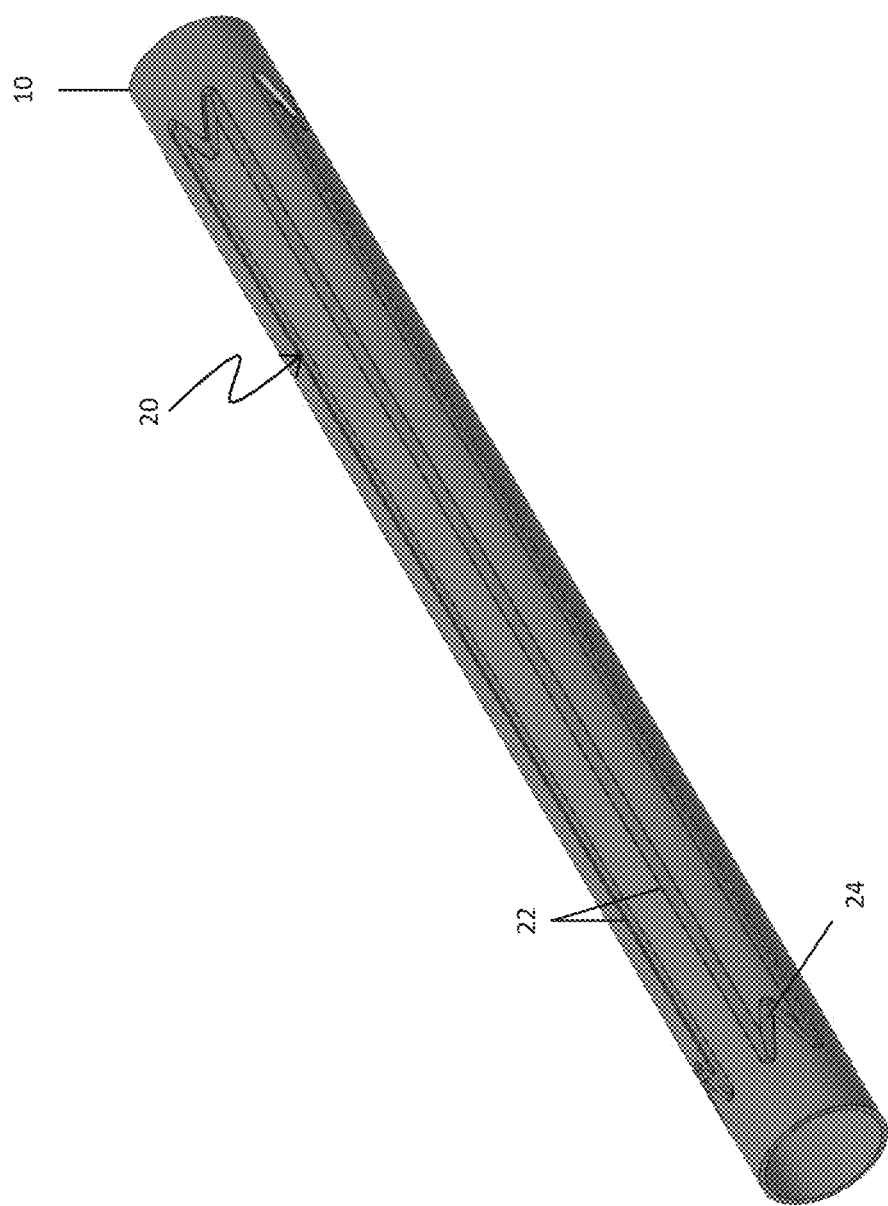
FIG. 42 and FIG. 43 depict a representative raster path to be followed by a robotic apparatus on a pipe, in accordance with an embodiment of the present disclosure.
Figure 43:
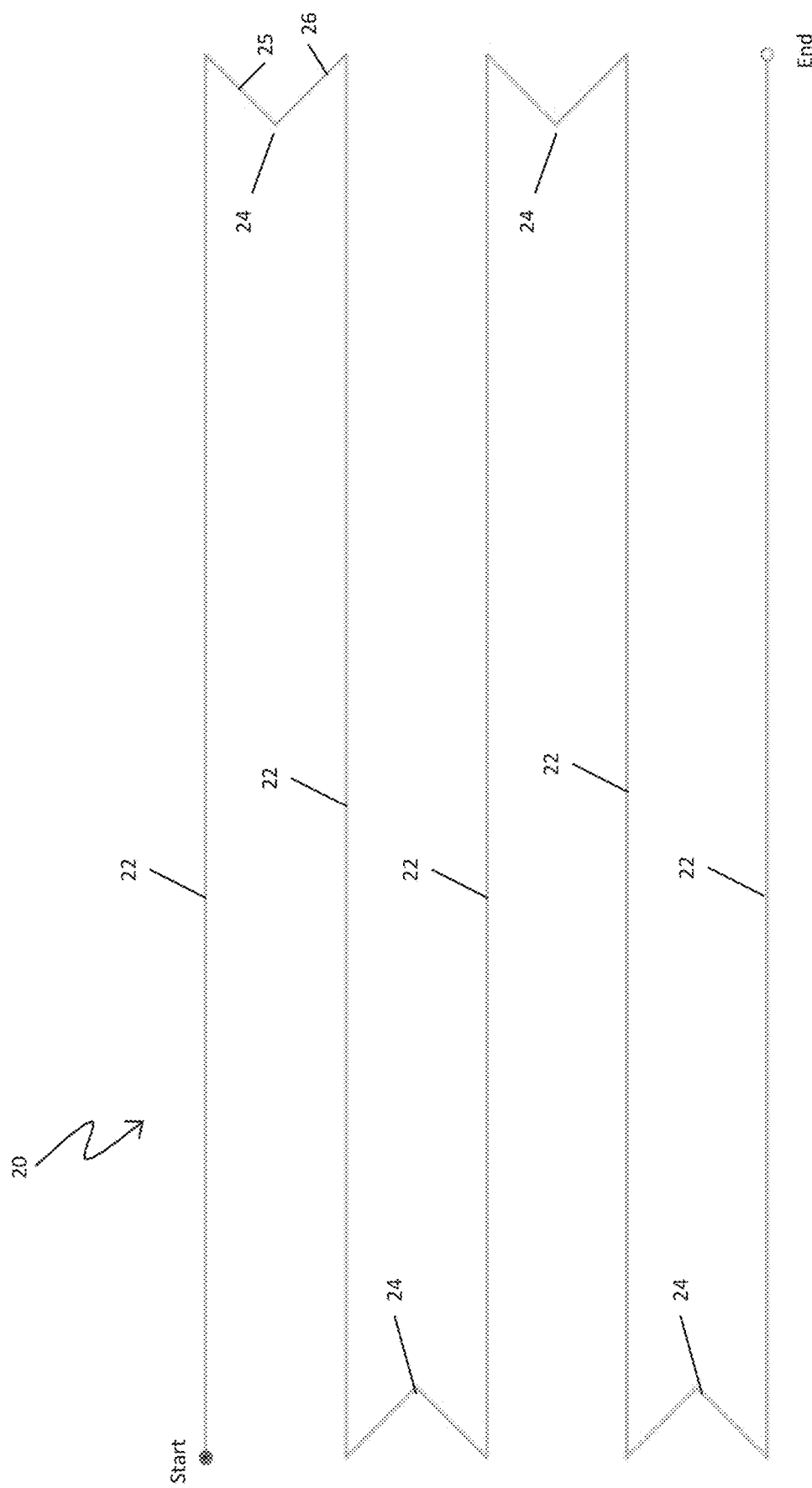

FIG. 42 and FIG. 43 depict a representative raster path 20 to be followed by robotic apparatus 100 on pipe 10. In particular, FIG. 42 illustrates the raster path 20 on a three-dimensional model of pipe 10 and FIG. 43 depicts a portion of the raster path 20 in two-dimensional format for additional perspective. As shown, a raster path 20 is one in which robotic apparatus 100 drives back and forth along longitudinally-oriented lines 22 on the surface of pipe 10. In some embodiments, the raster path 20 may be such that the longitudinal lines 22 extend along the entire length of pipe 10 (including through multiple pipe sections and bends), while in other embodiments, pipe 10 may be divided into sections and separate raster paths 20 assigned to each.

In either case, when robotic apparatus 100 reaches the end of a given longitudinal line 22 of the raster path 20, robotic apparatus 100 may be configured to "index" to the next adjacent longitudinal line 22 of the raster path by driving along a helical path 24 between the two adjacent longitudinal lines 22. In various embodiments, each longitudinal line 22 may start and stop at the same longitudinal position on pipe 10, as shown. Helical path 24, in various embodiments, may include a first portion 25 in which robotic apparatus 100 travels along a first helical path oriented back towards the longitudinal direction from which it came and a second portion 26 in which robotic apparatus 100 travels along a second helical path oriented in the opposing direction longitudinal direction of the first portion. Assuming the first portion 25 and the second portion 26 of helical path 24 meet halfway between the adjacent longitudinal paths and have the same helical curvature, robotic apparatus 100 will join the adjacent longitudinal path 22 at the same longitudinal position at which it left the preceding longitudinal path 22, as shown. In another embodiment, the helical path 24 can be inverted to similar effect, assuming there is room on pipe 10 beyond the longitudinal paths 22 to execute the maneuver without driving off of the end of pipe 10 or encountering an obstacle. That is, the first helical path can continue in a forward direction rather than backwards, and second helical path can travel backwards rather than forwards, such that helical pathway 24 still joins the adjacent longitudinal path 22 at the same longitudinal position at which it left the preceding longitudinal path 22. Data may be collected throughout travel along the raster path 20, typically while robotic apparatus 100 traverses the longitudinal lines 22.

Raster path 20, in various embodiments, may be effected through manual control, automatic control, or a combination thereof. In an embodiment, raster path 20 may be divided into segments and subroutines applied to effect each. When several subroutines are performed in consecutive order, the entire raster path 20 can be achieved. Such an approach may similarly be employed for any suitable path, not just for raster path 20. In the context of raster path 20, processor 1030 may be configured to repeatedly compare the current position of robotic apparatus 100 (as measured by onboard sensors (e.g., sensor assemblies 400 and/or 500) with the desired end position of the current subroutine. Processor 1030 may then calculate the appropriate wheel angle and speed to follow a corresponding portion of raster path 20 and/or to index to a subsequent portion, and may send commands to the respective motors 122 and/or 130, depending on the particular configuration. This may be repeated until the end position is reached, the subroutine ends, and the next subroutine begins. It should be recognized that a single routine including waypoints at the start/end points of each aforementioned subroutine could be used to similar effect. A series of subroutines can also be used to drive the robotic apparatus 100 around a known obstacle such as a pipe support or a bend.

Navigating Bends and Curves in Pipe 10

As previously described, robotic apparatus 100 can expand and contract to accommodate and traverse a bend or a curve in pipe 10. More specifically, in various embodiments, prior to traversing the bend or the curve robotic apparatus 100 may be oriented on pipe 10 such that wheel assemblies 101b, 101c will drive along the centerline of the inner radius of the curve or bend (the shorter path) and wheel assembly 101a will drive along the centerline of the outer radius of the curve or bend (the longer path) as shown in FIGS. 12A-12D. Robotic apparatus 100 may follow a helical path to orient itself in such a manner prior to entering the curve or bend, or move circumferentially if equipped with mecanum wheels as in the embodiment of FIG. 29A and FIG. 29B for example. As robotic apparatus 100 traverses the bend or the curve, clamping mechanism 150 may expand or contract to allow wheel assemblies 101 to remain engaged with pipe 10 throughout the bend or curve such that robotic apparatus 100 does not fall off or slip. In particular, clamping mechanism 150 may expand as the geometry of the bend forces wheel assembly 101a and wheel assemblies 101b, 101c apart up to a certain maximum point in the bend or curve as shown from FIG. 12A to FIG. 12B, and contract thereafter as shown from FIG. 12C to FIG. 12D.

The ability of clamping mechanism 150 to smoothly but quickly expand and contract allows robotic apparatus 100 to maintain pressure and traction between wheels 110 and pipe 10 throughout the bend or curve. The clamping mechanism 150, whether passive (e.g., gas tension spring as shown in FIG. 5A, FIG. 5B, and FIG. 5C; tension springs as shown in FIG. 17; compression springs, torsion springs, etc) or active (e.g., with a linear actuator (lead/ball/roller screw), rack-and-pinion, worm drive, or hydraulic/pneumatic actuator) will automatically expand and contract as necessary while maintaining its clamping force. Of particular importance is the ability for clamping mechanism 150 to contract quickly when traversing bends that go from a horizontal orientation to a vertical orientation. Unless clamping mechanism 150 maintains pressure and traction between wheels 110 and pipe 10, robotic apparatus 100 may start to accelerate due to gravity after it passes the point of maximum expansion of clamping mechanism 150.

Through testing, it has been demonstrated that robotic apparatus 100 can drive through bends and curves with all wheels 110 driving at the same speed; however, the path of wheel assembly 101a is longer than the paths of wheel assemblies 101b, 101c. Thus, driving all wheels 110 at the same speed can result in slipping between wheel 110b of wheel assembly 101b and pipe 10, and between wheel 110c of wheel assembly 101b and pipe 10.

For optimum performance, wheel 110b of wheel assembly 101b (assuming it enters the bend or curve first) should be slowed sharply as it enters the bend or curve and gradually accelerated back to 100% speed relative to that of wheel 110a of wheel assembly 101a. Meanwhile, wheel 110c of wheel assembly 101c (assuming it enters the bend or curve last) should be slowed gradually as it enters the bend or curve and sharply accelerated back to 100% speed relative to that of wheel 110a of wheel assembly 101a.

Figure 44:
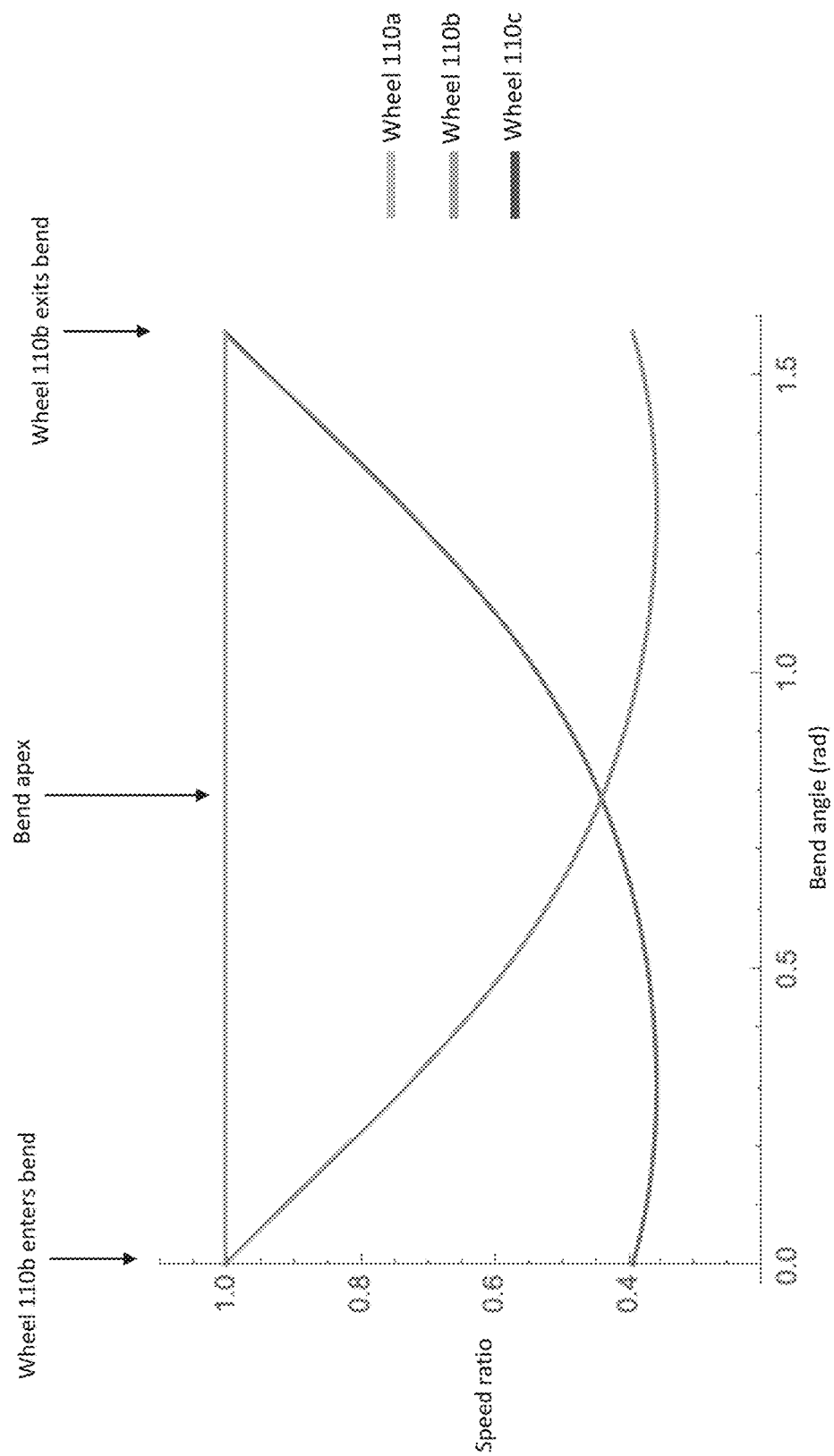
FIG. 44 is a graph depicting example wheel speed profiles as robotic apparatus 100 traverses a curve or a bend in accordance with an embodiment of the present disclosure.

FIG. 44 is a graph depicting example speed profiles for wheels 110a, 110b, and 110c as robotic apparatus 100 traverses a curve or a bend. With a known configuration of robotic apparatus 100 (e.g. wheel diameter, clamping mechanism size), known diameter of pipe 10, and known bend or curve radius (which is normally a standard that can be looked up), the optimal wheel speed profiles can be calculated for each wheel. Further, various sensors (e.g., IMU) and sensing approaches described herein can be used to measure where robotic apparatus 100 is in a bend or curve and control motors 130 to drive at the calculated optimal speeds.

In practice, the exact geometries of pipe 10 and even robotic apparatus 100 may not be known, so geometric simplifications are made to enable these calculations. In many cases, using simplified geometries instead of exact geometries has only nominal effect on the optimality of resulting wheel speed profiles, but in some cases the effect may be more pronounced, possibly to the point where robotic apparatus 100 starts to slip because one or more of wheels 110 lose contact with or traction on the surface of pipe 10. In such cases, the previously-described automatic slip correction feature may compensate.

Notwithstanding the foregoing, in some embodiments, an alternative approach can be employed to generate optimal wheel speed profiles without having to make any geometric simplifications. This approach generally involves creating three-dimensional models of robotic apparatus 100 and pipe 10, and performing simulations in which the robot model traverses the pipe model while varying wheel speed in a manner that keeps each wheel 110 of the robot model in constant contact with the surface of the pipe model. As configured, the simulation will identify combinations of wheel speeds that satisfy this constraint a various points of the maneuver. These wheel speeds can then be applied by the real-world robotic apparatus 100 to successfully navigate a corresponding real-world bend without its wheels 110 losing contact or traction with real-world pipe 10.

Figure 45A:
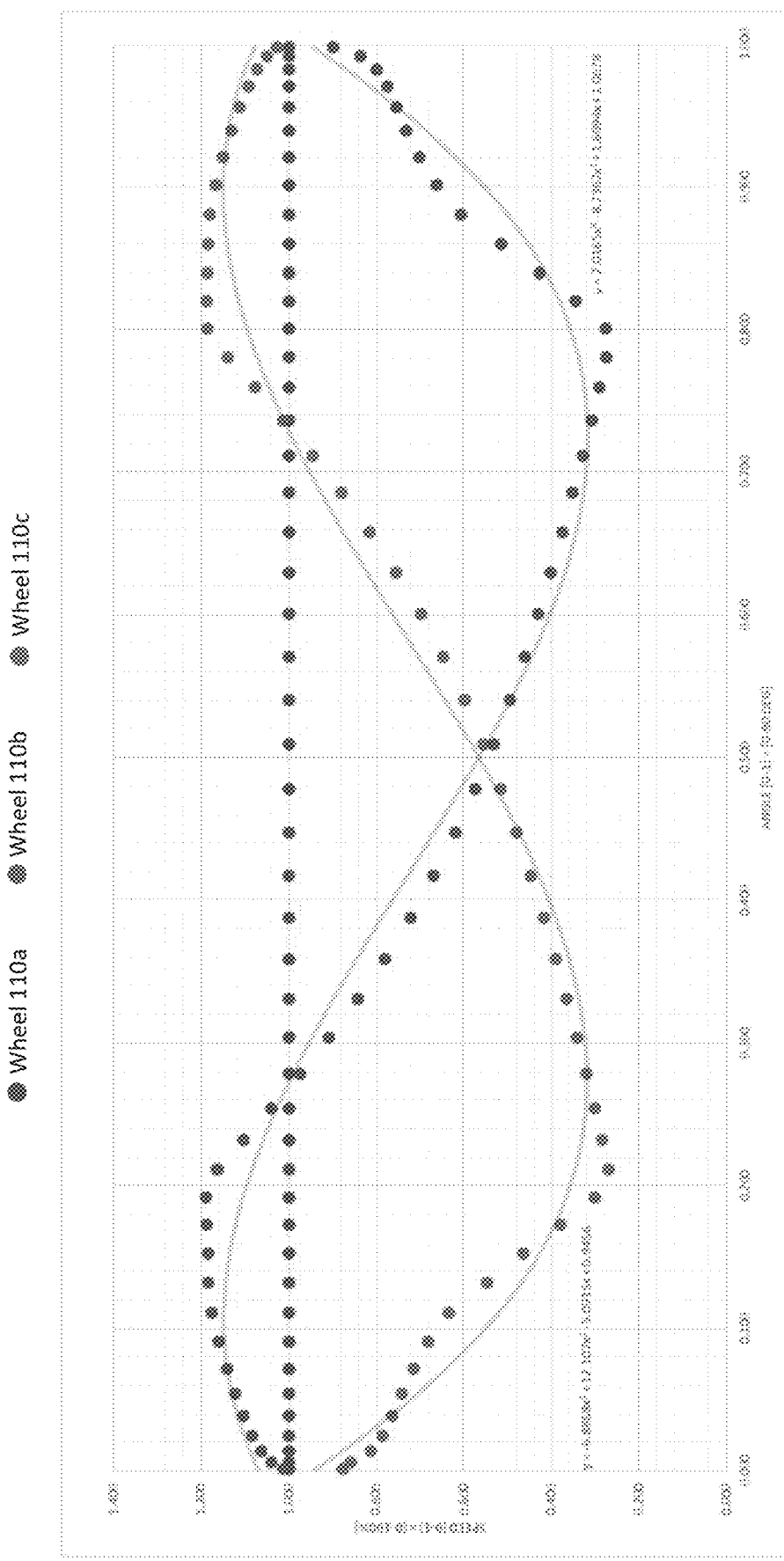
FIG. 45A and FIG. 45B depict exemplary wheel speed profiles representative of travel along a long radius elbow and a short radius elbow, respectively, in accordance with an embodiment of the present disclosure.
Figure 45B:
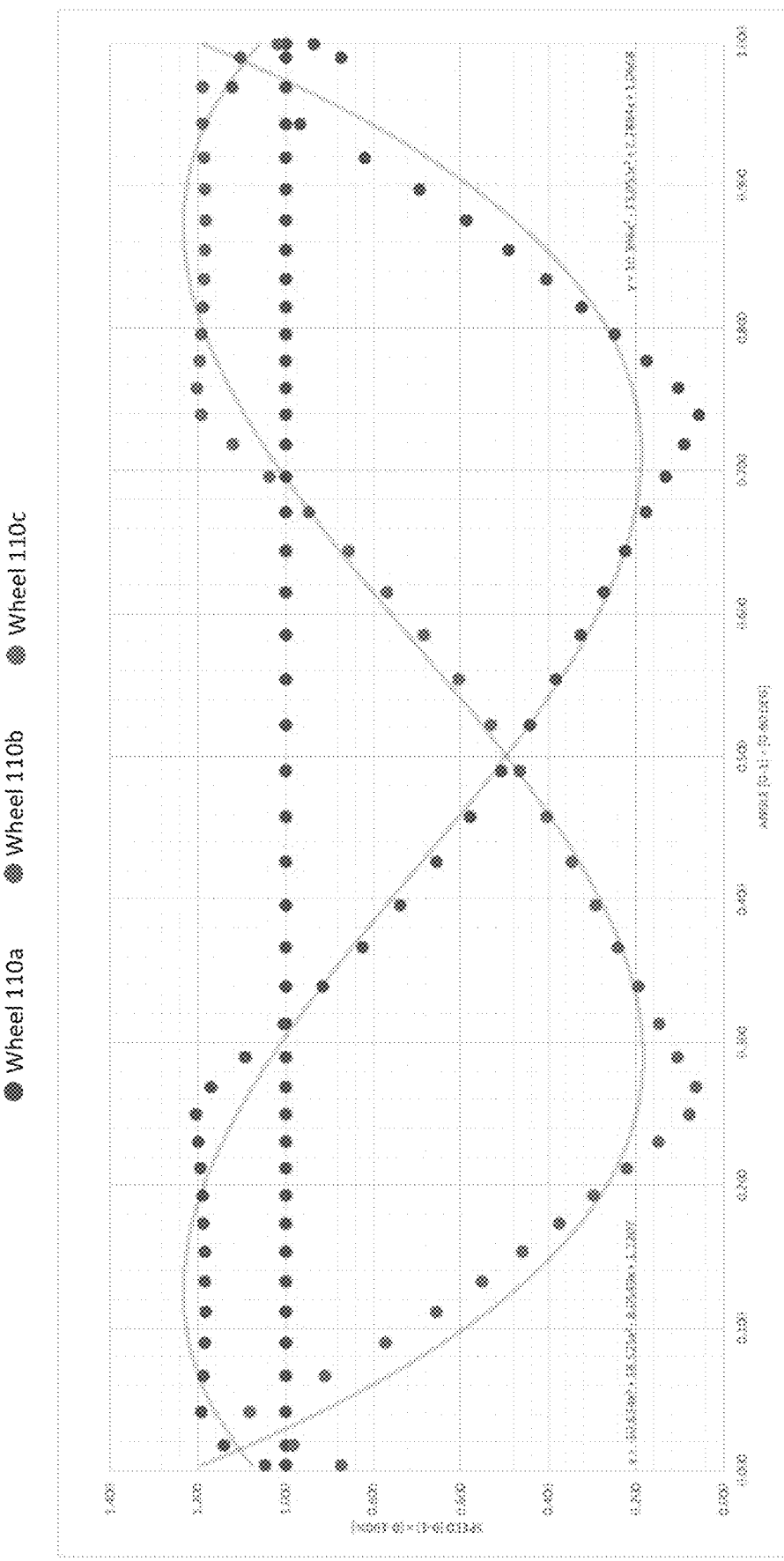

FIG. 45A and FIG. 45B depict exemplary wheel speed profiles generated using this approach, with the wheel speed profile of FIG. 45A being representative of travel along a long radius elbow and the wheel speed profile of FIG. 45B being representative of travel along a short radius elbow according to the ANSI B16.9 standard. Three-dimensional models of robotic apparatus 100 and a bend in pipe 10 were created using computer-aided design (CAD) software and loaded into simulation software. The simulation software was configured to constrain wheel contact surfaces 112a, 112b, 112c of the robot model to remain in contact with the surface of pipe 10 in the pipe model, and the robot model was moved through the bend in 1 mm increments. The distance traveled by each wheel 110a, 110b, 110c during each increment were measured and recorded. The resulting data points were then plotted, and optimal speed profiles for each wheel were then approximated by fitting a curve (such as a polynomial equation) to the corresponding data points for each wheel. As previously described, robotic apparatus 100 can use its onboard sensors (e.g., IMU 520) to measure the position of robotic apparatus 100 in the bend and instruct drive motors 130 to drive at the corresponding relative wheel speeds prescribed in these wheel speed profiles, and thereby utilize the maximum possible torque without slipping.

A method for navigating a bend or curve of a pipe with a robotic apparatus 100 may include, in various embodiments, performing a computer simulation to identify a combination of wheel speeds that results in each wheel 110 of a model of the robotic apparatus 100 remaining in constant contact with a surface of a model of the pipe 10 throughout the bend or curve, and operating the wheels 110 of the robotic apparatus 100 according to the identified combination of wheel speeds to navigate the bend or curve in the pipe 10 without losing contact between each of the wheels and the surface of the pipe. In embodiments in which robotic apparatus 100 includes a first wheel configured for positioning on a first side of a pipe corresponding with an outer radius of a bend or a curve in the pipe, and a second wheel and a third wheel, each configured for positioning on a second, opposing side of the pipe corresponding with an inner radius of a bend or a curve in the pipe, the identified combination of wheel speeds may include slowing sharply the second wheel as it enters the bend or curve and gradually accelerating the second wheel to the same speed of the first wheel, and slowing gradually the third wheel as it enters the bend or curve and accelerating sharply the third wheel the same speed of the first wheel.

Detecting Radial Movement of Robotic Apparatus 100 on Pipe 10

Figure 46:
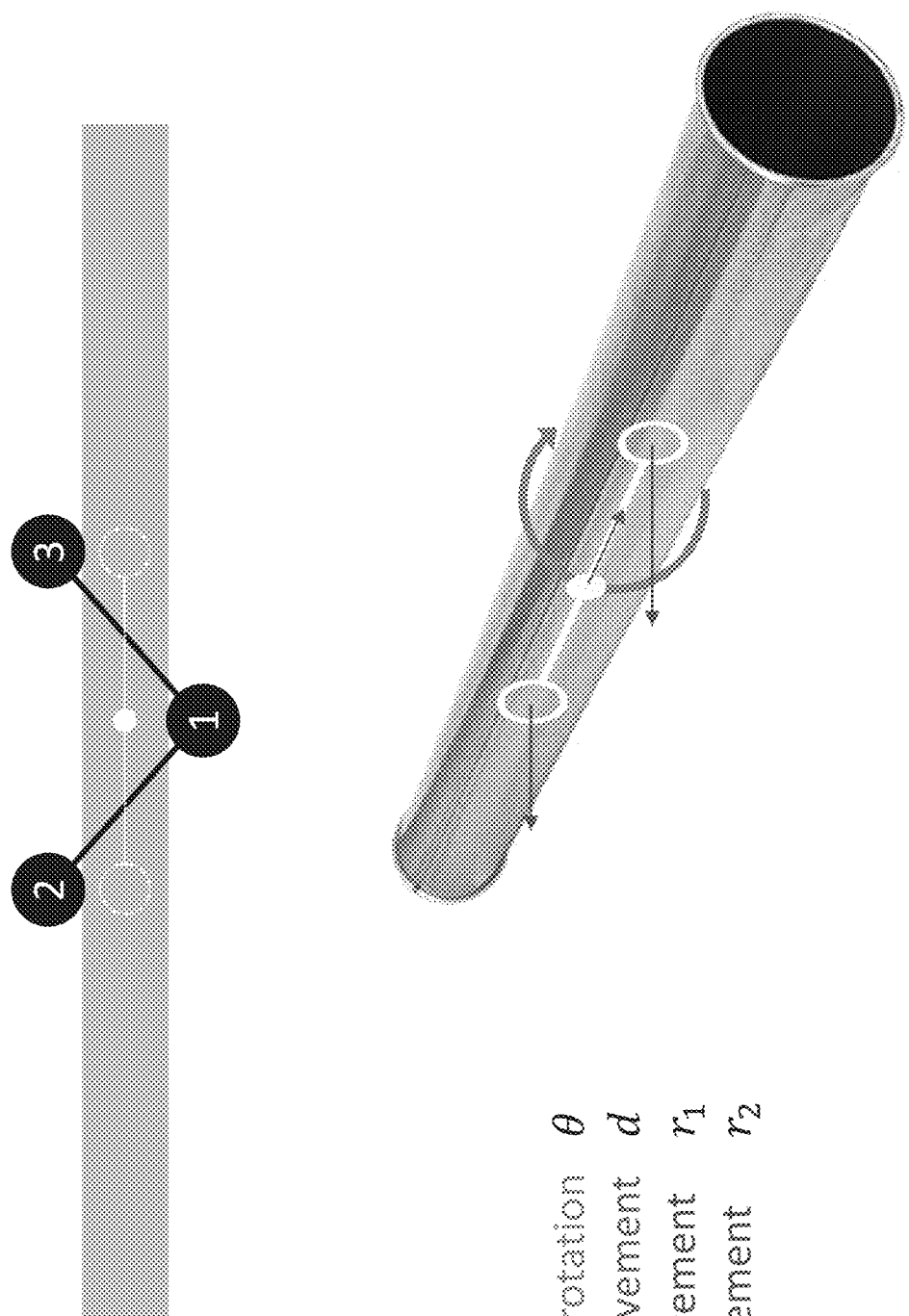
FIG. 46 is a schematic illustration showing how a robotic apparatus may slip on a pipe.

With reference back to FIG. 39, in operation, robotic apparatus may move axially, circumferentially, radially, and various combinations thereof, relative to pipe 10. Radial movement, in particular, tends to occur on horizontal pipes when robotic apparatus 100 slips due to its weight. As used herein, the term radial slip refers to any slipping between the wheels and the pipe that results in the robot exhibiting uncontrolled radial movement, as illustrated in FIG. 46.

System 1000, in various embodiments, may be configured to detect radial movement of robotic apparatus 100 on pipe 10 and, in some embodiments, automatically correct it. Generally speaking, in various embodiments, two or more sensors 1010 may be coupled with robotic apparatus 100 at fixed positions and oriented towards the pipe to measure the distance between their respective positions and corresponding points on the surface of pipe 10. Processor 1030, in various embodiments, may be configured to monitor the distance measurements provided by the two or more sensors 1010 as robotic apparatus 100 moves along pipe 10 to detect a change in the distance measurements provided by at least one of the sensors 1010. Changes in one or more of the distance measurements may, in some cases, be indicative of radial slip since the distance between the sensors 1010 (which are attached to robotic apparatus 100) and pipe 10 may increase or decrease depending on the direction robotic apparatus is slipping. That said, in other cases, changes in the diameter of pipe 10 may also result in increases or decreases in the measured distances depending on whether the diameter of the pipe is getting smaller or bigger and thus changes in the measured distances may not necessarily be the result of a radial slip condition. Accordingly, in various embodiments, processor 1030 may be configured determine if there was a change in the diameter of pipe 10 at the axial location along the pipe at which the processor 1030 detected the change in measured distance. If the processor 1030 determines that there was no such change in pipe diameter, processor 1030 may then determine that the change in measured distance is indicative of radial movement of robotic apparatus 100 on pipe 10.

Processor 1030, in various embodiments, may take a variety of approaches to determining whether there was a change in the diameter of pipe 10 at the axial location along the pipe at which the processor 1030 detected the change in measured distance. For example, in some embodiments, processor 1030 may access information stored in memory 1020 regarding the existence and location(s) of any diameter changes on pipe 10 (e.g., a schematic or lookup table uploaded into memory 1020 by a user). If the stored information indicates that the diameter of pipe 10 is constant, then processor 1030 may be configured to determine that any change in measured distance is indicative of radial movement. If however the stored information indicates that there are areas in which the diameter of pipe 10 changes, then processor 1030 may be configured to determine whether the axial location along the pipe at which the processor 1030 detected the change in measured distance corresponds with any of the locations of such areas included in the accessed information. In some other embodiments, rather than look up known information concerning the diameter of pipe 10, processor 1030 may be configured to utilize measurements from sensors 1010 and/or other onboard sensors to determine the diameter of pipe 10 and any associated changes therein at the axial location along the pipe at which the processor 1030 detected the change in measured distance. For example, processor 1030 may utilize measurements from sensor assembly 200 (e.g., laser rangefinders) and/or sensor assembly 300 (e.g., encoder on clamping mechanism 150) to determine the diameter of pipe 10 in accordance with the previous teachings herein. Processor 1030, in various embodiments, may continuously measure, calculate, or otherwise determine the diameter of pipe 10 to detect a change in pipe diameter much like processor 1030 may monitor the distance measurements provided by sensors 1010 to detect changes therein. As configured, processor 1030 may differentiate changes in distance measurements associated with radial movement from changes in distance measurements associated with pipe diameter changes.

As later described in more detail, sensors 1010 may be arranged on robotic apparatus 100 in various different configurations, many offering the capability to detect radial slip regardless of the direction of travel of robotic apparatus 100 on pipe 10, as well as the capability to determine whether the radial slip is uniform (i.e., both the front and the back of robotic apparatus 100 are slipping) or non-uniform (i.e., just the front or the back is slipping, or both are slipping but one is slipping at a significantly greater rate than the other). For example, in various embodiments, one or more sensors 1010 may be positioned at opposing ends of robotic apparatus 100 such that the aforementioned processes may be performed at each end of robotic apparatus 100. As configured, processor 1030 may determine whether radial movement is occurring at the first end, the second end, or at both ends of the robotic apparatus. This information can be useful in determining the specific corrective action required to overcome the associated radial slip. Additionally or alternatively, in various embodiments, one or more sensors 1010 may be positioned on opposing sides of robotic apparatus 100 so as to provide distance readings from either side of pipe 10 at a given location along a length of robotic apparatus 100. As configured, processor 1030 may compare multiple distance measurements at a particular axial location along pipe 10 to improve robustness when evaluating whether radial slip is occurring at the particular locations, as well as in measuring the diameter of pipe 10 at the particular axial location on pipe 10 (as applicable).

Figure 47:
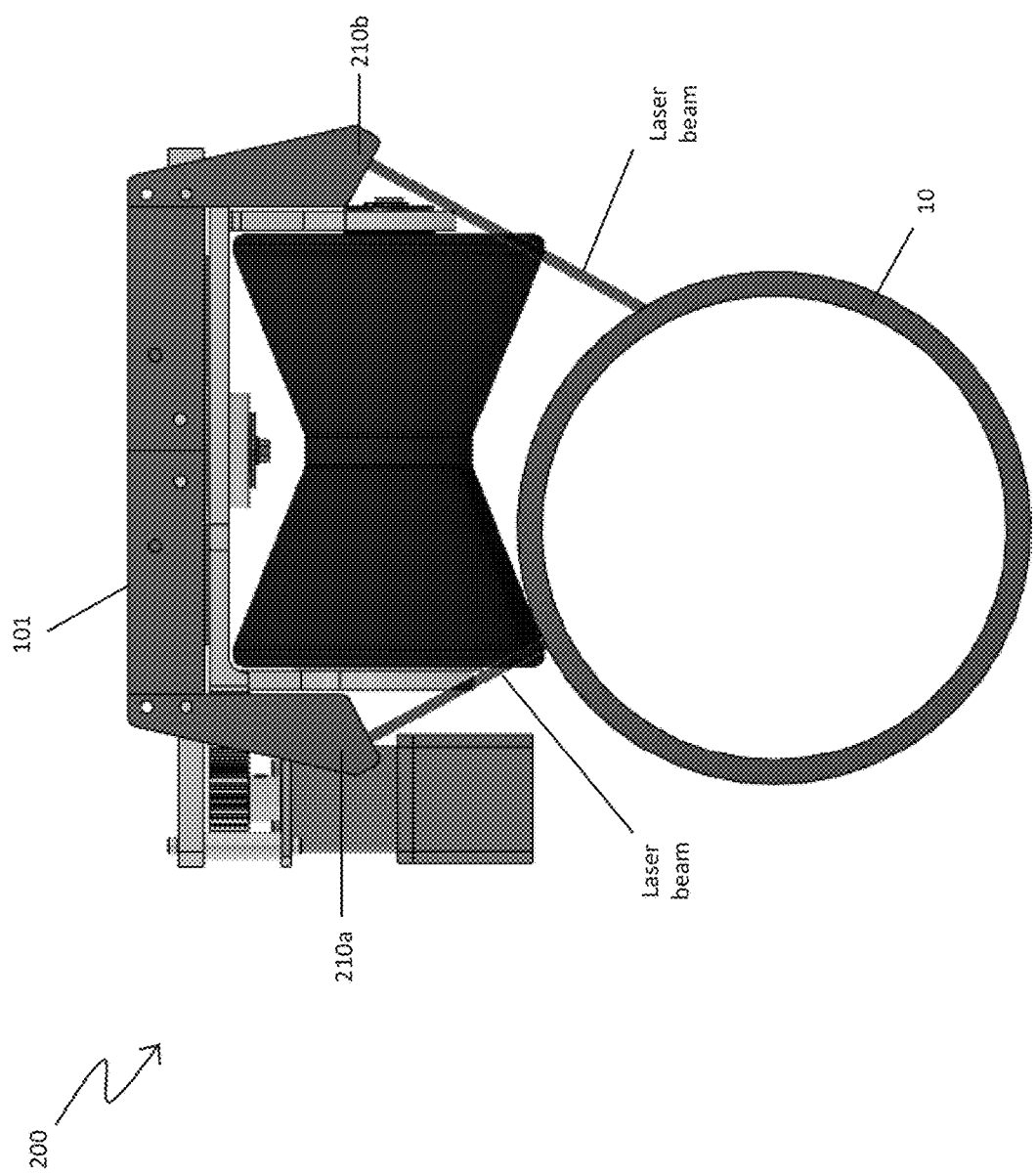
FIG. 47 depicts a representative embodiment of a distance sensor assembly for detecting radial slip of a robotic apparatus, in accordance with an embodiment of the present disclosure.
Figure 48A:
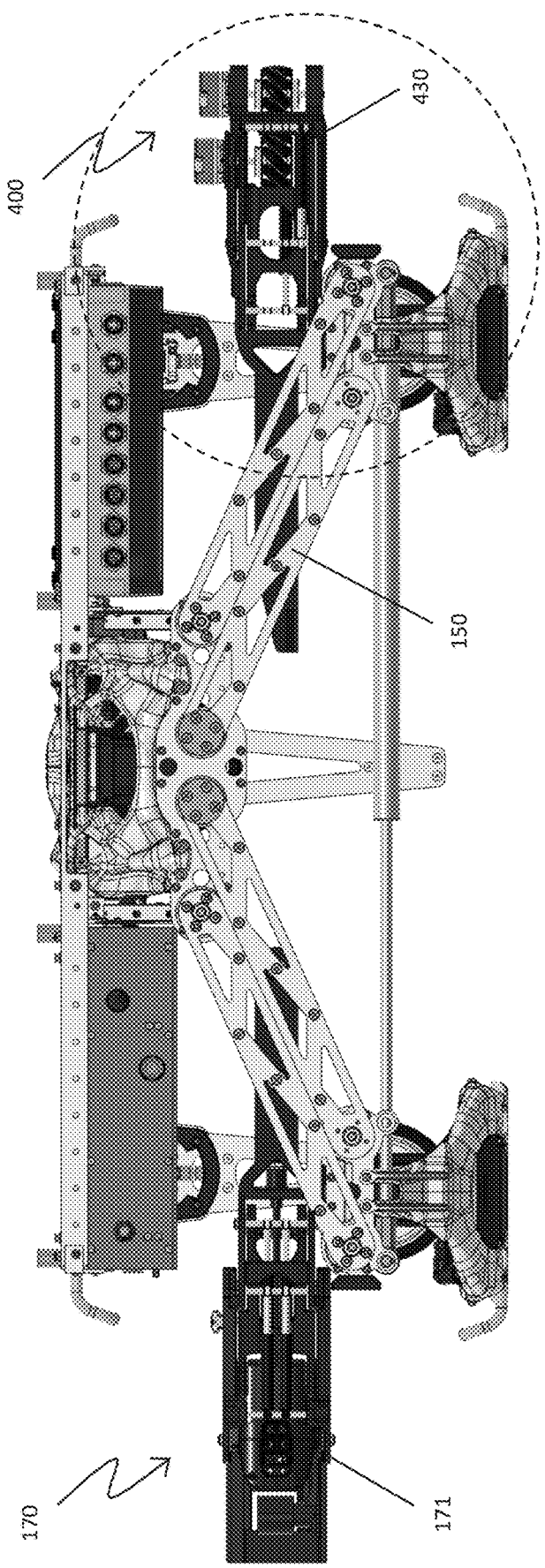
FIG. 48A, FIG. 48B, and FIG. 48C depict a representative embodiment of a contact sensor assembly for detecting radial slip of a robotic apparatus, in accordance with an embodiment of the present disclosure.
Figure 48B:
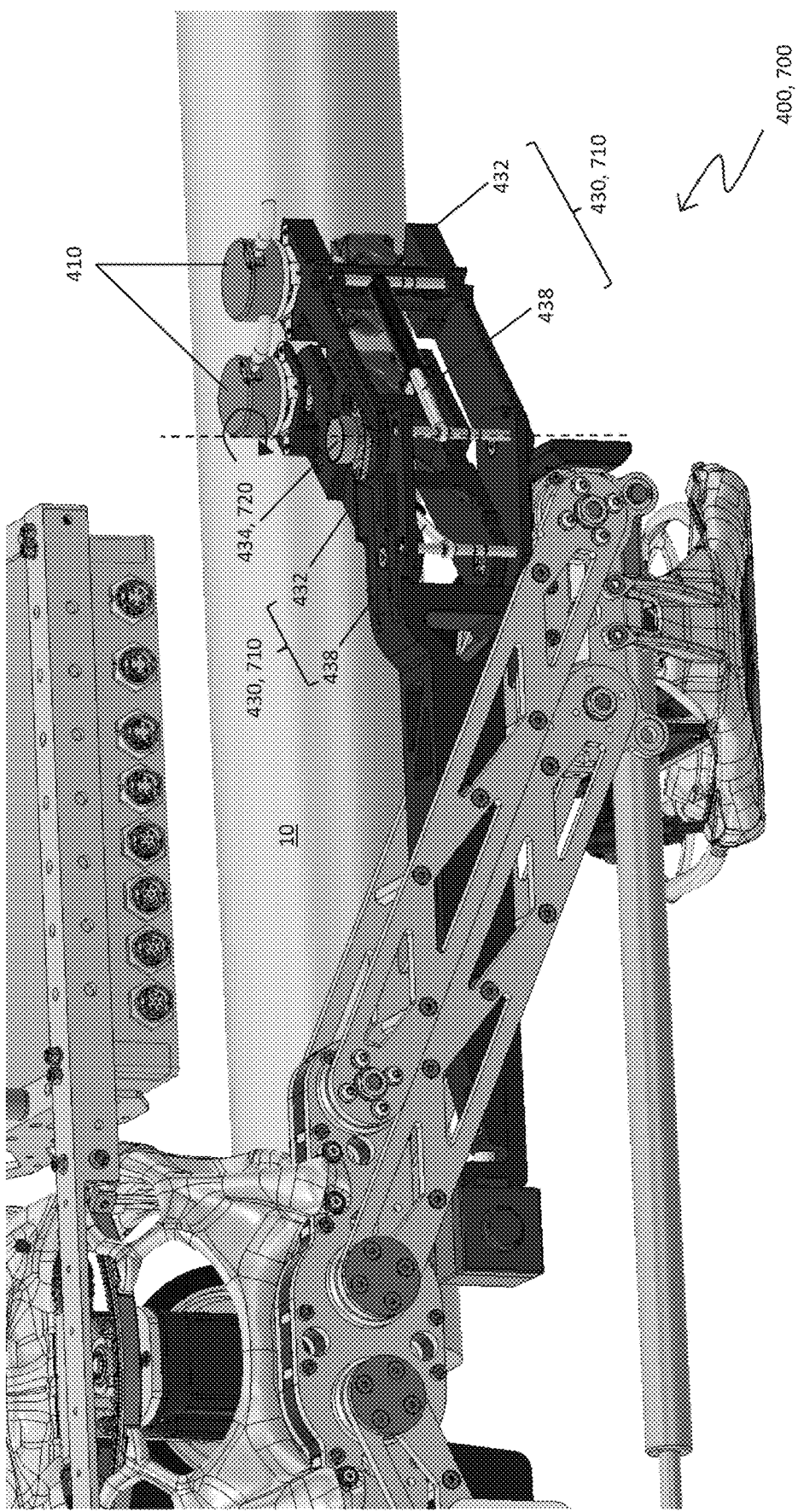
Figure 48C:
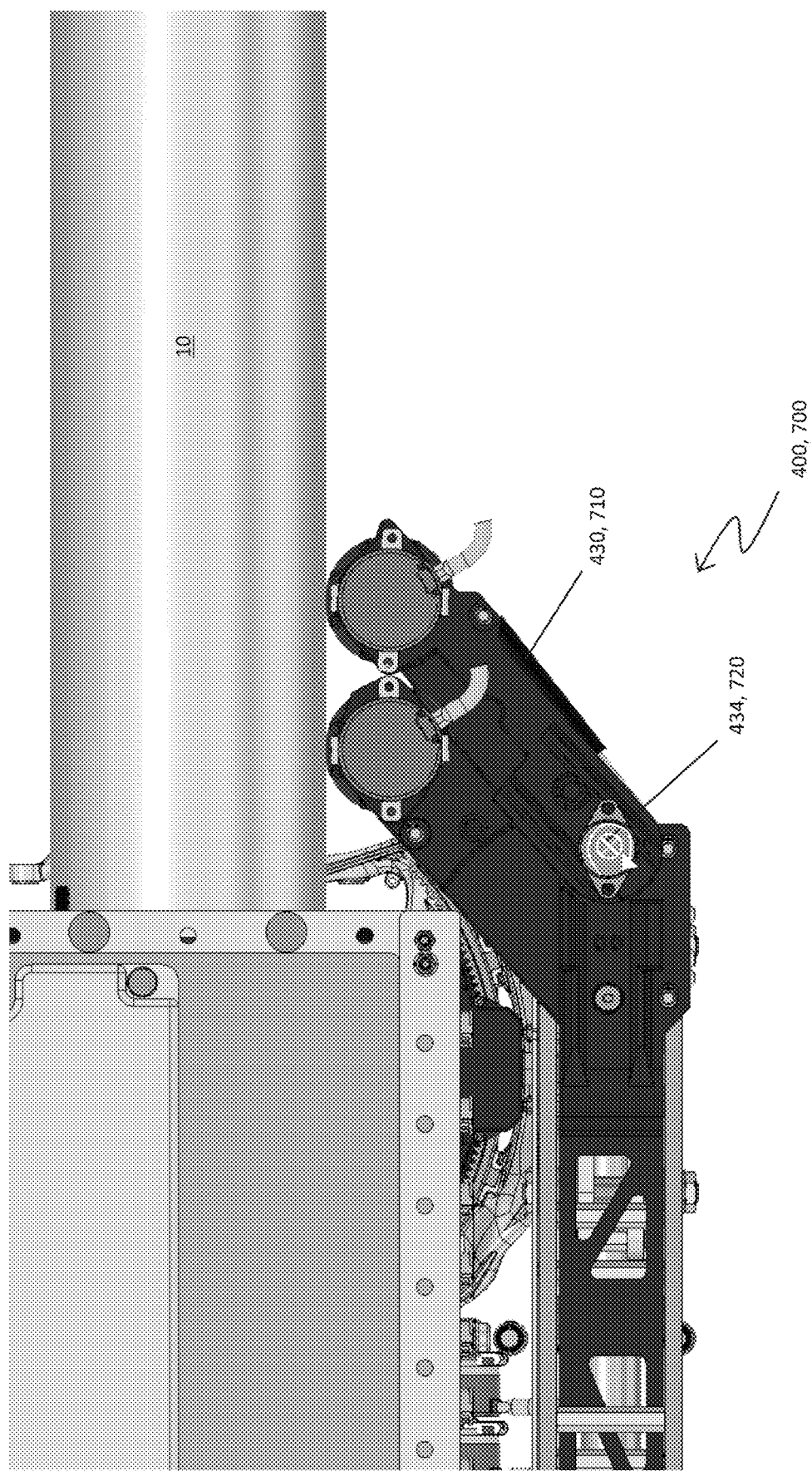
Figure 49:
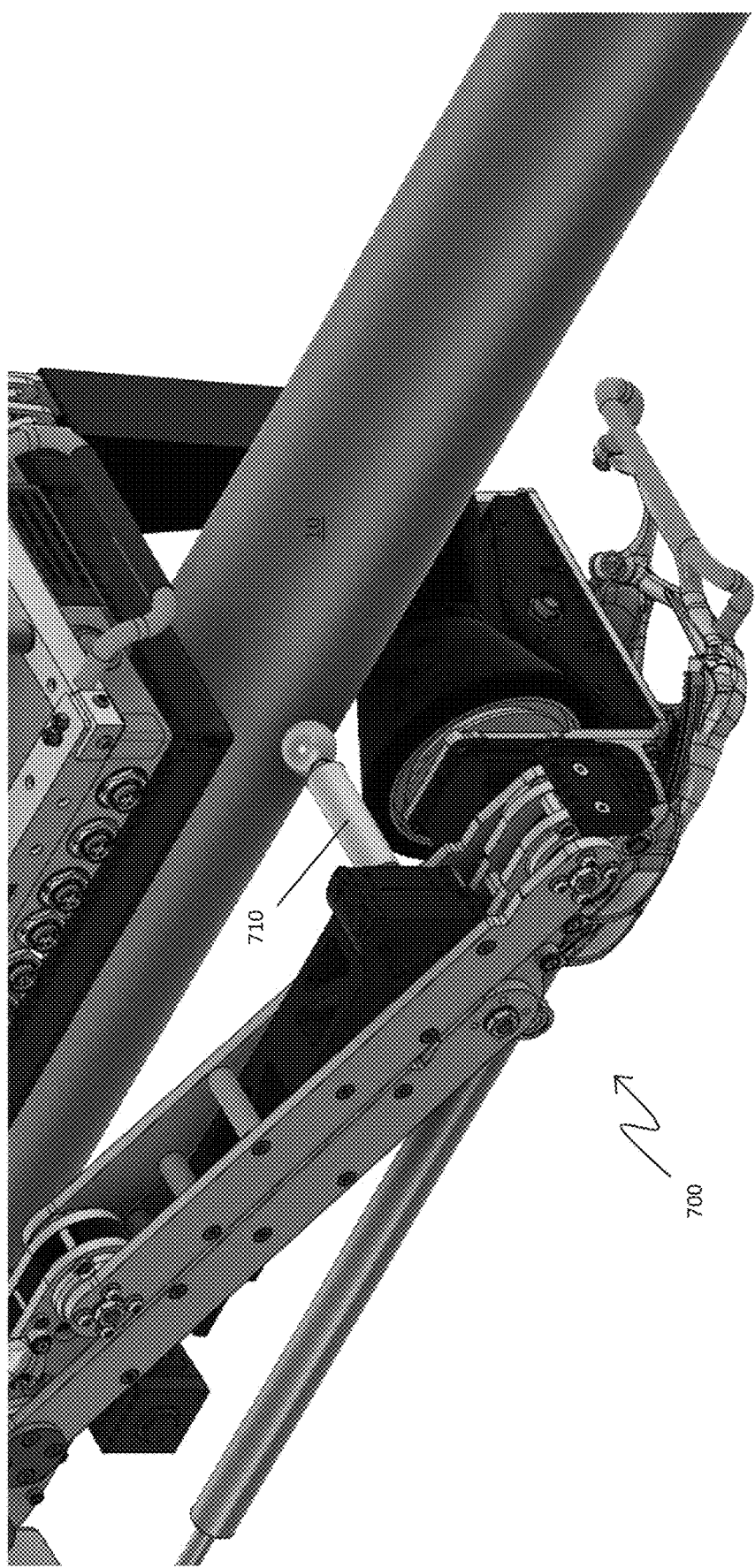
FIG. 49 depicts a representative embodiment of another contact sensor assembly for detecting radial slip of a robotic apparatus, in accordance with an embodiment of the present disclosure.

FIGS. 47-49 illustrate embodiments in which sensor assembly 200, sensor assembly 300, sensor assembly 400, and other sensors and sensor assemblies of the present disclosure have been adapted to function as sensors 1010 consistent with the description above. FIG. 47 illustrates a representative embodiment in which two time-of-flight distance sensors 210 are positioned on opposing sides of robotic apparatus 100 so as to provide distance readings from either side of pipe 10 at a wheel assembly 101 and thereby function as distance sensors 1010 as further described herein. It should be recognized that various embodiments of system 1000 may comprise such sensors 210 in similar arrangement at one or more of wheel assemblies 101 of robotic apparatus 100. FIG. 48A, FIG. 48B, and FIG. 48C illustrate a representative embodiment in sensor assembly 170 and sensor assembly 400 have been adapted to function as sensors 1010 consistent with the description above, with each including an angularly-deflecting contact member (e.g., spring-loaded arm 171 and spring-loaded arm 434) biased to maintain contact with the surface of pipe 10 and a sensor (e.g., angular position sensor 173 and angular position sensor 434) configured to measure the distance to the surface of the pipe based on a position of the contact member as further described herein. Angular position sensor(s) 173 and 434 could be installed at an axis of rotation of spring-loaded arms 171, 434 to measure the angular positions of the spring-loaded arms 171, 434, respectively. Likewise, FIG. 49 illustrates another embodiment of a contact-based sensor assembly in which a linearly-deflecting contact member (e.g., spring-loaded pin 710) is biased to maintain contact with the surface of pipe 10 and a sensor (e.g., displacement sensor 720) is configured to measure the distance to the surface of the pipe based on a position of the contact member 710 as further described herein.

Referring first to FIG. 47, as previously noted sensor assembly 200, in various embodiments, can be additionally or alternatively configured to measure not just pipe diameter, but also radial movement of robotic apparatus 100 on pipe 10. More specifically, distance measurements collected by two or more distance sensors 210 mounted to robotic apparatus 100 can be input into a mathematical model that calculates the magnitude of radial movement based on known information about the geometry of robotic apparatus 100 and sensor assembly 200, including the size of wheels 110 and the locations of distance sensors 210. The mathematical model is based on the geometry in the cross-sectional plane that is normal to the longitudinal axis of the pipe and is parallel with the axis of rotation of the wheel. In this plane there are three unknown variables that describes the pipe position and size (x-coordinate, y-coordinate, diameter). As described in linear algebra, a system of three independent equations can be used to find a unique solution for three unknown variables. In the aforementioned mathematical model, the three independent equations specify that (i) the coordinates extrapolated from the first distance sensor 210a mounting point, angle, and measured distance must coincide with a first point on the surface of the pipe, that (ii) the coordinates extrapolated from the second distance sensor 210b mounting point, angle, and measured distance must coincide with a second point on the circumference of the pipe, and that (iii) the pipe circumference must be tangent to the wheel. If the x-axis is defined to be parallel to the rotational axis of the wheel, the x-coordinate of the center of the pipe with respect to the center of the wheel corresponds to the magnitude and direction of the radial slip. Alternatively, instead of repeatedly solving this system of equations, the problem can be linearized and the response can simply be programmed to be proportional to the difference between the two distance measurements, using a proportional gain that is empirically determined.

With two distance sensors 210, radial movement can be measured at one point along the longitudinal length of robotic apparatus 100. While sufficient in many cases, it can be desirable to utilize more distance sensors 210 so as to measure radial movement at multiple points along the longitudinal length of robotic apparatus 100, especially since robotic apparatus 100 may slip by different magnitudes along the longitudinal length as shown in FIG. 46, and two variables need to be measured to fully characterize and correct for radial slip. To fully measure radial movement along the longitudinal length of robotic apparatus 100, in an embodiment, sensor assembly 200 may include two sets of two distance sensors 210 (four sensors total), one set mounted towards the front end of robotic apparatus 100 and the other set mounted towards the rear end of robotic apparatus 100, for example on the base plates 124 of wheel assemblies 101b and 101c.

Robotic apparatus 100, in various embodiments, may additionally or alternatively be configured to use one or more contact sensor assemblies 700 for detecting radial slip of robotic apparatus 100. Each contact sensor assembly 700, in various embodiments, may include one or more contact members 710 biased towards pipe 10 to maintain contact with a surface of pipe 10 as robotic apparatus 100 moves along pipe 10, such as a spring-loaded contact member. As configured, when robotic apparatus 100 experiences radial slip, spring-loaded contact members 710 may deflect inwards and/or outwards to maintain contact with the surface of the pipe 10 depending on the direction of the radial slip. Sensors 720 may measure these deflections and provide them to processor 1030 to detect and measure the corresponding radial slip, as later described in more detail. In various embodiments, spring-loaded contact member 710 may include those that pivot or otherwise deflect at an angle during a radial slip condition ("angularly-deflecting") such as spring-loaded arm 171 of sensor assembly 170 and spring-loaded arm 430 of sensor assembly 400, those that deflect linearly ("linearly-deflecting) such as spring-loaded pin 710 of FIG. 49 (later described), or any other suitable member configured to deflect to maintain contact with the surface of pipe 10 during a radial slip condition. For ease of description, contact sensor assembly 700, position sensor 720, and spring-loaded contact member 710, and may be referred to herein by the names of certain representative embodiments thereof (e.g., as sensor assembly 200/400, and as spring-loaded arm 171/430 or spring-loaded pin 710, respectively); however, it should be recognized that such references are not intended to be limiting and that associated principles may be utilized with other suitable embodiments of contact sensor assemblies 700. Further, for simplicity, the present disclosure will mostly refer to contact sensor assembly in the context of sensor assembly 400; however, it should be recognized that such references can be generalized to any suitable configuration of spring-loaded arms and angular position sensors, whether embodied as part of sensor assembly 400, inspection sensor assembly 170, or independent thereof.

FIG. 48A depicts a representative embodiment of sensor assembly 400 configured for detecting radial slip of robotic apparatus 100, as installed on the robotic apparatus 100. FIG. 48B and FIG. 48C depict zoomed-in side and top views of the same. Embodiments of sensor assembly 400 configured for detecting and measuring radial movement and associated slip may generally similar components as previously-described embodiments of sensor assembly 400 (such as one or more mecanum wheels 410, one or more rotary encoders 420 for measuring rotation of mecanum wheels 410, and one or more spring-loaded arms 430), as well as one or more angular position sensors (e.g., rotary encoder, potentiometer) 434 configured to measure an angular position of at least one of spring-loaded arms 430 about its axis of rotation (shown by a dashed line) relative to pipe 10. It should be noted that, while described in the context of sensor assembly 400, the present systems for detecting radial slip can be implemented separate from sensor assembly 400 and need only comprise one or more spring-loaded arms biased toward and configured to move along the surface of pipe 10 and one or more angular position sensors configured to measure an angular position of at least one of the spring-loaded arms, as further described herein.

Each spring-loaded arm(s) 430, in various embodiments, may generally comprise an arm 432 and a passive biasing element 438. The number and configurations of spring-loaded arms 430 may vary—for example, in various embodiments, there may be one or more standalone spring-loaded arms 430 (as shown in FIGS. 39A-39B); two or more independently moveable spring-loaded arms 430 mounted to a common structure (as shown in FIGS. 31A-31C and FIGS. 47A-47C); or two or more spring-loaded arms 430 configured to move together as part of a four-bar linkage (similar to the architecture of the particular embodiment of inspection sensor assembly 170 shown best in FIG. 34C). One more passive biasing element(s) 438, such as compression springs, connect to arm(s) 432 and may be configured to push arm(s) 432 towards pipe 10 similar to the way passive biasing elements 178 act to push arms 172 towards pipe 10. As configured, spring-loaded arm 430 is permitted to move up and down (i.e., away from and towards pipe 10) to adjust for changes in pipe diameter as well as to accommodate changes in distance from pipe 10 in the event robotic apparatus 100 should slip radially off of the centerline of pipe 10. More specifically, if robotic apparatus 100 should slip radially in the direction of the closed side of robotic apparatus 100 (i.e., out of the page in FIG. 48B), passive biasing elements 438 will cause spring-loaded arm 430 to bias further inwards to keep mecanum wheels 410 engaged with pipe 10, which is now farther away than prior to the radial slippage. Conversely, if robotic apparatus 100 should slip radially in the direction of the open side of robotic apparatus 100 (i.e., into the page in FIG. 48B), pipe 10 will be closer to spring-loaded arm 430 than prior to the radial slippage and thus push spring-loaded arm 430 farther outwards. Accordingly, the angular position of spring-loaded arm 430 as measured by angular position sensor 434 may become negative if robotic apparatus 100 should slip radially in the direction of the closed side of robotic apparatus 100 (i.e., out of the page in FIG. 48B) and may become positive if robotic apparatus 100 should slip radially in the direction of the open side of robotic apparatus 100 (i.e., into the page in FIG. 48B). In various embodiments, a controller (e.g., the secondary controller described in the context of FIG. 50) may be configured to monitor measured angular position as provided by angular position sensor 434 and detect changes indicative of radial slip in either direction. The controller may then correct for such slip using previously-described slip techniques.

Sensor assembly 400, in various embodiments, may be mounted parallel to and halfway up and down (i.e., at the vertical midpoint of) clamping mechanism 150, as best shown in the embodiment of FIG. 48A. As configured, such a configuration places spring-loaded arm 430 such that its motion will always be strictly radial with respect to pipe 10 in a cross-sectional plane of the pipe and thus a good proxy for detecting radial slip in either direction. Further, spring-loaded arm 430 can maintain perpendicularity to the surface of pipe 10 irrespective of pipe size. Still further, such a configuration facilitates installation of robotic apparatus 100 on pipe 10. Since spring-loaded arm 430 is mounted on the opposite side from the "open" side of robotic apparatus 100, spring-loaded arm 430 will automatically be pushed away and adjust to pipe 10 as robotic apparatus 100 is maneuvered to accept pipe 10 in its interior through the "open" side during installation on pipe 10.

In various embodiments, robotic apparatus 100 may comprise two sensor assemblies 700, with one positioned more forward along the pipe than the other. A representative example of such a configuration is illustrated in FIG. 48A, where the two sensor assemblies are embodied as sensor assembly 400 on the right and inspection sensor assembly 170 on the left in FIG. 48A. Advantageously, such a configuration may allow processor 1030 to compare the respective distance measurements provided by sensors 720 associated with each assembly to compare the amount of radial slip along different longitudinal positions of robotic apparatus 100. In a radial slip situation, the entire robotic apparatus 100 may shift away from or towards pipe 10, thereby causing the spring-loaded arms of both assemblies to rotate inwards or outwards. The degree to which each spring-loaded arm rotates may vary and may depend on whether the slip is uniform (both front and back of robotic apparatus 100 slip same amount) or asymmetric (the front of robotic apparatus 100 slips more than the back, or vice versa).

Accordingly, in various embodiments, processor 1030 may be configured to monitor the respective angular positions of the leading spring-loaded arm (e.g., arm 430 in FIG. 48A assuming travel to the right) and the trailing spring-loaded arm (e.g., arm 171 in FIG. 48A assuming travel to the right) and, upon detecting a change in the angular position of one of one or both of the spring-loaded arms (as measured by the associated angular position sensor 434), determine whether radial slip is occurring. When the robotic apparatus is installed on the pipe, with no slip, the operator or the controller may set a new reference angular position(s) representative of a no slip condition. Similarly, if the pipe diameter changes, the operator or the controller may momentarily turn off the slip adjustment during the transition and set a new reference angular position(s) indicative of a no slip condition when the robotic apparatus is situated on the pipe with a new diameter. In another embodiment, pipe diameter may be provided as an input to the controller (either directly by the operator or as determined by the controller by cross-referencing its position with a model or lookup table containing pipe diameter at various positions) and the controller may calculate appropriate reference angular position(s) based on knowledge of its own geometric configuration. Pipe diameter may also be provided by sensor assembly 200 or sensor assembly 300 as previously described in the disclosure. If the pipe diameter is continuously monitored by any such sensor assembly (as opposed to entered manually) this information can also be used to dynamically adapt to different pipe diameters or changes in pipe diameter, without the need to manually set reference angular positions.

As previously mentioned, FIG. 49 depicts another representative embodiment of contact sensor assembly 700 including a linearly-deflecting contact member 730 shown here as a spring-loaded pin. Spring-loaded pin 730 may be positioned on robotic apparatus 100 in a location in which pin 710 is biased towards pipe 10 to contact a surface of pipe 10, such as on an underside of base plate 124 of wheel assembly 101 or on a non-deflecting arm positioned similar to arms 410 of sensor assembly 400. A sensor 720, such as a displacement sensor, may measure a position of pin 710 in a direction transverse to the contacted surface of pipe 10 as robotic apparatus 100 moves along the pipe 10. One of ordinary skill in the art will recognize that robotic apparatus 100 may configured with spring-loaded pins 730 in like manner as spring-loaded arms 430 and that processor 1030 may utilize the same or similar techniques to detect and characterize a radial slip condition.

In various embodiments, processor 1030 may be configured to determine if robotic apparatus 100 is merely traversing a pipe diameter change without directly measuring pipe diameter or comparing the distance measurements of two or more distance sensors at a particular longitudinal location of robotic apparatus 100. Generally speaking, if robotic apparatus 100 is merely traversing a transition in pipe diameter (e.g., pipe gets bigger or smaller), initially the leading distance sensor(s) 1010—rather than both the leading and trailing distance sensors 1010—will rotate to accommodate the diameter change. The trailing distance sensor 1010 will measure the same distance until it subsequently reaches the diameter change as robotic apparatus 100 continues to move forward. Accordingly, in various embodiments, processor 1030 may be configured to monitor the respective angular positions of the leading spring-loaded arm (e.g., arm 430 in FIG. 48A assuming travel to the right) and the trailing spring-loaded arm (e.g., arm 171 in FIG. 48A assuming travel to the right) and, if there is a change in the measured angular position of only the leading spring-loaded arm, then processor 1030 may determine that either: (i) the pipe has changed diameter and radial slip is not occurring, or (ii) there may be an asymmetric slip condition in which only the front of robotic apparatus 100 is slipping and the rear is not. To account for the possibility of scenario (ii), the controller may estimate, based on known geometry of robotic apparatus 100 and the speed at which robotic apparatus 100 is travelling on pipe 10, how long it will take for the trailing spring-loaded arm to reach the longitudinal point on pipe 10 at which the leading spring-loaded arm first experienced an angular position change, and then use this information to subsequently determine whether scenario (i) or (ii) is occurring. More specifically, the controller may continue monitoring the measured angular position of the trailing spring-loaded arm for subsequent change and, if a similar change in the measured angular position of the trailing spring-loaded arm occurs at the estimated time at which the trailing spring-loaded arm should have reached the longitudinal point on pipe 10 at which the leading spring-loaded arm first experienced an angular position change, the controller may determine that the pipe has changed diameter and radial slip is not occurring as per scenario (i). Stated otherwise, if the pipe has merely changed diameter, the trailing spring-loaded arm should move by the same amount as the leading spring loaded arm when the trailing spring-loaded arm reaches the point on pipe 10 where the leading spring-loaded arm first moved, because at that point the trailing spring-loaded arm has reached the diameter transition. However, if a change in the measured angular position of the trailing spring-loaded arm occurs prior to the estimated time at which the trailing spring-loaded arm should reached the longitudinal point on pipe 10 at which the leading spring-loaded arm first experienced an angular position change, then the controller may determine that the asymmetric slip condition described under scenario (ii) is occurring. Stated otherwise, if the trailing spring-loaded arm moves before it is expected to reach the point of pipe diameter transition, such movement is likely caused by radial slip of at least the rear of robotic apparatus 100. This rear slip may be caused by a front slip condition, caused by jostling of robotic apparatus 100 as its front portion enters the pipe diameter transition, or perhaps occurs by coincidence just after the front portion of robotic apparatus 100 begins traversing the pipe diameter transition; in any event, the controller may determine that radial slip is occurring and may take corrective action based on the measured angular positions of the leading and trailing spring-loaded arms. Likewise, if there is no change in the measured angular position of the trailing spring-loaded arm by the estimated time at which the trailing spring-loaded arm should have reached the longitudinal point on pipe 10 at which the leading spring-loaded arm first experienced an angular position change, then the controller may determine that the asymmetric slip condition described under scenario (ii) is occurring (but perhaps is not becoming worse) since the controller did not detect timely movement of the trailing spring-loaded arm indicative of a diameter transition. If instead there is a simultaneous or near simultaneous (i.e., occurring shortly after, and in any event, prior to a time at which the trailing spring-loaded arms should reach the longitudinal position on pipe 10 at which a change in the measured angular position of the leading spring-loaded arm was detected) change in the measured angular position of both the leading spring-loaded arm and the trailing spring-loaded arm, then the controller may determine that robotic apparatus 100 is experiencing radial slip. The controller may also determine the direction of radial slippage based on the sign of the angular position changes measured by the respective angular position sensors and implement corresponding corrective action. The aforementioned description is also applicable to configurations in which other distance sensors 1010 are used. For example, distance sensors 210 may be used in place of spring-loaded arms at the specified locations, and direct distance measurements (or changes therein) may be used in place of movement (or changes in angular position) of spring loaded-arms. Likewise, linear-deflecting contact sensors (e.g., spring-loaded pin 710 and displacement sensor 720) may be used in place of the angularly-deflecting spring-loaded arms 430 and angular position sensors 434.

Of course, the controller can be programmed to ignore changes in angular position of one or both angular position sensors that fall below a predetermined threshold to avoid false detections of radial slip or to avoid taking corrective action for only nominal radial slip.

In another embodiment, controller may be configured to differentiate situations of radial slip from mere changes in pipe diameter by comparing the measured angular position of one or both spring-loaded arms to a corresponding reference angular position(s). The reference angular position(s) can be set by the operator (or automatically by the controller) at a given time at which robotic apparatus 100 is known not to be experiencing radial slip (e.g., upon installation of robotic apparatus 100 on pipe 10) and the controller may monitor measurements of angular position thereafter to detect deviations from the reference angular position(s). If both arms are identical, they may share a common reference angular position indicative of a no slip condition, whereas if both arms are not identical, each may have its own respective reference angular position indicative of a no slip condition. As before, if there are deviations from the reference angular position in only that of the leading spring-loaded arm, the controller may determine that: (i) the pipe has either changed diameter and radial slip is not occurring, or (ii) there may be an asymmetric slip condition in which only the front of robotic apparatus 100 is slipping and the rear is not; conversely, if there are simultaneous or near-simultaneous deviations from the reference angular position(s) of both the leading and trailing spring-loaded arms, the controller may determine that robotic apparatus 100 is experiencing radial slip. Of course, the controller can be programmed to ignore deviations with magnitudes that fall below a predetermined threshold to avoid false detections of radial slip or to avoid taking corrective action for only nominal radial slip. If the pipe diameter changes, the operator or the controller may set a new reference angular position(s) indicative of a no slip condition. In another embodiment, pipe diameter may be provided as an input to the controller (either directly by the operator or as determined by the controller by cross-referencing its position with a model or lookup table containing pipe diameter at various positions) and the controller may calculate appropriate reference angular position(s) based on knowledge of its own geometric configuration.

In various embodiments, the controller can use a combination of any one or more of the techniques described in this section to detect radial slip. In an embodiment, the controller may be configured to select a particular technique for use in certain conditions. For example, distance sensors 210 and associated slip detection methods may be selected when conditions are conducive to taking laser or ultrasonic distance measurements, whereas sensors spring-loaded arms and associated slip detection methods may be selected when conditions are unfavorable for taking laser or ultrasonic distance measurements or when such methods are otherwise preferable. Depending on the configuration, and operator may select the particular technique to be used, or the controller may select the particular technique to be used, such as by using one or more sensors to assess relevant conditions to determine whether a particular distance sensor 210 (e.g., laser, ultrasonic) will work reliably. Distance sensors (e.g., laser rangefinders, other time-of-flight technologies, ultrasonic proximity sensors, capacitive displacement sensors) each have their own shortcomings and inaccuracies. For example, laser rangefinders can be prone to error in some lighting conditions and ultrasonic proximity sensors have a certain "dead band" in front of the sensing face within which they may not be able to measure distance accurately. Likewise, laser rangefinders work best at certain angles of incidence, and current pipe size and radial slip (as measured by the angular position sensor 434) can be used to calculate the current angle of incidence and determine whether the laser rangefinder or arm mechanism is preferable. Properties of the pipe surface (e.g., reflectivity, insulation jacketing material) can also be instructive since certain distance sensors 210 may not work as well with energy-absorbing materials versus reflective materials, for example.

In another embodiment, both techniques can be used simultaneously, with one acting as a secondary check on the other to ensure robustness. For example, distance sensors 210 and associated slip detection methods may be designated as the primary technique; however, upon detecting a slip condition using distance sensors 210, the controller may then reference the spring-loaded arms to verify the slip condition. If the angular positions of the spring-loaded arms also indicate a slip condition, the controller may then take corrective action; whereas if the angular positions of the spring-loaded arms do not indicate a slip condition, the controller may opt not to take corrective action and instead alert and await instructions from the operator. Likewise, if both techniques indicate a slip condition but differ in terms of severity or other parameter, the controller may opt to alert and await instructions from the operator. In yet another embodiment, both techniques can be used simultaneously and rather than having one check the other, input from each is combined in a weighted average and weighted based on the variance of their respective measurements over time.

Regardless of how radial slip is measured, it should be recognized that a system 1000 controlling robotic apparatus 100 may also be configured to automatically correct associated slip. Embodiments of system 1000 utilizing sensor assembly 400, in various embodiments, may include a controller configured to automatically correct the identified radial slip condition by (i) estimating a magnitude and direction of the radial slip based on the measured positions of each respective contact member, (ii) determining, based on the estimated magnitude and direction of the radial slip, a respective direction, speed, and duration for which to operate one or more wheels of the robot to overcome the radial slip, and (iii) operating the one or more wheels according to the estimated direction, speed, and duration. Likewise, embodiments of system 1000 utilizing sensor assembly 200 (e.g., distance sensors 210), in various embodiments, may include a controller configured to automatically correct the identified radial slip condition by (i) estimating a magnitude and direction of the radial slip based on the measured distances provided by each respective distance sensor, (ii) determining, based on the estimated magnitude and direction of the radial slip, a respective direction, speed, and duration for which to operate one or more wheels of the robot to overcome the radial slip, and (iii) operating the one or more wheels according to the estimated direction, speed, and duration.

Automatic Detection and Correction of Slip, Generally

Figure 50:
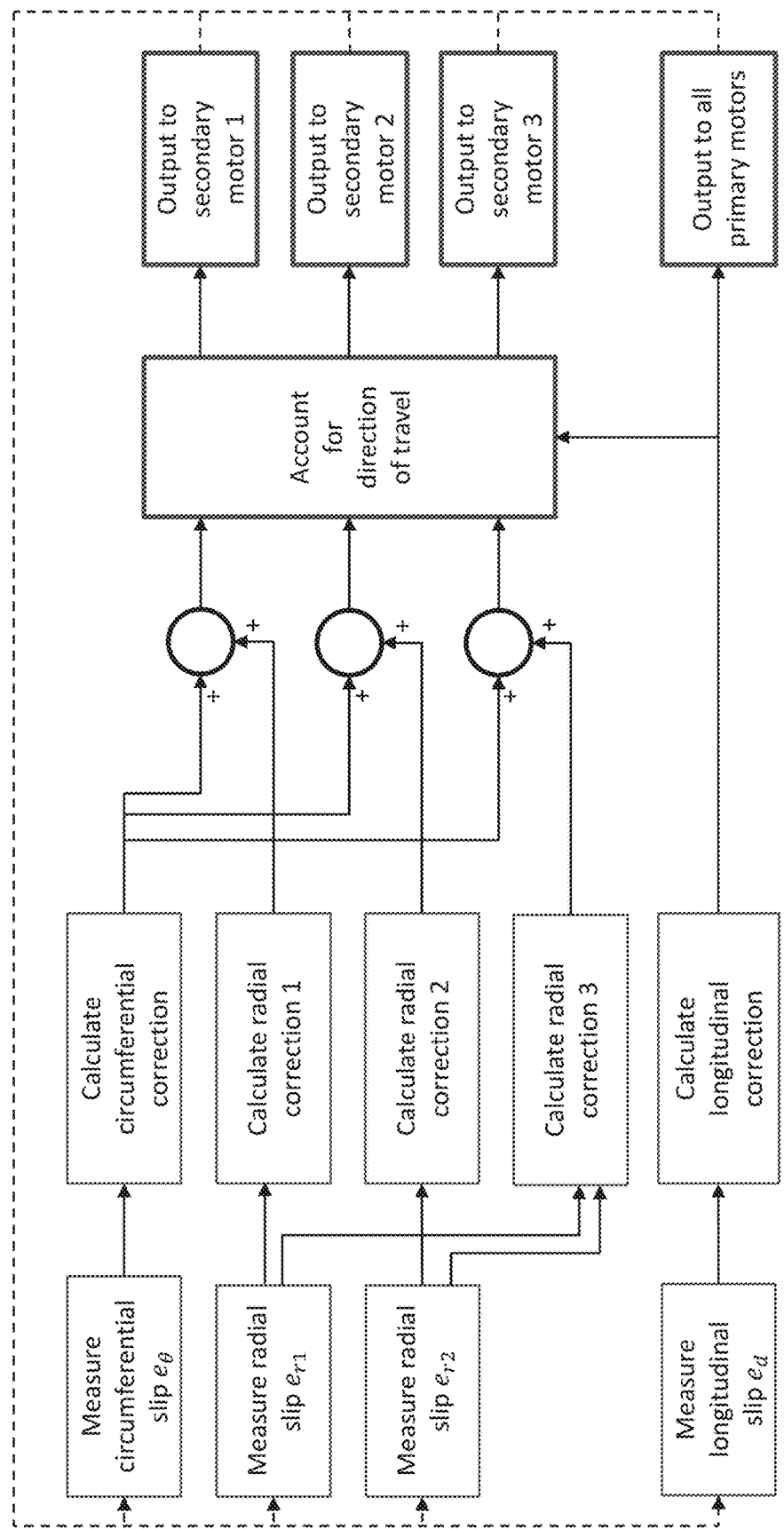
FIG. 50 is a flow chart depicting a method for automatically detecting and correcting for radial sip, circumferential slip, longitudinal slip, or any combination thereof in accordance with an embodiment of the present disclosure.

FIG. 50 is a flowchart depicting another representative method automatically detecting and correcting for radial slip, circumferential slip, longitudinal slip, or any combination thereof. The representative method may utilize two distinct sets of instructions, characterized as a primary controller and a secondary controller. The primary controller may control drive motor 130 and correct for longitudinal slip. The secondary controller may control alignment motor 122 and corrects for circumferential and radial slip. This method can also be used with embodiments configured with differential steering, such as those shown in FIG. 26A, FIG. 26B, FIG. 28A, FIG. 28B, FIG. 29A, and FIG. 29B. The output from the primary controller would be used to control how far to drive the mirrored motors 130 harmoniously to drive along the longitudinal axis of pipe 10. The output from the secondary controller would be used to control how far to drive the mirrored motors 130 differentially to adjust the alignment of each wheel assembly 101 and control the radial and circumferential movement.

The method, in a representative embodiment, may begin with the primary controller measuring any longitudinal slip and the secondary controller measuring any circumferential slip and radial slip. The slip, referred to as error (e) in FIG. 50, may be measured by comparing the intended circumferential, radial, or longitudinal position with the actual measured position. Next, each controller may calculate the appropriate correction based on the corresponding error(s). This can be done in a number of ways. In an embodiment, a proportional-integral-derivative (PID) type controller can be used to calculate the appropriate correction based on the current error (proportional), the cumulative error (integral), and the rate of change of the error (derivative). Next, the secondary controller may calculate the sum of the radial and circumferential corrections.

The secondary controller may then account for the direction of travel of robotic apparatus 100 by querying the primary controller for the direction of travel. The correction is unchanged if robotic apparatus 100 is travelling forwards, but the correction is inversed (multiplied by −1) if robotic apparatus 100 travels in reverse. If the direction of travel reverses, alignment motor 122 must also reverse direction to provide the same intended correction.

Both controllers may then output a final correction to their respective motors 130, 122. As soon as the correction has been output, the process may start over with measuring the error to determine if further correction is necessary in a closed-loop control approach.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for detecting radial movement of a robotic apparatus on a pipe, comprising:
   a first distance sensor and a second distance sensor, each configured to be coupled with the robotic apparatus at a fixed position and to measure a distance between its respective fixed position and a surface of the pipe; and
   a processor configured to:
      monitor the distance measurements provided by the first distance sensor and the second distance sensor as the robotic apparatus moves along the pipe;
      detect a change in the distance measurements provided by at least one of the first distance sensor and the second distance sensor; and
      determine whether a diameter of the pipe changed at the axial location at which the processor detected the change in the distance measurements, and if not, determine that the change in distance measurements are indicative of radial movement of the robotic apparatus on the pipe.

2. The system of claim 1, wherein at least one of the first distance sensor and the second distance sensor is a laser or ultrasonic time-of-flight sensor.

3. The system of claim 1, wherein at least one of the first distance sensor and the second distance sensor is a contact sensor comprising a contact member biased to maintain contact with the surface of the pipe and a sensor configured to measure a position of the contact member as a proxy for the distance measurement.

4. The system of claim 3, wherein the contact member is an angularly-deflecting member or a linearly deflecting member.

5. The system of claim 1, wherein the first distance sensor and the second distance sensor are offset from a centerline of the robotic apparatus and are configured to measure the distance between their respective fixed positions and surfaces on either side of a centerline of the pipe.

6. The system of claim 5, wherein the processor is configured to determine a direction and magnitude of the radial movement based on the distance measurements provided by the first distance sensor and the second distance sensor.

7. The system of claim 5, wherein the processor is configured to determine a diameter of the pipe based on the distance measurements provided by the first distance sensor and the second distance sensor.

8. The system of claim 5,
   further comprising a third distance and a fourth distance sensor, each configured to be coupled with the robotic apparatus at a fixed position and to measure a distance between its respective fixed position and a surface of the pipe,
   wherein the first distance sensor and the second distance sensor are positioned proximate a first end of the robotic apparatus and the third distance sensor and the fourth distance sensor are positioned proximate a second, opposing end of the robotic apparatus, and
   wherein the processor is configured to:
      monitor the distance measurements provided by the first distance sensor, the second distance sensor, the third distance sensor, and the fourth distance sensor as the robotic apparatus moves along the pipe;
      detect a change in the distance measurements provided by at least one of the first distance sensor, the second distance sensor, the third distance sensor, and the fourth distance sensor; and
      determine whether a diameter of the pipe changed at the axial location at which the processor detected the change in the respective distance measurements, and if not, determine that the change in the respective distance measurements are indicative of radial movement of a corresponding end of the robotic apparatus on the pipe.

9. The system of claim 8,
   wherein the processor is configured to determine a direction and magnitude of radial movement at the first end of the pipe based on the distance measurements provided by the first distance sensor and the second distance sensor, and
   wherein the processor is configured to determine a direction and magnitude of radial movement at the second end of the pipe based on the distance measurements provided by the third distance sensor and the fourth distance sensor.

10. The system of claim 8,
    wherein the processor is configured to determine a diameter of the pipe at the axial location associated with the first end of the pipe based on the distance measurements provided by the first distance sensor and the second distance sensor, and
    wherein the processor is configured to determine a diameter of the pipe at the axial location associated with the second end of the pipe based on the distance measurements provided by the third distance sensor and the fourth distance sensor.

11. The system of claim 1,
    wherein the first distance sensor and the second distance sensor are positioned proximate opposing ends of the robotic apparatus, and
    wherein the processor is configured to:
       monitor the distance measurements provided by the first distance sensor and the second distance sensor as the robotic apparatus moves along the pipe;
       detect a change in the distance measurements provided by at least one of the first distance sensor and the second distance sensor; and
       determine whether a diameter of the pipe changed at the axial location at which the processor detected the change in the respective distance measurements, and if not, determine that the change in the respective distance measurements are indicative of radial movement of a corresponding end of the robotic apparatus on the pipe.

12. The system of claim 1, wherein the processor is configured to determine whether a diameter of the pipe changed at the axial location at which the processor detected the change in the distance measurements by comparing an axial location of the robotic apparatus on the pipe with a known axial location(s) of any diameter changes in the pipe.

13. The system of claim 1, wherein the processor is configured to determine whether a diameter of the pipe changed at the axial location at which the processor detected the change in the distance measurements by measuring a diameter of the pipe at the axial location and comparing the diameter measurement to a known or measured diameter of the pipe upstream from the axial location.

14. The system of claim 1, wherein the processor is further configured to automatically correct the radial movement by (i) estimating a magnitude and direction of the radial movement based on the measured distances provided by each respective distance sensor, (ii) determining, based on the estimated magnitude and direction of the radial movement, a respective direction, speed, and duration for which to operate one or more wheels of the robot to overcome the radial movement, and (iii) operating the one or more wheels according to the estimated direction, speed, and duration.

* * * * *